(12) United States Patent
Sugiura et al.

(10) Patent No.: US 7,525,237 B2
(45) Date of Patent: Apr. 28, 2009

(54) ULTRASONIC SENSOR

(75) Inventors: Makiko Sugiura, Hekinan (JP);
Takahiko Yoshida, Okazaki (JP);
Masatoshi Tokunaga, Chiryu (JP);
Yasutoshi Suzuki, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/003,096

(22) Filed: Dec. 20, 2007

(65) Prior Publication Data

US 2008/0116765 A1 May 22, 2008

Related U.S. Application Data

(63) Continuation of application No. 11/586,561, filed on Oct. 26, 2006, now Pat. No. 7,329,975, which is a continuation of application No. 11/208,724, filed on Aug. 23, 2005, now abandoned.

(30) Foreign Application Priority Data

| Aug. 25, 2004 | (JP) | ............................. 2004-245541 |
| Feb. 18, 2005 | (JP) | ............................. 2005-042449 |

(51) Int. Cl.
*H01L 41/053* (2006.01)
*H01L 41/083* (2006.01)

(52) U.S. Cl. .................. 310/334; 310/322; 310/348

(58) Field of Classification Search ............... 310/322, 310/324, 334–337, 340, 344, 348
See application file for complete search history.

(56) References Cited

U.S. PATENT DOCUMENTS 2,452,068 A 10/1948 Peterson
3,130,275 A 4/1964 Hagey
4,642,508 A 2/1987 Suzuki et al.
5,297,553 A 3/1994 Sliwa, Jr. et al.
5,317,229 A 5/1994 Koehler et al.
6,250,162 B1 6/2001 Amaike et al.
6,341,408 B2 1/2002 Bureau et al.
6,396,199 B1 5/2002 Douglas et al.
6,551,248 B2 4/2003 Miller
6,685,657 B2 2/2004 Jones
6,776,051 B2 8/2004 Suzuki et al.

(Continued)

FOREIGN PATENT DOCUMENTS

DE 37 21 209 C2 1/1989

(Continued)

OTHER PUBLICATIONS

Notice of preliminary rejection from Koran Patent Office issued on Aug. 17, 2006 for Korean patent application No. 10-2005-0078374 (corresponds to U.S. Appl. No. 11/208,724).

(Continued)

*Primary Examiner*—Quyen P Leung
*Assistant Examiner*—Derek J Rosenau
(74) *Attorney, Agent, or Firm*—Posz Law Group, PLC

(57) ABSTRACT

An ultrasonic sensor includes a plurality of converters and a protection component. The plurality of converters convert one of a received ultrasonic wave into an electric signal and an electric signal into an ultrasonic wave for transmission. The plurality of converters are juxtaposed. The protection component protects each of the converters.

11 Claims, 32 Drawing Sheets

U.S. PATENT DOCUMENTS

| | | | |
|---|---|---|---|
| 6,891,314 | B2 | 5/2005 | Sato et al. |
| 6,894,425 | B1 * | 5/2005 | Solomon et al. ............ 310/334 |
| 6,972,510 | B2 | 12/2005 | Klee et al. |
| 7,087,264 | B2 | 8/2006 | Suzuki et al. |
| 2003/0112298 | A1 | 6/2003 | Sato et al. |
| 2003/0141783 | A1 | 7/2003 | Klee et al. |
| 2006/0006765 | A1 | 1/2006 | Yuk |

FOREIGN PATENT DOCUMENTS

| | | |
|---|---|---|
| DE | 43 20 549 | 7/1994 |
| JP | A-2003-284182 | 10/2003 |

OTHER PUBLICATIONS

Office Action from German Patent Office issued on Oct. 18, 2006 for the corresponding German patent application No. 10 2005 040 081. 7-35 (a copy and English translation thereof).

Etienne-Cummings et al., Ralph. "Architecture for Source Localization with a Linear Ultrasonic Array." *IEEE International Symposium on Circuits and Systems.* (2001) vol. 3: pp. 181-184.

Office Action dated Jul. 11, 2008 in corresponding Chinese application No. 2005100977084 (and English Translation).

Office Action dated Jul. 23, 2008 in corresponding German application No. 10 2005 040 081.7-35 (and English Translation).

* cited by examiner

ULTRASONIC SENSOR

CROSS REFERENCE TO RELATED APPLICATIONS

This application is a continuation of application Ser. No.: 11/586,561 filed on Oct. 26, 2006 now U.S. Pat. No. 7,329,975 which is a continuation of application Ser. No. 11/208,724 filed on Aug. 23, 2005 now abandoned. This application is also based upon and claims the benefit of priority of Japanese Patent Application No. 2004-245541, filed on Aug. 25, 2004 and Japanese Patent Application No. 2005-42449, filed on Feb. 18, 2005, the contents of which are incorporated herein by reference.

FIELD OF THE INVENTION

The present invention relates to an ultrasonic sensor and, more particularly, to an ultrasonic sensor for converting a received ultrasonic wave into an electric signal or an electric signal into an ultrasonic wave so as to transmit it.

BACKGROUND

Recently, a technique of monitoring the vicinity of a vehicle for the purpose of driving safety has been developed. According to this technique, an ultrasonic sensor is mounted in the vehicle, which may include an automobile. The ultrasonic sensor receives a reflected wave of an ultrasonic wave harmless to a human body, which is transmitted from the ultrasonic sensor, so as to measure the position of or a distance from an object present in the vicinity of the automobile, a two-dimensional shape, or a three-dimensional shape of the object and the like.

For example, the following automatic parking system has been put into practical use. An ultrasonic sensor is mounted in a rear part of an automobile. A device, generally called "a back sonar," is used while reversing the automobile into a parking space to avoid the collision with an object. The "back sonar" is for detecting the object, which may include a human or another obstacle, present behind the automobile.

As an ultrasonic sensor used for the above-described usage, a piezoelectric or a capacitive (condenser) ultrasonic sensor fabricated by employing a Micro Electro Mechanical Systems (MEMS) technique is known.

For example, a technique of juxtaposing a plurality of ultrasonic sensor elements has been disclosed as a piezoelectric ultrasonic sensor employing the MEMS technique. Each of the ultrasonic sensor elements is composed of a piezoelectric sensor, which includes a ferroelectric member interposed between a pair of electrodes. The piezoelectric sensor has a predetermined resonance frequency to detect an ultrasonic wave. Such a device is disclosed in Japanese Patent Laid-Open Publication No. 2003-284182.

The ultrasonic sensor disclosed in the above publication includes a piezoelectric element, which serves as a piezoelectric sensor, formed on a semiconductor chip having a "Silicon On Insulator" (SOI) structure. The piezoelectric element includes a thin film made of a PZT (lead zirconate titanate) ceramic corresponding to a ferroelectric material interposed between two thin electrode layers including an upper electrode layer and a lower electrode layer.

Therefore, each of the electrode layers and the PZT ceramic thin film have a low mechanical strength. As a result, there arises a problem that each of the electrode layers or the PZT ceramic thin film is vulnerable to damage upon application of an external force to the upper electrode layer so that the piezoelectric element is likely to be broken.

On the other hand, the capacitive ultrasonic sensor using the MEMS technique includes: a fixed electrode layer formed on a semiconductor chip; and a thin movable electrode layer provided on the fixed electrode layer through a gap. The fixed electrode layer and the movable electrode layer form a capacitive element.

With the above structure, the movable electrode layer has a low mechanical strength. Therefore, there arises a problem that the movable electrode layer is vulnerable to damage upon application of an external force to the movable electrode layer so that the capacitive electrode is likely to be broken.

As described above, the conventional piezoelectric or capacitive ultrasonic sensors fabricated by employing the MEMS technique are likely to be damaged under the application of an external force. Therefore, it is difficult to mount the conventional ultrasonic sensor in an automobile as external equipment.

SUMMARY

The present invention was devised to solve the above-described and other problems and to provide a robust ultrasonic sensor that that can withstand the application of an external force.

An ultrasonic sensor according to a first aspect of the present invention includes a plurality of conversion means and a protection means. The plurality of conversion means are for converting one of a received ultrasonic wave and an electric signal to the other of the electric signal and the ultrasonic wave for transmission. The plurality of conversion means are juxtaposed. The protection means is for protecting each of the conversion means.

An ultrasonic sensor according to a second aspect of the present invention is characterized in that the protection means includes a protective film provided in front of each of the plurality of conversion means and a first gap is provided between the protective film and the conversion means.

An ultrasonic sensor according to a third aspect of the present invention is characterized in that the first gap is filled with a filler selected from a liquid, a sol, and a gel.

An ultrasonic sensor according to a fourth aspect of the present invention is characterized in that the ultrasonic sensor includes a vent hole for bringing the first gap and exterior into communication with each other.

An ultrasonic sensor according to a fifth aspect of the present invention includes separation means for separating the conversion means and the first gap located in front of the conversion means and the protective film for each of the conversion means.

An ultrasonic sensor according to a sixth aspect of the present invention includes a housing member for housing each of the plurality of the conversion means therein; a second gap surrounded by the housing member and the conversion means; and a vent hole for bringing the second gap and exterior into communication with each other.

An ultrasonic sensor according to a seventh aspect of the present invention is characterized in that the conversion means is a transmission element for converting an electric signal into an ultrasonic wave for transmission.

An ultrasonic sensor according to an eighth aspect of the present invention includes a housing member for housing each of the plurality of conversion means therein; and a second gap corresponding to a sealed space surrounded by the housing member and the conversion means.

An ultrasonic sensor according to a ninth aspect of the present invention is characterized in that the second gap is filled with a filler selected from a liquid, a sol, and a gel.

An ultrasonic sensor according to a tenth aspect of the present invention is characterized in that each of the conversion means is a receiving element for converting a received ultrasonic wave into an electric signal.

An ultrasonic sensor according to an eleventh aspect of the present invention includes a transfer member for independently connecting each of the conversion means and the protective film with each other for each of the conversion means.

An ultrasonic sensor according to a twelfth aspect of the present invention includes a protective member attached to and fixed in front of each of the plurality of conversion means, the protective member being provided for each of the conversion means, a clearance being provided between the protective members, and the clearance serving to separate the protective members from each other for each of the conversion means.

An ultrasonic sensor according to a thirteenth aspect of the present invention includes an acoustic horn provided in front of each of the plurality of conversion means, wherein the acoustic horn is provided for each of the conversion means so as to have a gradually increasing sectional area from a throat provided in front of each of the conversion means toward an opening.

An ultrasonic sensor according to a fourteenth aspect of the present invention is characterized in that each of the conversion means is formed on a surface of a semiconductor substrate, the surface side of the semiconductor substrate being regarded as the front side of each of the conversion means so as to serve as any one of a receiving surface and a transmission surface of an ultrasonic wave, a bonding wire is connected to the surface side of the semiconductor substrate, and each of the conversion means is surface-mounted on a sensor substrate by a wire bonding method through the bonding wire.

An ultrasonic sensor according to a fifteenth aspect of the present invention is characterized in that each of the conversion means is formed on a surface of a semiconductor substrate, a bottom side of the semiconductor substrate being regarded as the front side of each the conversion means so as to serve as any one of a receiving surface and a transmission surface of an ultrasonic wave, a bump is connected to the surface side of the semiconductor substrate, and each of the conversion means is surface-mounted on a sensor substrate by flip-chip connection through the bump.

An ultrasonic sensor according to a sixteenth aspect of the present invention is characterized in that each of the conversion means is any one of a piezoelectric conversion type and a capacitive conversion type.

According to the first aspect of the present invention, the conversion means is composed of the receiving element for converting the received ultrasonic wave into the electric signal or the electric signal into the ultrasonic wave so as to transmit it. The plurality of conversion means are juxtaposed.

Moreover, according to the first aspect of the present invention, the protection means for protecting each of the conversion means is provided. Therefore, even if each of the conversion means has a low mechanical strength, it becomes possible to prevent the conversion means from being damaged so as to be hardly broken. As a result, a robust ultrasonic sensor can be obtained.

According to the second aspect of the present invention, the protective film is provided in front of the plurality of the conversion means, and the first gap is provided between the protective film and the conversion means. Therefore, even if an external force is applied to the ultrasonic sensor, the external force is applied only to the protective film but not directly to each of the conversion means.

Thus, according to the second aspect of the present invention, even if each of the conversion means has a low mechanical strength, it is possible to prevent the conversion means from being damaged so that the conversion means is hardly broken, thereby obtaining a robust ultrasonic sensor.

Therefore, the ultrasonic sensor according to the second aspect of the present invention can be mounted in an automobile as external equipment without any modification. If the ultrasonic sensor is to be mounted in an automobile as external equipment of an automobile, it is necessary to use a highly weather-resistant material for the protective film. Examples of such a material include various metals (such as an aluminum alloy), various synthetic resins, glasses, rubbers, and the like.

According to the third aspect of the present invention, an acoustic impedance of the filler selected from a liquid, a sol, and a gel filling the first gap is brought close to that of the protective film. As a result, the propagation of oscillation of the protective film to each of the conversion means through the filler can be ensured so as to enhance receiving sensitivity in the case where each of the conversion means is used as a receiving element.

The acoustic impedance of a material corresponds to a product of a density of the material and a propagation acoustic speed. Then, as a difference in acoustic impedance between materials becomes larger, the propagation characteristic of an acoustic wave is degraded. Specifically, as a difference in acoustic impedance between the filler in the first gap and the protective film becomes greater, an ultrasonic wave is reflected by the protective film so as to be less likely to propagate to the filler.

Therefore, if a synthetic resin film is used as the protective film, a sol obtained by dispersing fine particles of the synthetic resin in a liquid or a polymer gel made of the synthetic resin is used as the filler. Moreover, the filler is required not to affect the conversion means. Examples of the filler meeting such a requirement include a silicon gel, a fluorine gel, and the like.

As an example, if the first gap is filled with one of various gases (air, an inert gas, and the like), the oscillation of the protective film does not satisfactorily propagate to each of the conversion means because the gas has an acoustic impedance extremely smaller than that of the protective film. Accordingly, there is a possibility that receiving sensitivity is lowered when each of the conversion means is used as a receiving element.

If air remains in the first gap, the oscillation of the protective film is less likely to propagate to each of the conversion means. Therefore, it is desirable to completely remove air from the first gap so as to fill the first gap with the filler.

If each of the conversion means is used as a transmission element, the acoustic impedance of the filler selected from a liquid, a sol, and a gel filling the first gap is brought close to that of the protective film. As a result, the propagation of oscillation of the transmission element through the filler to the protective film can be ensured, thereby enhancing a transmission output of the transmission element.

Moreover, if the first gap is filled with one of various gases, the oscillation of the transmission element does not satisfactorily propagate to the protective film because the acoustic impedance of the gas is extremely smaller than that of the protective film. As a result, there is a possibility that a transmission output of the transmission element becomes low.

Moreover, if the first gap is filled with the filler such as a liquid, a sol, or a gel, it is desirable to completely remove air from the first gap so as to fill the first gap with the filler because the oscillation of the transmission element is less likely to propagate to the protective film if air remains in the first gap.

According to the fourth aspect of the present invention, when the filler in the first gap contains air bubbles, it is possible to remove the air bubbles from the first gap through the vent hole to the exterior.

Specifically, if the filler in the first gap contains air bubbles, the air bubbles make it hard to propagate the oscillation of the protective film to each of the conversion means.

On the other hand, according to the fourth aspect of the present invention, since the air bubbles are removed through the vent hole, it becomes possible to completely fill the first gap with the filler. Therefore, if each of the conversion means is used as a receiving element, the receiving sensitivity can be prevented from being lowered by the presence of air bubbles contained in the filler in the first gap.

If each of the conversion means is used as a transmission element, it becomes possible to completely fill the first gap with the filler because the air bubbles contained in the filler in the first gap are removed through the vent hole. In this manner, the propagation of oscillation of the transmission element through the filler to the protective film can be ensured to prevent the transmission output of the transmission element from being lowered.

According to the fifth aspect of the present invention, the oscillation of a single protective film separated by the separation means propagates only to the conversion means through the first gap situated below the protective film but not to the other conversion means.

Therefore, according to the fifth aspect of the present invention, the propagation of an ultrasonic wave to each of the conversion means can be performed in a completely separate manner. Therefore, a crosstalk characteristic of each of the conversion means can be prevented from being degraded. Alternatively, a plurality of adjacent conversion means can be grouped into one. Separation means may be provided for each group of the conversion means so as to separate the corresponding group from the other groups.

The separation means has to surely block the oscillation of the protective film, the first gap, and the conversion means, which are vertically provided so as to be grouped into one, so that the oscillation does not propagate to members of the other adjacent groups.

For this reason, a material having a high oscillation blocking property is required to be used for the separation means. Examples of the material include rubbers.

According to the sixth aspect of the present invention, since the oscillation of each of the conversion means is not inhibited, receiving sensitivity when each of the conversion means is used as a receiving element can be prevented from being lowered.

Specifically, if a vent hole is not provided for the second gap, the second gap forms a sealed space. Air filling the sealed space acts as a spring so as to apply a damping force due to air onto the back face side of each of the conversion means. As a result, the free oscillation of each of the conversion means is inhibited.

On the other hand, according to the sixth aspect of the present invention, air passes through the vent hole. Accordingly, no damping force due to air is applied onto the back face side of each of the conversion means. As a result, each of the conversion means is capable of freely oscillating.

If each of the conversion means is used as a transmission element, air passes through the vent hole of the second gap. Therefore, no damping force due to air is applied to the back face side of a transmission surface of the transmission element for transmitting an ultrasonic wave. As a result, the transmission surface can freely oscillate without inhibiting the oscillation. Therefore, the transmission output of the transmission element can be increased.

To obtain satisfactory functions and effects described above, the number, the position, the shape, and the size of the vent hole may be set by experimentally finding their optimal values in a cut-and-try method.

When air passes through the vent hole of the second gap, no damping force due to air is applied onto the back face side of the transmission element so as not to inhibit the free oscillation of the transmission surface. Accordingly, a resonance value Q of the transmission element (a diaphragm of the conversion means) is increased.

The resonance value Q of the transmission element and the transmission output are positively correlated with each other. Thus, as the resonance value Q increases, the transmission output becomes greater.

The transmission element including a piezoelectric element or a capacitive element fabricated by employing the MEMS technique is not suitable for the transmission element because of its small transmission output of an ultrasonic wave. Therefore, such a transmission element is required to increase the transmission output as much as possible.

Thus, the seventh aspect of the present invention can demonstrate the functions and effects of the sixth aspect particularly when the aspect is embodied as the transmission element fabricated by employing the MEMS technique.

According to the eighth aspect of the present invention, air filling the second gap corresponding to the sealed space acts as a spring so as to apply a damping force due to air onto the back face side of each of the conversion means. As a result, since the free oscillation of each of the conversion means is inhibited, the resonance value Q of the diaphragm of the conversion mean is reduced.

Moreover, according to the sixth aspect of the present invention, if each of the conversion means is used as a receiving element, the receiving sensitivity is lowered because the oscillation of each of the conversion means is inhibited.

According to the ninth aspect of the present invention, by filling the second gap with a material for suppressing the oscillation of the diaphragm of the conversion means (for example, a liquid, a sol, a gel, or the like), the diaphragm of the conversion means can be prevented from excessively oscillating to be broken.

The resonance value Q of the receiving element and the receiving sensitivity are positively correlated with each other. Thus, as the resonance value Q increases, the receiving sensitivity becomes greater.

Herein, a plurality of receiving elements have a fluctuation in primary resonance frequency due to a fabrication process.

If the resonance value Q of the receiving element is increased, the receiving sensitivity is increased. However, since the receiving sensitivity exhibits a steep characteristic with respect to a change in frequency, the receiving sensitivity suddenly drops at a frequency offset from the primary resonance frequency even if the offset is slight.

On the contrary if the resonance value Q of the receiving element is set small, the receiving sensitivity become correspondingly low. However, since the receiving sensitivity exhibits a gentle characteristic with respect to a change in frequency, the receiving sensitivity does not greatly drop even at a frequency far from the primary resonance frequency.

The receiving element comprising a piezoelectric element or a capacitive element fabricated by employing the MEMS technique is suitable for a receiving element because of its high receiving sensitivity of an ultrasonic wave. Therefore, it is necessary to increase the receiving sensitivity over a broad frequency range as much as possible rather than to increase the receiving sensitivity at the primary resonance frequency.

Therefore, the tenth aspect of the present invention can demonstrate the functions and effects of the eighth aspect particularly when the aspect is embodied as a receiving element fabricated by employing the MEMS technique.

According to the tenth aspect of the present invention, by filling the second gap with a material for suppressing the oscillation of the diaphragm of the conversion means, the resonance value Q of the diaphragm of the conversion means can be reduced as compared with the case where the second gap is filled with air.

Accordingly, if the filler in the second gap is appropriately selected, a desired resonance characteristic can be obtained without changing the structure of the receiving element.

According to the eleventh aspect of the present invention, when an ultrasonic wave oscillates the protective film, the oscillation of the protective film propagates to each of the conversion means through each of the transfer members.

Herein, since the transfer member is provided for each of the conversion means, the oscillation of an arbitrary transfer member never propagates to the other transfer members. As a result, since the reception or transmission of an ultrasonic wave can be performed in a separated manner for each of the conversion means, a crosstalk characteristic of each of the conversion means can be prevented from being degraded.

Moreover, the acoustic impedance of each of the transfer members is brought close to that of the protective film. As a result, the propagation of oscillation of the protective film to each of the conversion means can be ensured, thereby enhancing the receiving sensitivity in the case where each of the conversion means is used as a receiving element.

Furthermore, the acoustic impedance of each of the transfer members is brought close to that of the conversion means. As a result, the propagation of oscillation of each of the transfer members to each of the conversion means can be ensured, thereby enhancing the receiving sensitivity in the case where each of the conversion means is used as a receiving element.

Therefore, it is desirable that the transfer member be made of the same material as that of the protective film or the conversion means.

If each of the conversion means is used as a transmission element, the propagation of oscillation of the transfer member to the protective film can be ensured by bringing the acoustic impedance of the transfer member close to that of the protective film. As a result, the transmission output of the transmission element can be increased.

Moreover, if each of the conversion means is used as a transmission element, the propagation of oscillation of the transmission element to the transfer member can be ensured by bringing the acoustic impedance of the transfer member close to that of the transmission element. As a result, the transmission output of the transmission element can be increased.

According to the twelfth aspect of the present invention, if each of the conversion means is used as a receiving element, the oscillation of the protective member propagates to the receiving element when an ultrasonic wave oscillates the protective member because the protective film is attached and fixed in front of the receiving element.

On the other hand, according to the twelfth aspect of the present invention, if each of the conversion means is used as a transmission element, the oscillation of the transmission element propagates to the protective member when the transmission element oscillates because the protective member is attached and fixed in front of the transmission element. As a result, the protective member oscillates to transmit an ultrasonic wave.

Herein, since each of the conversion means is reinforced by the protective member, each of the conversion means can be prevented from being damaged so as to be hardly broken even if an external force is applied to the ultrasonic sensor. As a result, a robust ultrasonic sensor can be obtained.

Therefore, the ultrasonic sensor according to the twelfth aspect of the present invention can be mounted as external equipment of an automobile without any modification. If the ultrasonic sensor is mounted as external equipment of an automobile, it is necessary to use a highly weather-resistant material for the protective member. Examples of the material include various metals (such as an aluminum alloy), various synthetic resins, glasses, rubbers, and the like.

As a method of attaching and fixing the protective member to each of the conversion means, any method (for example, thermal welding, ultrasonic welding, bonding with an adhesive, and the like) may be used.

According to the thirteenth aspect of the present invention, an acoustic horn is provided for each of the conversion means. As a result, each of the conversion means can be imparted with directivity of a receiving direction or a transmitting direction of an ultrasonic wave.

Specifically, each of the acoustic horns has acute directivity on its horn axis. Therefore, by forming the acoustic horns to have the same size and shape, the directivity of each of the conversion means can be the same if the horn axes of the acoustic horns are set in the same direction. Moreover, in the case where the horn axes of the acoustic hones are set to be in arbitrary different directions by changing the size and shape of each of the acoustic horns, the directivity of each of the conversion means can also be set in an arbitrary direction.

A horn wall member of each of the acoustic horns is required to be formed of a material having enough strength to hardly cause oscillation by an ultrasonic wave. Examples of the material include various metals, various synthetic resins, and the like.

According to the fourteenth aspect of the present invention, the ultrasonic sensor formed by surface-mounting each of the conversion means on a sensor substrate by using wire bonding can be obtained.

According to the fifteenth aspect of the present invention, each of the conversion means and the sensor substrate are connected and fixed to each other through a bump. Therefore, since it can be ensured to keep the electric connection between each of the conversion means and the sensor substrate, the reliability of the ultrasonic sensor can be enhanced while extending a lifetime of the ultrasonic sensor.

Moreover, by employing flip-chip connection, the fabrication cost for surface-mounting each of the conversion means onto the sensor substrate can be reduced as compared with the case where the wire bonding is employed.

In the case where each of the conversion means is used as a receiving element, a bonding wire is not provided above the receiving surface of an ultrasonic wave and therefore no obstacle is present in front of the receiving surface. Therefore, the ultrasonic wave is not inhibited from getting to the receiving surface, thereby enhancing the receiving sensitivity of the receiving element. Moreover, since a bonding wire is not provided above the receiving surface of the receiving element, the bonding wire is not cut by an ultrasonic wave received by the receiving element.

Moreover, in the case where each of the conversion means is used as a transmission element, a bonding wire is not provided above the transmission surface of the transmission element and therefore no obstacle is present in front of the transmission surface. Therefore, the ultrasonic wave is not inhibited from being transmitted from the transmission surface, thereby enhancing the transmission output of the transmission element. Moreover, since a bonding wire is not provided above the transmission surface of the receiving element, the bonding wire is not cut by an ultrasonic wave transmitted from the transmission element.

Furthermore, since an inductance of the bump is reduced as compared with that of the bonding wire, a transfer rate of an electric signal in each of the conversion means can be increased.

Moreover, it is no longer necessary to provide an electrode pad to which the bonding wire is connected. Since the sensor substrate is reduced by an area occupied by the electrode pad, the ultrasonic sensor can be reduced in size as well as in weight.

In addition, according to the fifteenth aspect of the present invention, if a thickness of the diaphragm of each of the conversion means is reduced by forming a concave portion on the bottom face side of a semiconductor substrate so as to facilitate the oscillation of each of the conversion means, the functions and effects of the thirteenth aspect of the invention can be easily obtained without providing the acoustic horn as an independent member.

Moreover, since the acoustic horn is not required to be provided as an independent member, the fabrication cost can be reduced. At the same time, the ultrasonic sensor can be reduced in size as well as in weight.

According to the sixteenth aspect of the present invention, a piezoelectric or capacitive ultrasonic sensor can be obtained.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Figure 1:
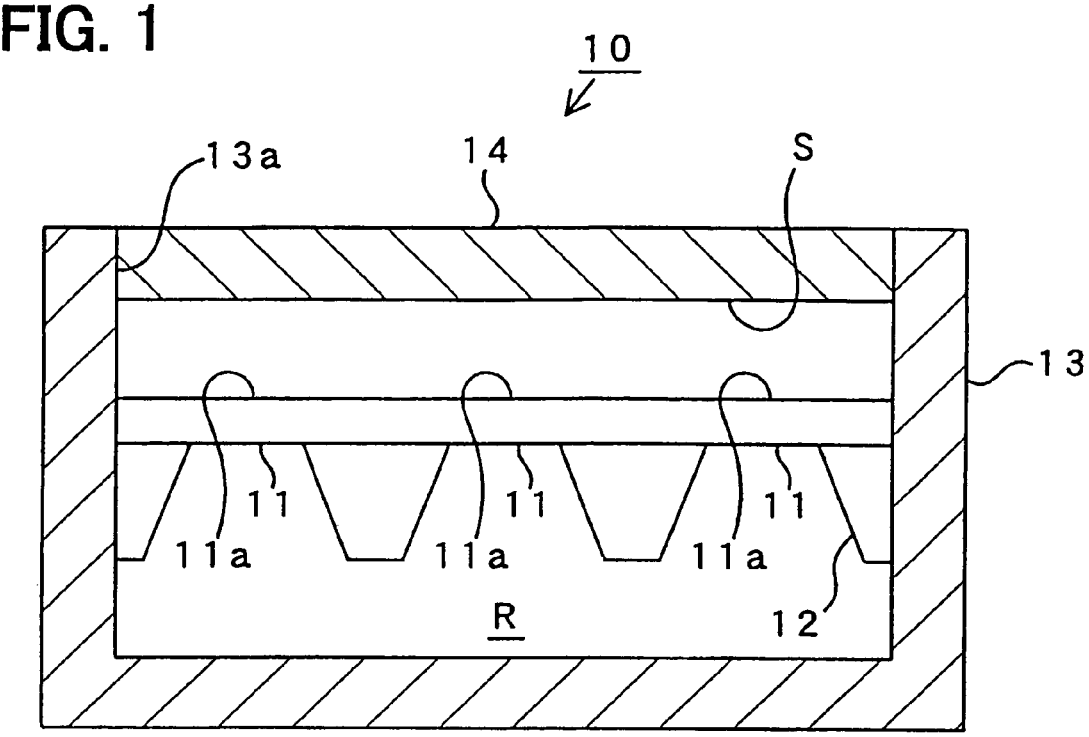
FIG. 1 is a cross-sectional side view of a receiving section of an ultrasonic sensor according to a first embodiment of the present invention.

Hereinafter, embodiments where the present invention is embodied will be described with reference to the accompanying drawings. In the embodiments, the same components are denoted by the same reference numerals, and the description of the same contents is herein omitted.

Embodiment 1

FIG. 1 is a cross-sectional side view showing a receiving section 10 in an ultrasonic sensor M according to Embodiment 1.

The receiving section 10 includes a plurality of piezoelectric receiving elements 11 arranged in an array. In an example shown in FIG. 1, a cross-sectional side view of three receiving elements 11 is shown.

Each of the receiving elements 11 is formed on a single-crystalline silicon substrate (a single-crystalline silicon chip) 12 having an SOI structure.

The substrate 12 is housed within a housing member 13 having a rectangular parallelepiped box shape with an upper open end. Moreover, an outer circumferential end of the substrate 12 is attached and fixed to an inner wall of the housing member 13 by an appropriate method (for example, thermal welding, ultrasonic welding, bonding with an adhesive or the like) so as to air-seal a connection part between the outer circumferential end of the substrate 12 and the housing member 13.

Each of the receiving elements 11 is located so that a receiving surface 11a for receiving an ultrasonic wave is oriented toward an opening 13a of the housing member 13.

A protective film 14 for closing the opening 13a is attached over the opening 13a of the housing 13. Specifically, the protective film 14 is provided in front of the receiving elements 11.

An outer circumferential end of the protective film 14 is attached and fixed to an inner circumferential end of the opening 13a of the housing member 13 by the above-described appropriate method so as to air-seal a connection part between the outer circumferential end of the protective film 14 and the housing member 13.

The protective film 14 is a thin film made of a material that is likely to be oscillated by an ultrasonic wave. Although the material of the protective film 14 transmits an ultrasonic wave without refraction, it does not transmit air, dust, water and the like.

A gap S is provided between the protective film 14 and the substrate 12. The gap S is filled with a gas, a liquid, a sol, a gel or the like.

A gap R surrounded by the back face side (the bottom face side) of the substrate 12 and the housing member 13 is filled with air.

Figure 2:
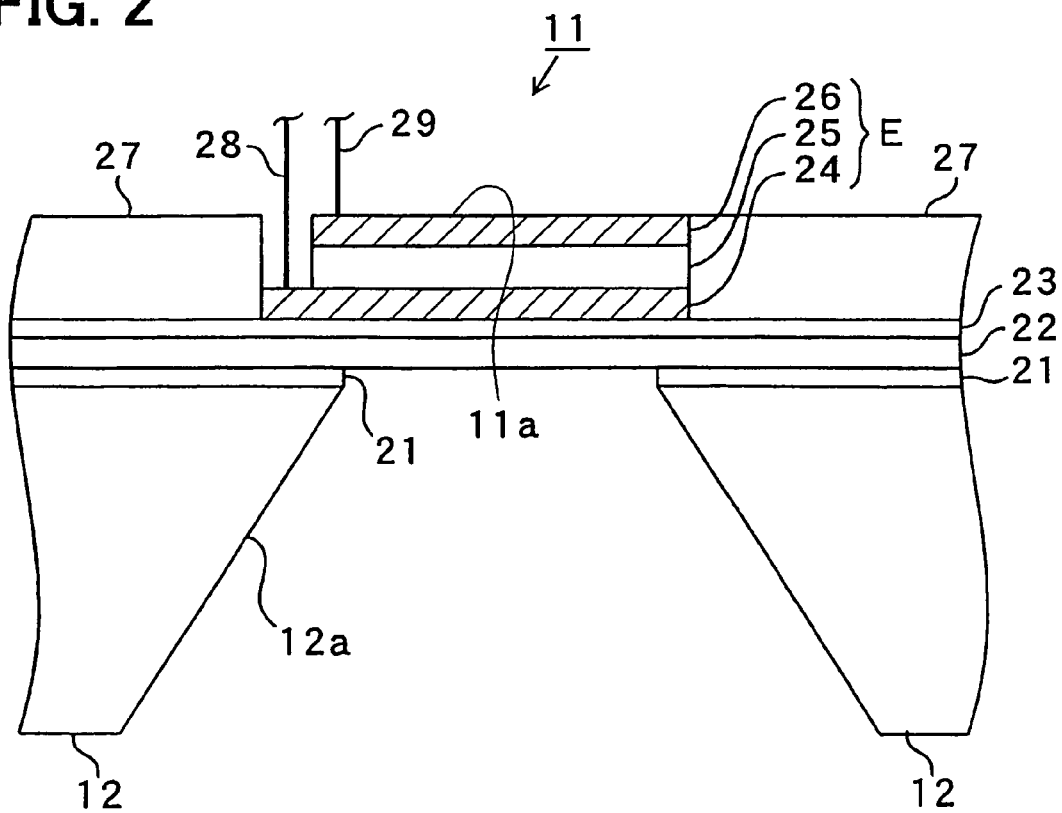
FIG. 2 is an enlarged cross-sectional side view of a piezoelectric receiving element of the receiving section of FIG. 1.

FIG. 2 is an enlarged cross-section side view showing one piezoelectric receiving element 11.

A through hole 12a passing through the substrate 12 is formed in the substrate 12.

On a surface of the substrate 12, an insulating layer 21, a silicon active layer 22, and an insulating layer 23 are formed in this order. Each of the layers 22 and 23 is formed to close the upper opening of the through hole 12a.

On a surface of the insulating layer 23 situated above (in front of) the through hole 12a, a lower electrode layer 24, a thin film layer 25 made of a ferroelectric (for example, PZT or the like), and an upper electrode layer 26 are formed in this order.

An insulating layer 27 is formed around the layers 24 to 26. Surfaces of the insulating layer 27 and the upper electrode layer 26 (a device surface) are evened.

A bonding wire (a lead wire) 28 is connected to the lower electrode layer 24, whereas a bonding layer 29 is connected to the upper electrode layer 26.

In the above-described manner, a piezoelectric element (a piezoelectric sensor) E having a structure in which the ferroelectric thin film layer 25 is sandwiched between the two thin electrode layers 24 and 26 is formed. The receiving element 11 includes the piezoelectric element E fabricated by employing the MEMS technique.

Moreover, a receiving surface 11a of the receiving element 11 is formed by the surface of the upper electrode layer 26.

When the thin film layer 25 is oscillated by an ultrasonic wave, an electric signal is generated by a piezoelectric effect. The thus generated electric signal is output from each of the electrodes 24 and 26 through the bonding wires 28 and 29.

The through hole 12a is provided so as to facilitate the oscillation of a diaphragm composed of the layers 22 to 26.

Figure 3:
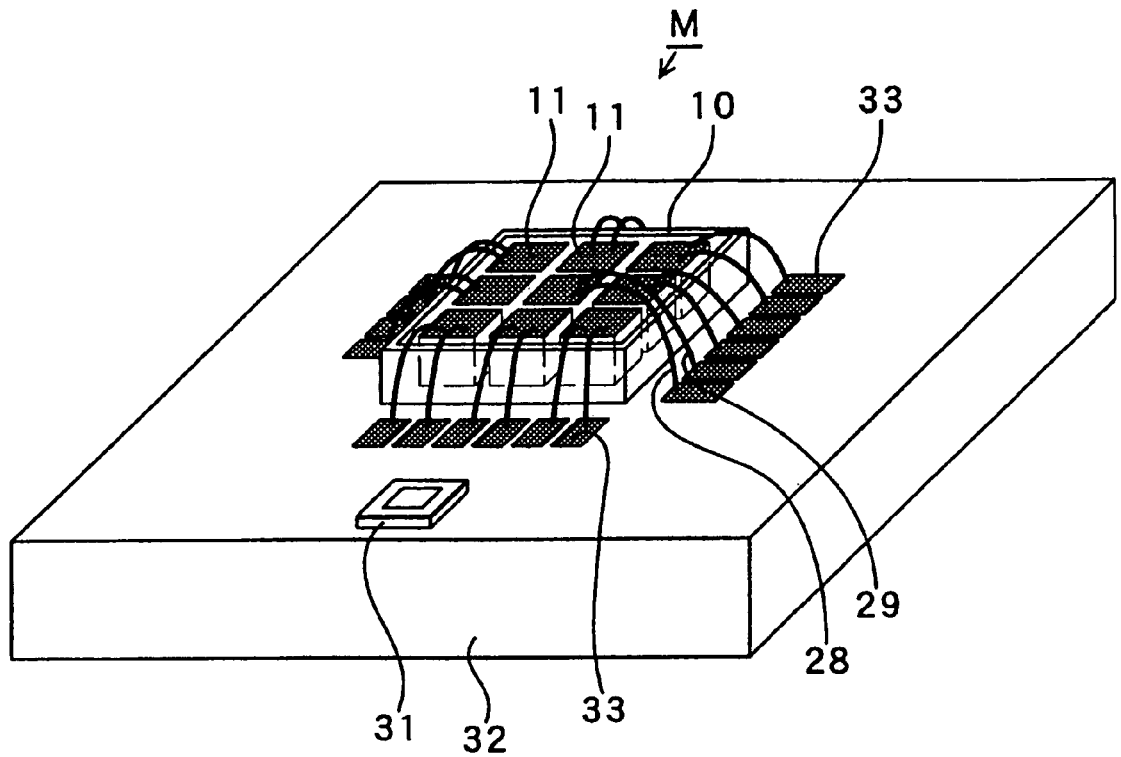
FIG. 3 is a perspective view of a first ultrasonic sensor according to the principles of the present invention.

FIG. 3 is a perspective view showing the ultrasonic sensor M.

The ultrasonic sensor M is composed of a hybrid IC (Integrated Circuit) including: a receiving section 10; a transmission section 31; a sensor substrate 32; and electrode pads 33.

The sensor substrate 32 is a printed wiring board. A plurality of electrode pads 33 are formed on a surface of the sensor substrate 32 formed of an insulating plate material while the receiving section 10 and the transmission section 31 corresponding to chip parts are attached and fixed thereto.

A tip of each of the bonding wires 28 and 29 led from each of the receiving elements 11 in the receiving section 10 is connected to each of the electrode pads 33.

In the example shown in FIG. 3, the receiving section 10 is constituted by nine receiving elements 11 arranged 3 by 3.

The transmission section 31 has the same structure as that of the receiving section 10. The transmission section 31 includes a single piezoelectric transmission element having the same structure as that of the receiving element 11. The thin film layer 25 oscillates due to the piezoelectric effect to produce an ultrasonic wave in accordance with input signals applied from the electrode layers 24 and 26 to the thin film layer 25 made of a ferroelectric. In this case, the receiving surface 11a of the receiving element 11 acts as a transmission surface for transmitting the ultrasonic wave from the transmission element.

Specifically, the transmission element of the transmission section 31 converts an electric signal into an ultrasonic wave so as to transmit it.

Then, the transmission section 31 transmits an ultrasonic wave in accordance with an input signal from the exterior. A reflection sound generated by the ultrasonic wave reflected by an object to be detected is received by each of the receiving elements 11 in the receiving section 10.

Specifically, each of the receiving elements 11 in the receiving section 10 converts the received ultrasonic wave into an electric signal.

The ultrasonic wave-transmitted from the transmission section 31 and the ultrasonic wave received by each of the receiving elements 11 in the receiving section 10 are compared with each other so as to obtain an acoustic pressure difference, a time difference, and a phase difference between them. As a result, the position of the object to be detected, a distance between the ultrasonic sensor M and the object to be detected, a two-dimensional or three-dimensional shape of the object to be detected and the like can be measured based on the obtained differences.

Functions and Effects of Embodiment 1

According to Embodiment 1, the following functions and effects can be obtained.

[1-1]

The protective film 14 is provided in front of the substrate 12 on which the receiving elements 11 are formed. The gap S is provided between the protective film 14 and the substrate 12.

Therefore, even if an external force is applied to the receiving section 10 of the ultrasonic sensor M, the external force is applied merely to the protective film 14 but not directly to each of the thin layers 22 to 26 formed on the substrate 12.

Therefore, according to Embodiment 1, even if each of the thin layers 22 to 26 has a low mechanical strength, each of the layers 22 to 26 can be prevented from being damaged so as to be unlikely to break the receiving section 10. As a result, the robust receiving section 10 can be obtained.

Moreover, since the transmission element of the transmission section 31 has the same structure as that of the receiving element 11, each of the layers 22 to 26 can be prevented from being damaged so that the transmission section 31 is hardly broken. As a result, the robust transmission section 31 can be obtained.

Therefore, the ultrasonic sensor M including the receiving section 10 and the transmission section 31 can be mounted as external equipment of an automobile without any modification. If the ultrasonic sensor M is to be mounted as external equipment of an automobile, it is necessary to use a highly weather-resistant material for the protective film 14. Examples of the material include various metals (such as an aluminum alloy), various synthetic resins, glasses, rubbers, and the like.

[1-2]

In the case where the gap S between the protective film 14 and the substrate 12 is filled with a filler selected from a liquid, a sol and a gel, an acoustic impedance of the filler is brought close to that of the protective film 14, so that it becomes possible to propagate the oscillation of the protective film 14 through the filler to each of the receiving elements 11. As a result, the receiving sensitivity of each of the receiving elements 11 can be enhanced.

The acoustic impedance of a material is a product of a density of the material and a propagation acoustic speed. Then, as a difference in acoustic impedance between materials becomes larger, the propagation characteristic of an acoustic wave is degraded. Specifically, as a difference in acoustic impedance between the filler in the gap S and the protective film 14 becomes greater, an ultrasonic wave is reflected by the protective film 14 so as be less likely to propagate to the filler.

Therefore, if a synthetic resin film is used as the protective film 14, a sol obtained by dispersing fine particles of the synthetic resin in a liquid or a polymer gel made of the synthetic resin is used as the filler. Moreover, the filler is required not to affect the receiving elements 11. Examples of the filler meeting such a requirement include a silicon gel, a fluorine gel, and the like.

In order to fill the gap S with the filler, after the attachment of the protective film 13 onto the housing member 13, the filler is injected into the gap S while removing air from the gap S.

Alternatively, after the substrate 12 is housed within the housing member 13 and the filler is then poured on the substrate 12 through the upper opening of the housing member 13, the protective film 14 may be attached onto the housing member 13.

Further alternatively, after the filler is dropped onto the substrate 12, the substrate 12 is rotated so as to form a thin film made of the filler on the surface of the substrate 12 by spin coating. Subsequently, the substrate 12 may be housed within the housing member 13.

As an example, if the gap S is filled with one of various gases (air, an inert gas and the like), the oscillation of the protective film 14 does not satisfactorily propagate to the receiving elements 11 because the gas has an acoustic impedance extremely smaller than that of the protective film 14. Accordingly, there is a possibility that the receiving sensitivity of each of the receiving elements 11 is lowered.

In the case where the gap S is filled with the filler such as a liquid, a sol, and a gel, the oscillation of the protective film 14 is less likely to propagate to the receiving elements 11 if air remains in the gap S. Therefore, it is desirable to completely remove air from the gap S so as to fill the gap S with the filler.

If the gap S between the protective film 14 and the substrate 12 is filled with the filler selected from a liquid, a sol and a gel, the propagation of oscillation of the transmission element through the filler to the protective film 14 can be ensured by bringing the acoustic impedance of the filler close to that of the protective film 14 because the transmission element in the transmission section 31 has the same structure as that of the receiving element 11. As a result, a transmission output of the transmission element can be enhanced.

Moreover, if the gap S is filled with one of various gases, the oscillation of the transmission element does not satisfactorily propagate to the protective film 14 because the acoustic impedance of the gas is extremely smaller than that of the protective film 14. Therefore, there is a possibility that a transmission output of the transmission element becomes low.

Moreover, in the case where the gap S is filled with the filler such as a liquid, a sol and a gel, it is desirable to completely remove air from the gap S so as to fill the gap S with the filler because the oscillation of the transmission element is less likely to propagate to the protective film 14 if air remains in the gap S.

[1-3]

In the example shown in FIG. 3, the ultrasonic sensor includes the receiving section 10 including nine receiving elements 11 (piezoelectric elements E). However, the number of the receiving elements 11 constituting the receiving section 10 affects the accuracy of the measurement (the measurement of position, a distance and a shape) of the object to be detected; as the number of the receiving elements 11 is increased, the accuracy can be enhanced.

An interval between the receiving elements 11 is required to be set shorter than a wavelength of the ultrasonic wave transmitted from the transmission section 31. The interval between the receiving elements 11 also affects the measurement accuracy.

Therefore, the number of and the interval between the receiving elements 11 can be set by experimentally finding their optimal values in a cut-and-try method in accordance with the required measurement accuracy.

For example, if only the directional position of the object to be detected with respect to the ultrasonic sensor M is to be measured, several receiving elements 11 are satisfactory. However, if a precise two-dimensional shape of the object to be detected is measured, it is necessary to provide several tens to several hundreds of the receiving elements 11. Furthermore, if a precise three-dimensional shape of the object to be detected is measured, a larger number of the receiving elements 11 than the number needed for two-dimensional shape measurement are required.

[1-4]

In the example shown in FIG. 3, the arrangement of the transmission elements constituting the transmission section 31 is appropriately determined so as to adjust the directivity of a transmission direction of an ultrasonic wave.

Therefore, the number and the arrangement of the transmission elements constituting the transmission section 31 can be set by experimentally fining their optimal values in a cut-and-try method in accordance with the required transmission output and directivity.

Embodiment 2

Figure 4:
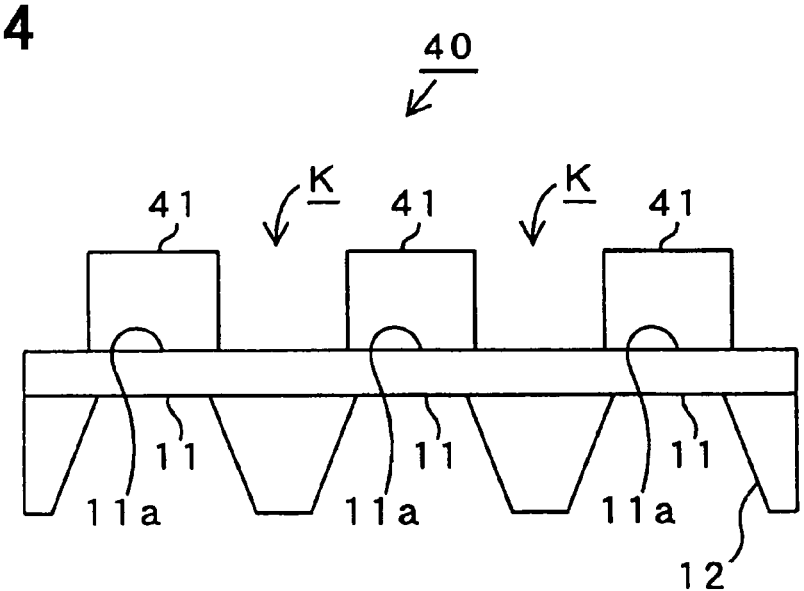
FIG. 4 is a cross-sectional side view of a receiving section of an ultrasonic sensor according to a second embodiment of the present invention.

FIG. 4 is a cross-sectional side view showing a receiving section 40 in the ultrasonic sensor M according to Embodiment 2.

The receiving section 40 according to Embodiment 2 differs from the receiving section 10 in Embodiment 1 only in that the protective film 14 is replaced by a thin-plate like protective member 41 attached and fixed onto the receiving surface 11a of each of the receiving elements 11.

Specifically, in the receiving section 40, the protective member 41 is attached to the front side of each of the receiving elements 11. A clearance K is provided between the protective members 41 of the respective receiving elements 11. The clearance K separates the protective members 41 for each of the receiving elements 11.

The structure of the ultrasonic sensor M according to Embodiment 2 is obtained by replacing the receiving section 10 in the ultrasonic sensor M shown in FIG. 3 according to Embodiment 1 with the receiving section 40.

Functions and Effects of Embodiment 2

According to Embodiment 2, the following functions and effects can be obtained in addition to the same functions and effects described in [1-3] and [1-4] of Embodiment 1 above.

[2-1]

The thin plate-like protective member 41 is attached and fixed to the receiving surface 11a of each of the receiving elements 11. Therefore, when the protective member 41 is oscillated by an ultrasonic wave, the oscillation of the protective member 41 propagates to each of the layers 22 to 26 (not shown in FIG. 4; see FIG. 2) on the receiving surface 11a. As a result, the thin film layer 25 made of a ferroelectric oscillates to generate an electric signal due to a piezoelectric effect.

Herein, since the layers 22 to 26 on the receiving surface 11a are reinforced with the protective member 41, each of the thin layers 22 to 26 can be prevented from being damaged so as to be unlikely to break the receiving section 40 even if an external force is applied to the receiving section 40 of the ultrasonic sensor M. As a result, the robust receiving section 40 can be obtained.

Moreover, in the case where the transmission section 31 is made to have the same structure as that of the receiving section 40 so that the thin plate-like protective member 41 is attached and fixed to the transmission surface of the transmission element, the oscillation of the thin film layer 25 propagates to the protective member 41 when the thin film layer 25 is oscillated by the piezoelectric effect. Then, the protective member 41 is oscillated in turn to transmit the ultrasonic wave.

In this case, since the layers 22 to 26 on the transmission surface of the transmission element are reinforced by the protective member 41, each of the thin layers 22 to 26 can be prevented from being damaged so as to be unlikely to break the transmission section 31 even if an external force is applied to the transmission section 31 of the ultrasonic sensor M. As a result, the robust transmission section 31 can be obtained.

[2-2]

Since the receiving section 40 and the transmission section 31 are robust, the ultrasonic sensor M including the receiving section 40 and the transmission section 31 can be mounted as external equipment of an automobile without any modification. If the ultrasonic sensor M is to be mounted as external equipment of an automobile, it is necessary to use a highly weather-resistant material as a material of the protective member 41. Examples of such a material include various metals (such as an aluminum alloy), various synthetic resins, glasses, rubbers, and the like.

As a method of attaching and fixing the protective member 41 onto the receiving surface 11a of each of the receiving elements 11 (the transmission surface of the transmission element), any method (for example, thermal welding, ultrasonic welding, bonding with an adhesive and the like) may be used.

[2-3]

The clearance K is provided between the protective members 41 of the respective receiving elements 11. The clearance K serves to separate the protective members 41 for each of the receiving elements 11. Therefore, the oscillation of one protective member 41 propagates only to the receiving element 11 to which the protective member 41 is attached and fixed but not to the other receiving elements 11 through the adjacent protective member 41.

Thus, according to Embodiment 2, since an ultrasonic wave can be received by each of the receiving elements 11 in a completely separate manner, a crosstalk characteristic of each of the receiving elements 11 can be prevented from being degraded.

Embodiment 3

Figure 5:
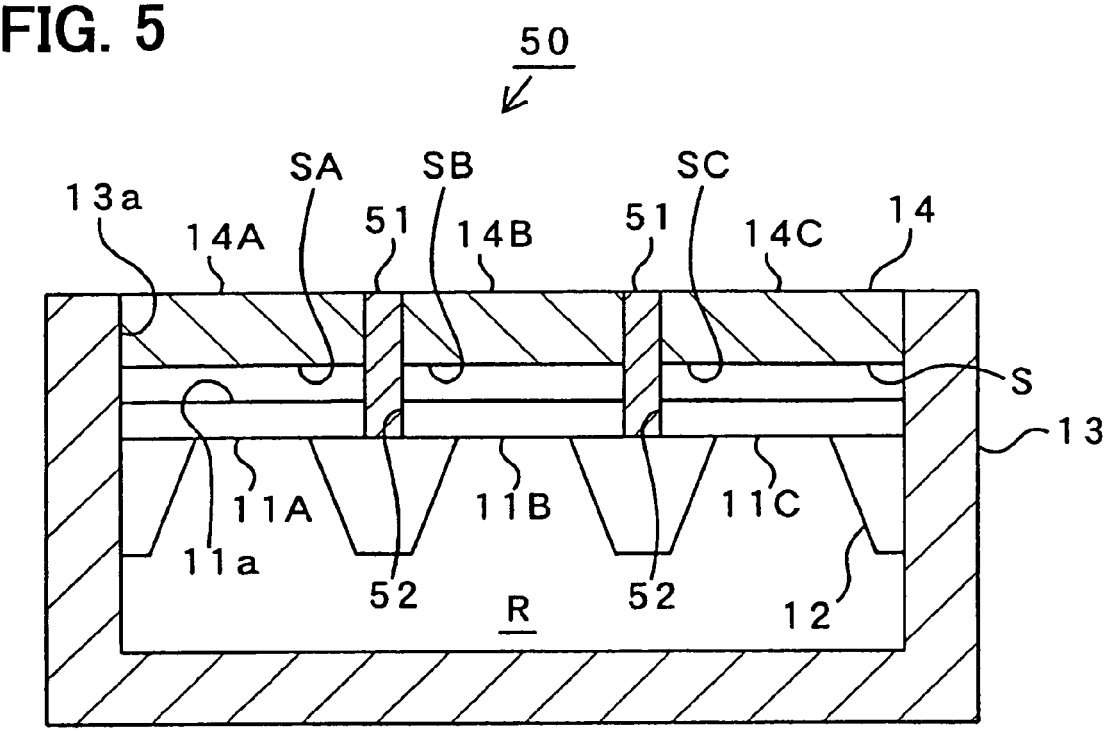
FIG. 5 is a cross-sectional side view of a receiving section of an ultrasonic sensor according to a third embodiment of the present invention.

FIG. 5 is a cross-sectional side view showing a receiving section 50 in the ultrasonic sensor M according to Embodiment 3.

The receiving section 50 according to Embodiment 3 differs from the receiving section 10 according to Embodiment 1 merely in that separation members 51 and separation grooves 52 are provided.

A lower end of each of the separation members 51 is embedded in each of the separation grooves 52 formed in the substrate 12 between the receiving elements 11. On the other hand, an upper end of each of the separation members 51 separates the gaps S and the protective films 14 for each of the receiving elements.

Specifically, in the example shown in FIG. 5, the lower end of each of the separation members 51 is embedded into each of the separation grooves 52 formed in the substrate 12 between three receiving elements 11A to 11C. As a result, the receiving elements 11A to 11C are separated from each other by the separation members 51 and the separation grooves 52.

The gaps SA to SC and the protective films 14A to 14C situated above (in front of) the respective receiving elements 11A to 11C are also separated from each other by the separation members 51 for each of the receiving elements 11A to 11C.

The structure of the ultrasonic sensor M according to Embodiment 3 is obtained by replacing the receiving section 10 of the ultrasonic sensor M shown in FIG. 3 according to Embodiment 1 with the receiving section 50.

Functions and Effects of Embodiment 3

According to Embodiment 3, the following functions and effects can be obtained in addition to the above-described functions and effects according to Embodiment 1.

[3-1]

The receiving elements 11, and the gaps S and the protective films 14 situated above (in front of) the respective receiving elements 11 are separated by the separation members 51 and the separation grooves 52 for each of the receiving elements 11. Therefore, the oscillation of one protective film 14A obtained by the separation propagates only to the receiving element 11A through the gap SA situated below the protective film 14A but not to the other receiving elements 11B and 11C.

Therefore, according to Embodiment 3, an ultrasonic wave can be received by each of the receiving elements 11A to 11C in a completely separate manner. Accordingly, a crosstalk characteristic of each of the receiving elements 11A to 11C can be prevented from being degraded.

Alternatively, a plurality of the receiving elements 11 adjacent to each other may be grouped into one. The separation member 51 and the separation groove 52 may be provided for each group so as to separate the group from the other groups.

[3-2]

Each of the separation members 51 is required to surely block the oscillation of the protective film 14A, the gap SA and the receiving element 11A, which are vertically arranged to be grouped into one, so that the oscillation does not propagate to the members of the other adjacent groups (the protective films 14B and 14C, the gaps SB and SC, and the receiving elements 11B and 11C).

For this reason, a material having a high oscillation blocking property is required to be used for each of the separation members 51. Examples of the material include rubbers.

Embodiment 4

Figure 6:
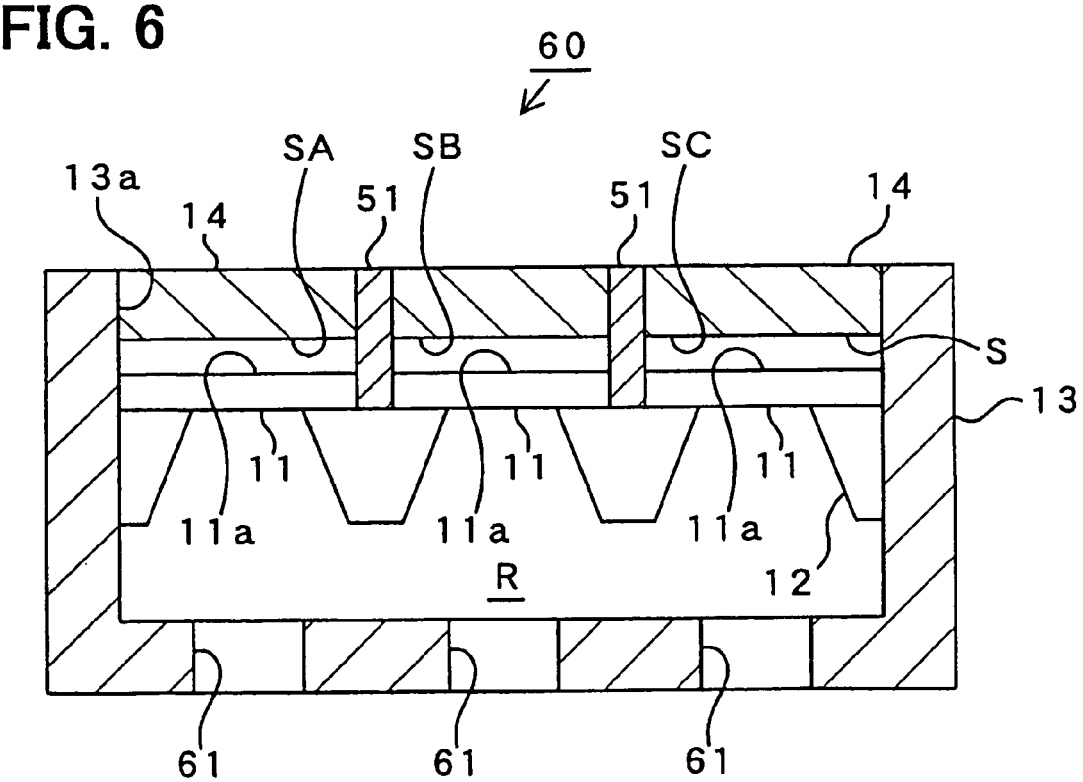
FIG. 6 is a cross-sectional side view of a receiving section of an ultrasonic sensor according to a fourth embodiment of the present invention.

FIG. 6 is a cross-sectional side view showing a receiving section 60 in the ultrasonic sensor M according to Embodiment 4.

The receiving section 60 according to Embodiment 4 differs from the receiving section 50 according to Embodiment 3 only in that a vent hole 61 for bringing the gap R and the exterior of the housing member 13 into communication with each other is formed in the bottom face of the housing member 13 below each of the receiving elements 11.

The structure of the ultrasonic sensor M according to Embodiment 4 is obtained by replacing the receiving section 10 of the ultrasonic sensor M shown in FIG. 3 according to Embodiment 1 with the receiving section 60.

However, it is necessary to provide a clearance between the receiving section 60 and the sensor substrate 32 so that each of the vent holes 61 is not closed when the receiving section 60 is attached and fixed onto the sensor substrate 32. Specifically, a spacer may be provided between the receiving section 60 and the sensor substrate 32, or a groove or a vent hole may be provided in the sensor substrate 32 at a position corresponding to each of the vent holes 61.

Functions and Effects of Embodiment 4

According to Embodiment 4, the receiving sensitivity of each of the receiving elements 11 can be prevented from being lowered in addition to the above-described functions and effects according to Embodiment 3 because the oscillation of each of the layers 22 to 26 (not shown in FIG. 6; see FIG. 2) on the receiving surface 11a of each of the receiving elements 11 is not inhibited.

Specifically, in the case where the vent holes 61 are not provided for the housing member 13, the gap R surrounded by the substrate 12 and the housing member 13 becomes a sealed space. In this manner, air filling the sealed space acts as a spring so as to apply a damping force due to air to the back face side of the receiving surface 11a of each of the receiving elements 11. Therefore, there is a possibility that free oscillation of each of the layers 22 to 26 on the receiving surface 11a is inhibited so as to lower the receiving sensitivity of each of the receiving elements 11.

On the other hand, in Embodiment 4, air passes through the vent holes 61. Therefore, a damping force due to air is not applied to the back face side of the receiving surface 11a of each of the receiving elements 11. As a result, each of the layers 22 to 26 on the receiving surface 11a is capable of freely oscillating.

The number, the arrangement, and the size and shape of the vent holes 61 can be determined by experimentally finding their optimal values in a cut-and-try method so as to obtain satisfactory functions and effects described above.

In the case where the transmission section 31 is made to have the same structure as that of the receiving section 60 and the vent holes 61 are provided for the housing member 13 of the transmission section 31, air passes through the vent holes 61. Therefore, a damping force due to air is not applied onto the back face side of the transmission surface of the transmission element. As a result, since the oscillation is not inhibited so that each of the layers 22 to 26 on the transmission surface can freely oscillate, the transmission output of the transmission element can be enhanced.

Embodiment 5

Figure 7:
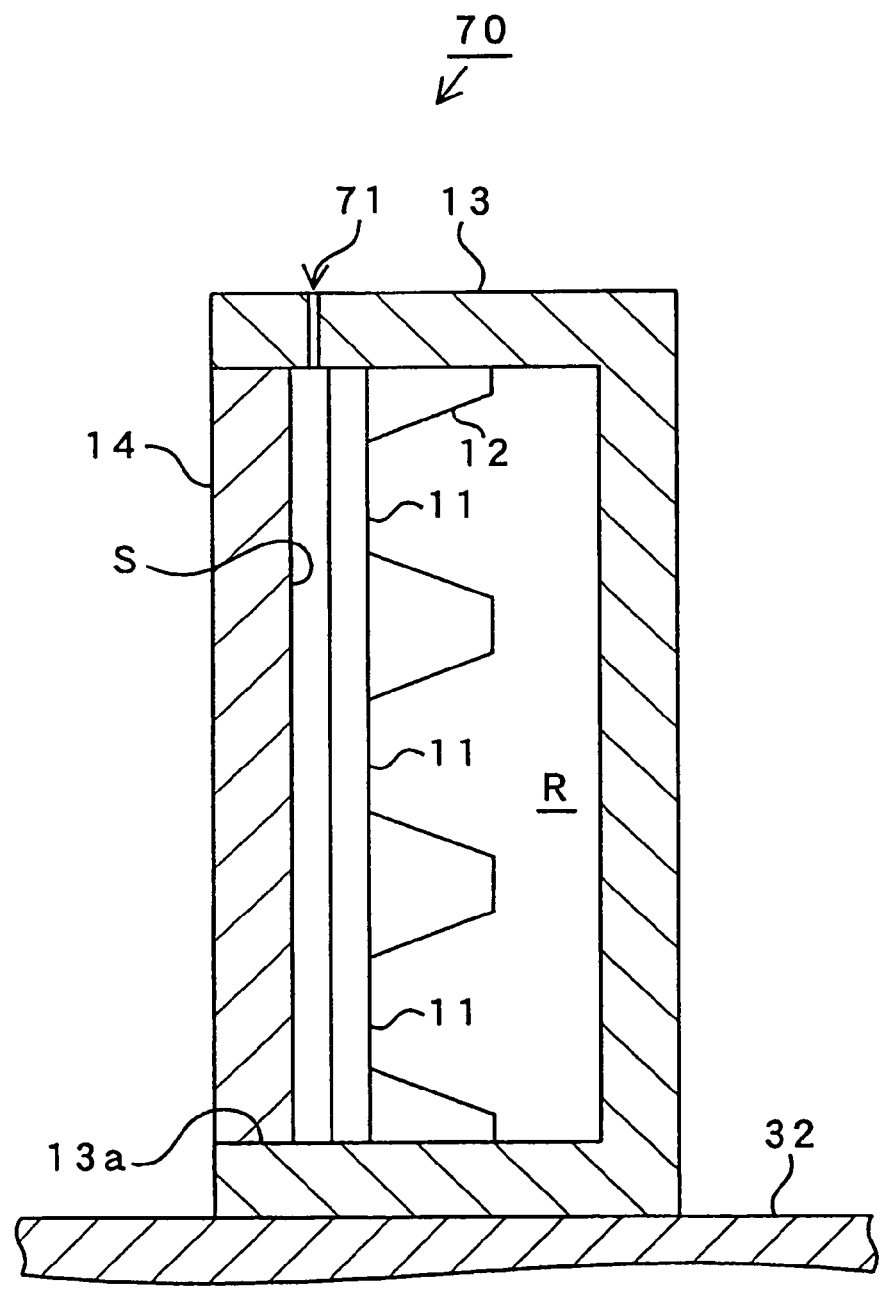
FIG. 7 is a cross-sectional side view of a receiving section of an ultrasonic sensor according to a fifth embodiment of the present invention.

FIG. 7 is a cross-sectional side view showing a receiving section 70 in the ultrasonic sensor M according to Embodiment 5.

The receiving section 70 according to Embodiment 5 differs from the receiving section 10 according to Embodiment 1 only in that a vent hole 71 for bringing the gap S and the exterior of the housing member 13 into communication with each other is provided through a side wall of the housing member 13.

The structure of the ultrasonic sensor M according to Embodiment 5 is obtained by replacing the receiving section 10 of the ultrasonic sensor M shown in FIG. 3 according to Embodiment 1 with the receiving section 70.

However, it is necessary to attach and fix a side wall of the housing member 13, which faces the side wall carrying the vent hole 71, onto the sensor substrate 32 so that an opening of the vent hole 71 is oriented upward when the receiving section 70 is attached and fixed onto the sensor substrate 32.

Functions and Effects of Embodiment 5

According to Embodiment 5, in addition to the above-described functions and effects of Embodiment 1, if a filler such as a liquid, a sol or a gel contains air bubbles when the gap S is filled with the filler, the air bubbles can be removed through the vent hole 71 to the exterior of the gap S.

Specifically, if the filler filling the gap S contains air bubbles, the air bubbles make it difficult to propagate the oscillation of the protective film 14 to the receiving elements 11.

On the other hand, according to Embodiment 5, the air bubbles are removed through the vent hole 71. Therefore, the gap S can be completely filled with the filler so as to prevent the receiving sensitivity of each of the receiving elements 11 from being lowered by the air bubbles contained in the filler filling the gap S.

In the case where the transmission section 31 is made to have the same structure as that of the receiving section 70 and the vent hole 71 is provided for the housing member 13 of the transmission section 31, the air bubbles contained in the filler of the gap S are removed through the vent hole 71. As a result, the gap S can be completely filled with the filler. In this manner, the oscillation of the transmission element is allowed to surely propagate through the filler to the protective film 13 so as to prevent the transmission output of the transmission element from being lowered.

Embodiment 6

Figure 8:
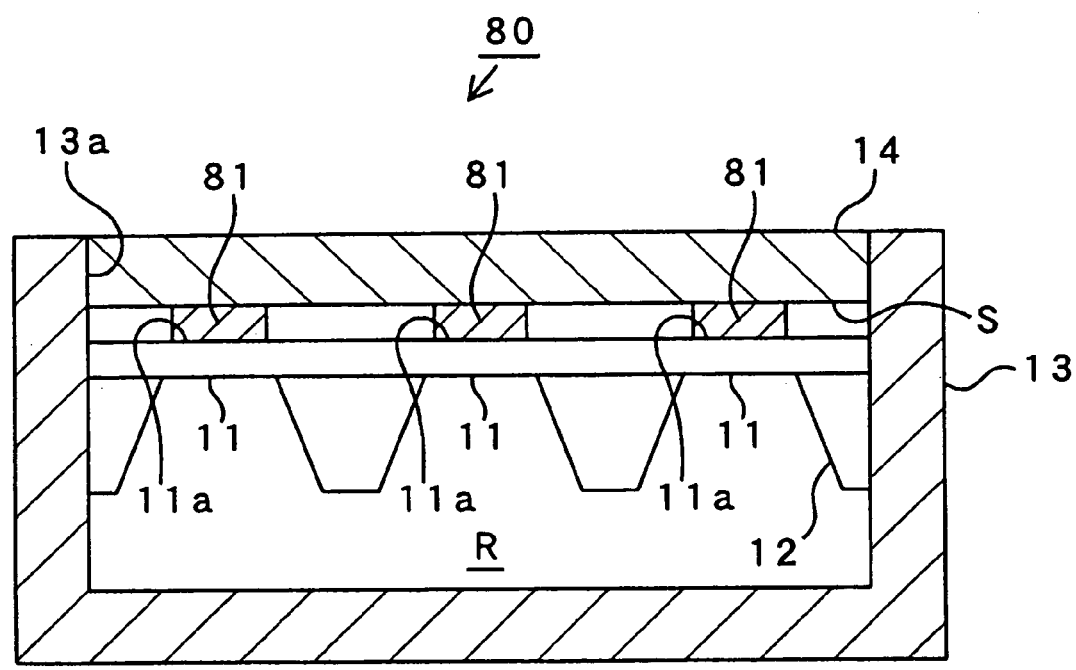
FIG. 8 is a cross-sectional side view of a receiving section of an ultrasonic sensor according to a sixth embodiment of the present invention.

FIG. 8 is a cross-sectional side view showing a receiving section 80 in the ultrasonic sensor M according to Embodiment 6.

The receiving section 80 according to Embodiment 6 differs from the receiving section 10 in Embodiment 1 only in that column-like transfer members 81 for independently connecting the receiving surfaces 11a of the respective receiving elements 11 and the protective film 14 with each other for each of the receiving elements 11 are provided in the gap S.

The structure of the ultrasonic sensor M according to Embodiment 6 is obtained by replacing the receiving section 10 of the ultrasonic sensor M shown in FIG. 3 according to Embodiment 1 with the receiving section 80.

Functions and Effects of Embodiment 6

According to Embodiment 6, the following functions and effects can be obtained in addition to the above-described functions and effects [1-1], [1-3], and [1-4] according to Embodiment 1.

[6-1]

When the protective film 14 is oscillated by an ultrasonic wave, the oscillation of the protective film 14 propagates through each of the transfer members 81 to each of the receiving elements 11.

In this case, since the transfer member 81 is provided for each of the receiving elements 11, the oscillation of an arbitrary one of the transfer members 81 does not propagate to the other transfer members 81. Therefore, an ultrasonic wave can be received by each of the receiving elements 11 in a separate manner. As a result, a crosstalk characteristic of each of the receiving elements 11 can be prevented from being degraded.

Moreover, an acoustic impedance of each of the transfer member 81 is brought close to that of the protective film 14 so as to surely propagate the oscillation of the protective film 14 to each of the transfer members 81. As a result, the receiving sensitivity of each of the receiving elements 11 can be enhanced.

Furthermore, by bringing the acoustic impedance of each of the transfer members 81 close to that of the upper electrode layer 26 (not shown in FIG. 8; see FIG. 2), it becomes possible to surely propagate the oscillation of each of the transfer members 81 to the upper electrode layer 26 so as to increase the receiving sensitivity of each of the receiving elements 11.

Therefore, it is desirable to form the transfer member 81 of the same material as that of the protective film 14 or the upper electrode layer 26.

In the case where the transmission section 31 is made to have the same structure as that of the receiving section 80 and the transfer member 81 for connecting the transmission surface of the transmission element and the protective film 14 with each other is provided, it becomes possible to surely propagate the oscillation of the transfer member 81 to the protective film 14 by bringing the acoustic impedance of the transfer member 81 close to that of the protective film 14. As a result, the transmission output of the transmission element can be increased.

Moreover, by bringing the acoustic impedance of the transfer member 81 close to that of the upper electrode layer 26 of the transmission element, it becomes possible to surely propagate the oscillation of the upper electrode layer 26 of the transmission element to the transfer member 81. As a result, the transmission output of the transmission element can be increased.

[6-2]

In order to prevent the crosstalk characteristic of each of the receiving elements 11 from being degraded, it is necessary to prevent the oscillation of an arbitrary one of the transfer members 81 from propagating to the other transfer members 81 through the filler in the gap S.

Therefore, it is the most desirable in Embodiment 6 to put the gap S in a vacuum state.

In the case where the gap S is filled with the filler in Embodiment 6, a gas having a small acoustic impedance or a highly vibration absorbent material (for example, a gel having a high viscosity or the like) is used as the filler.

Embodiment 7

Figure 9A:
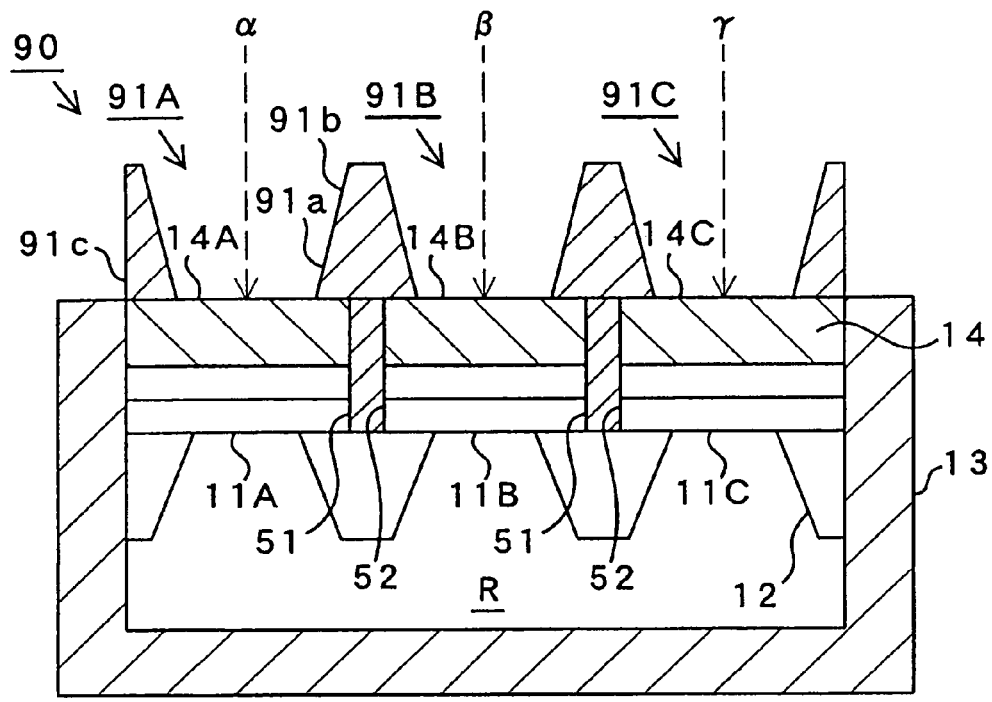
FIGS. 9A and 9B are cross-sectional side views of a receiving section of an ultrasonic sensor according to a seventh embodiment of the present invention.
Figure 9B:
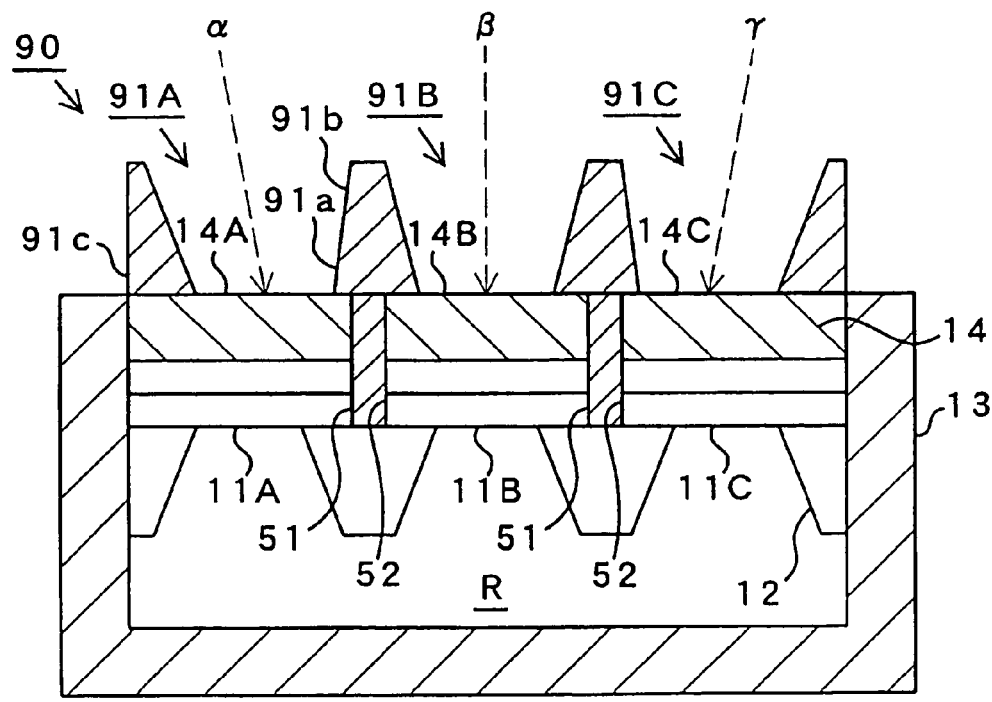

FIGS. 9A and 9B are cross-sectional side views, each showing a receiving section 90 in the ultrasonic sensor M according to Embodiment 7.

The receiving section 90 according to Embodiment 7 differs from the receiving section 50 in Embodiment 3 only in that acoustic horns 91A, 91B, and 91C are provided on the outer side of the protective film. For ease of disclosure, the acoustic horns 91A, 91B, and 91C may be referred to collectively as the acoustic horns 91.

Each of the acoustic horns 91 is formed so as to have a gradually increasing sectional area from a throat 91a toward an opening 91b.

The acoustic horn 91 is provided for each of the receiving elements 11.

The throat 91a of each of the acoustic horns 91 is located on the protective film 14 situated above (in front of) each of the receiving elements 11. Specifically, the throat 91a of each of the acoustic horns 91 is provided in front of each of the receiving elements 11.

In each of the acoustic horns 91, a horn wall member 91c on an outer circumference of the throat 91a is attached and fixed to an upper end of each of the separation members 51.

Specifically, in the example shown in FIGS. 9A and 9B, the acoustic horns 91A to 91C are provided for three receiving elements 11A to 11C, respectively. The throats 91a of the respective acoustic horns 91A to 91C are provided on the protective films 14A to 14C situated above (in front of) the receiving elements 11A to 11C, respectively.

The structure of the ultrasonic sensor M in Embodiment 7 is obtained by replacing the receiving section 10 of the ultrasonic sensor M shown in FIG. 3 according to Embodiment 1 with the receiving section 90.

Functions and Effects of Embodiment 7

According to Embodiment 7, the following functions and effects can be obtained in addition to the above-described functions and effects of Embodiment 3.

[7-1]

By providing the acoustic horn 91 for each of the receiving elements 11, the directivity of a receiving direction of an ultrasonic wave can be provided for each of the receiving elements 11.

Specifically, the acoustic horns 91A, 91B, and 91C have acute directivity on their horn axes α, β, and γ, respectively.

Therefore, the acoustic horns 91A to 91C are formed to have the same size and shape as shown in FIG. 9A, so that the directivity of the receiving elements 11A, 11B, and 11C can be set in the same direction in the horn axes α, β, and γ of the respective acoustic horns 91A, 91B, and 91C are set in the same direction.

Moreover, as shown in FIG. 9B, if the horn axes α, β, and γ of the respective acoustic horns 91A, 91B, and 91C are set in arbitrary different directions by changing the size and shape of each of the acoustic horns 91A, 91B, and 91C, the directivity of each of the receiving elements 11A, 11B, and 11C can be set in an arbitrary direction.

If the transmission section 31 is made to have the same structure as that of the receiving section 90 and the acoustic horns 91 are provided on the outer side of the protective film 14, the directivity of a transmission direction of an ultrasonic wave can be imparted to the transmission element.

[7-2]

In each of the acoustic horns 91, the horn wall member 91c on the outer circumference of the throat 91a is attached and fixed to the upper end of each of the separation members 51.

Therefore, the oscillation of each of the protective films 14A to 14C is not inhibited even if the acoustic horns 91 are provided, the receiving sensitivity of each of the receiving elements 11 can be prevented from being degraded.

The horn wall member 91c of the acoustic horn 91 is required to be formed of a material having enough strength to be hardly oscillated by an ultrasonic wave. Examples of the material include various metals, various synthetic resins, and the like.

If the transmission section 31 is made to have the same structure as that of the receiving section 90 and the acoustic horns 91 are provided on the outer side of the protective film 14, the oscillation of the protective film 14 is not inhibited even if the acoustic horns 91 are provided because the horn wall member 91c on the outer circumference of the throat 91a is attached and fixed to the upper end of each of the separation members 51. Accordingly, the transmission output of the transmission element can be prevented from being lowered.

Embodiment 8

Figure 10:
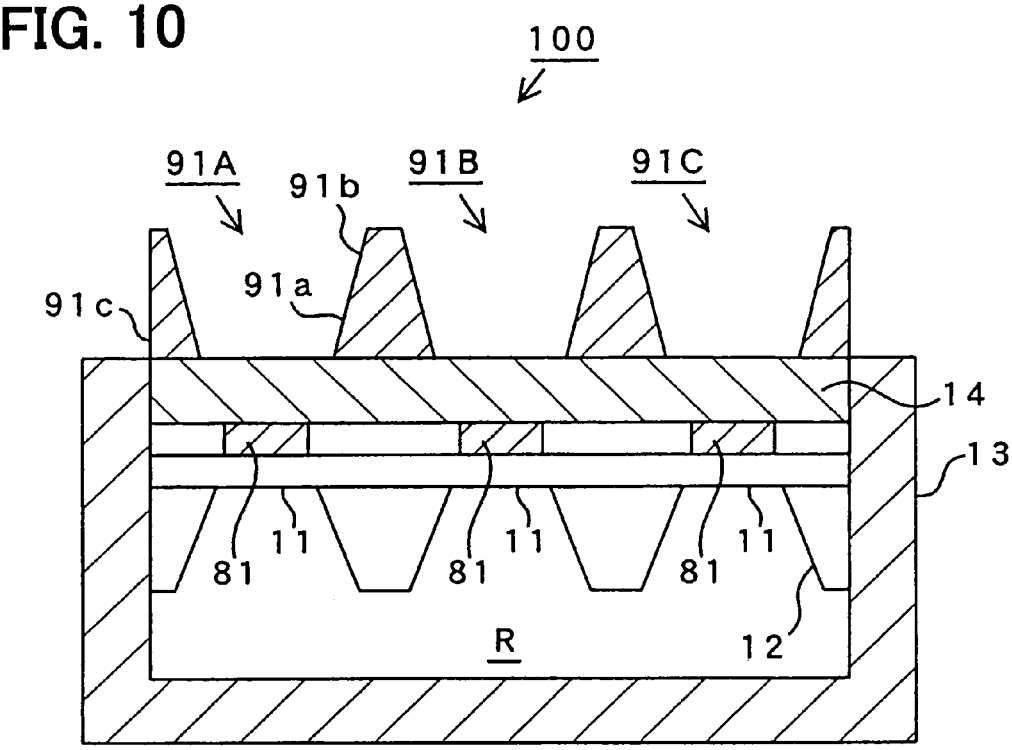
FIG. 10 is a cross-sectional side view of a receiving section of an ultrasonic sensor according to an eighth embodiment of the present invention.

FIG. 10 is a cross-sectional side view showing a receiving section 100 in the ultrasonic sensor M according to Embodiment 8.

The receiving section 100 according to Embodiment 8 differs from the receiving section 80 according to Embodiment 6 only in that the acoustic horns 91 are provided on the outer side of the protective film 14 as in the receiving section 90 according to Embodiment 7.

In Embodiment 8, however, the horn wall member 91c on the outer circumference of the throat 91a in each of the acoustic horns 91 is attached and fixed to the protective film 14.

The structure of the ultrasonic sensor M according to Embodiment 8 is obtained by replacing the receiving section 10 of the ultrasonic sensor M shown in FIG. 3 according to Embodiment 1 with the receiving section 100.

Therefore, according to Embodiment 8, the functions and effects described in [7-1] above in Embodiment 7 can be obtained in addition to the above-described functions and effects of Embodiment 6.

Exemplary Variations of Embodiments 1 to 8

Embodiments 1 to 8 may be changed as follows. Even in such a case, the functions and effects equivalent to or superior to those of each of the embodiments described above can be obtained.

[1]

Each of the receiving sections 10 to 100 in Embodiments 1 to 8 includes the plurality of piezoelectric receiving elements 11.

However, the piezoelectric receiving elements 11 may be replaced by capacitive receiving elements 111 so that the plurality of capacitive receiving elements 111 constitute each of the receiving sections 10 to 100.

Figure 11:
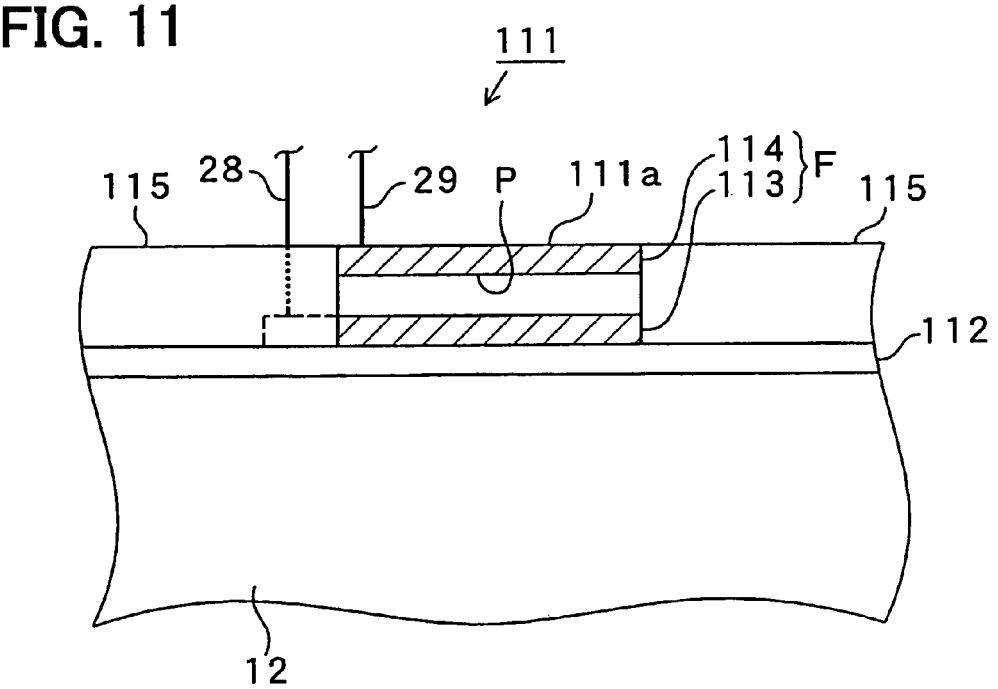
FIG. 11 is an enlarged cross-sectional side view of a capacitive receiving element adapted for use in any one of the receiving sections in the first through eighth embodiments of the present invention.

FIG. 11 is an enlarged cross-sectional side view showing one capacitive receiving element 111.

An insulating layer 112 is formed on the surface of the substrate 12. A fixed electrode layer 113 is formed on a surface of the insulating layer 112. A movable electrode layer 114 is formed on a surface of the fixed electrode layer 113 through a clearance P.

An insulating layer 115 is formed around the electrode layers 113 and 114. Surfaces of the insulating layer 115 and the movable electrode layer 114 (a device surface) are evened.

The bonding wires 28 and 29 are connected to the electrode layers 113 and 114, respectively.

In this manner, a capacitive element F is formed to have a structure in which the two electrodes 113 and 114 are provided so as to be opposed to each other through the clearance P. The receiving element 111 includes the capacitive element F fabricated by employing the MEMS technique.

The surface of the movable electrode layer 114 forms the receiving surface 111a of the receiving element 111.

When the movable electrode layer 114 is oscillated by an ultrasonic wave, a distance between the electrode layers 113 and 114 changes so as to change a capacitance. Therefore, a conversion circuit (not shown) connected to the bonding wires 28 and 29 is used so as to convert a change in capacitance between the electrode layers 113 and 114 into an electric signal.

As described above, even in each of the receiving elements 10 to 100 is formed to include the plurality of capacitive receiving elements 111, the movable electrode layer 114 can be prevented from being damaged so as to hardly break the receiving sections 10 to 100 even if the thin movable electrode layer 114 has a low mechanical strength as in the case where each of the receiving sections 10 to 100 is formed with the piezoelectric receiving elements 11. As a result, the robust receiving sections 10 to 100 can be obtained.

[2]

The transmission section 31 in Embodiments 1 to 8 is formed with the piezoelectric transmission element having the same structure as that of the piezoelectric receiving element 11.

However, the transmission section 31 may also be formed with a capacitive transmission element having the same structure as that of the capacitive receiving element 111 shown in FIG. 10. In such a case, electrostatic attraction is generated between the electrode layers 113 and 114 in accordance with input signals applied to the electrode layers 113 and 114. The electrostatic attraction oscillates the movable electrode layer 114 to generate an ultrasonic wave.

In this case, the receiving face 111a of the receiving element 111 acts as the transmission face of the transmission element for transmitting an ultrasonic wave.

[3]

In Embodiments 1 to 8, the gap R surrounded by the substrate 12 and the housing member 13 is filled with air.

However, if the gap R is filled with a material (for example, a liquid, a sol, a gel or the like) for suppressing excessive oscillation of the layers 22 to 26, each of the layers 22 to 26 can be prevented from being excessively oscillated to be damaged.

[4]

The ultrasonic sensor M according to Embodiments 1 to 8 is composed of a hybrid IC in which any one of the receiving sections 10 to 100 and the transmission section 31 corresponding to chip parts are attached and fixed onto the sensor substrate 32 made of an insulating plate material.

Alternatively, the ultrasonic sensor M may also be composed of a monolithic IC in which any one of the receiving sections 10 to 100 and the transmission section 31 are formed on the single substrate 12. In this manner, the ultrasonic sensor M can be further reduced in size as well as in weight.

In this case, any one of or a plurality of the receiving elements 11 arranged on the substrate 12 may be made to act as a transmission element(s) of the transmission section 31.

Figure 12:
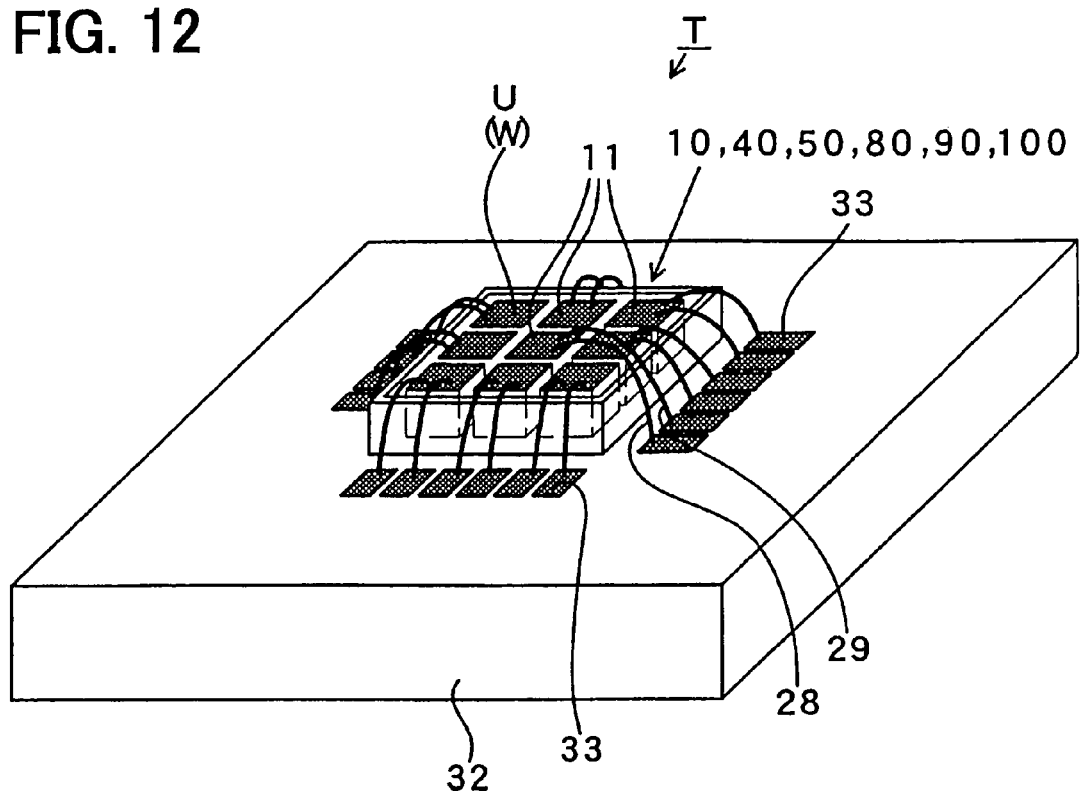
FIG. 12 is a perspective view of a second ultrasonic sensor according to the principles of the present invention.

FIG. 12 is a schematic perspective view showing an ultrasonic sensor T.

The ultrasonic sensor T includes: a monolithic IC in which receiving section 10, 40, 50, 80, 90 or 100 and a transmission section U are formed on the single substrate 12 (not shown in FIG. 12; see FIGS. 13 to 17); the bonding wires 28 and 29; the sensor substrate 32; and electrode pads 33.

With this structure, the ultrasonic sensor T is further reduced in size as well as in weight as compared with the ultrasonic sensor M.

The transmission section U is composed of a single transmission element W. The transmission element W has the same structure as that of each of the receiving elements 11 constituting the receiving section 10, 40, 50, 80, 90, or 100.

A tip of each of the bonding wires 28 and 29 led from the transmission element W is connected to each of the electrode pads 33 as in the case of the receiving element 11.

Moreover, the transmission element W having the same structure as that of the receiving element 11 transmits an ultrasonic wave from a transmission surface Wa (not shown) corresponding to the receiving surface 11a of the receiving element 11 (not shown in FIG. 12; see FIGS. 13 to 17).

In the example shown in FIG. 12, among nine elements having the same structure arranged 3 by 3 on the single substrate 12 (not shown), one element arranged at the corner is made to act as the transmission element W, whereas the other eight elements are made to act as the receiving elements 11.

However, a plurality of arbitrary elements may be made to act as the transmission elements W among a plurality of elements having the same structure arranged on the substrate 12.

Figure 13:
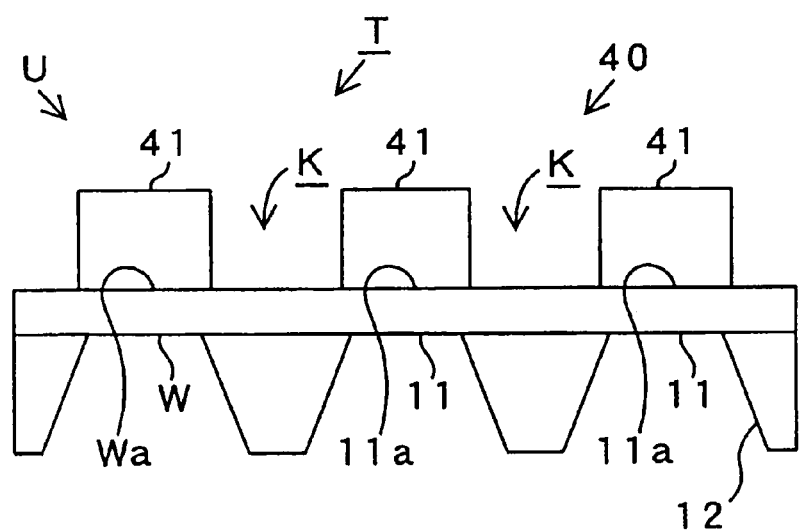
FIG. 13 is a cross-sectional side view of the receiving section of FIG. 4 and a transmission section of the ultrasonic sensor of FIG. 12.

FIG. 13 is a cross-sectional side view showing an example in which Embodiment 2 is applied to the ultrasonic sensor T, illustrating the receiving section 40 and the transmission section U of the ultrasonic sensor T.

Figure 14:
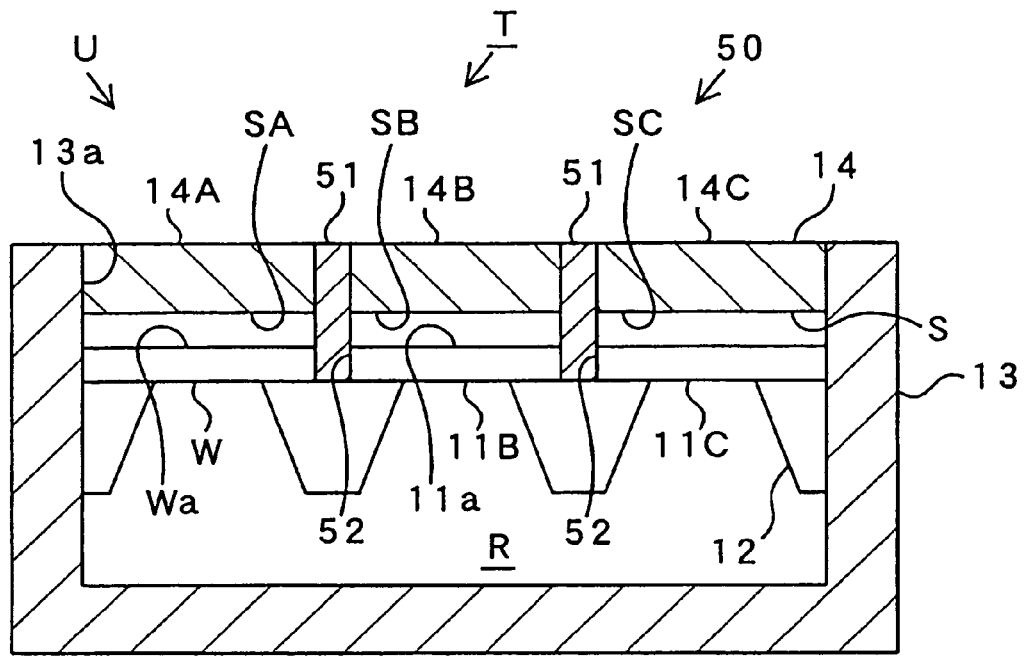
FIG. 14 is a cross-sectional side view of the receiving section of FIG. 5 and a transmission section of the ultrasonic sensor of FIG. 12.

FIG. 14 is a cross-sectional side view showing an example in which Embodiment 3 is applied to the ultrasonic sensor T, illustrating the receiving section 50 and the transmission section U of the ultrasonic sensor T.

Figure 15:
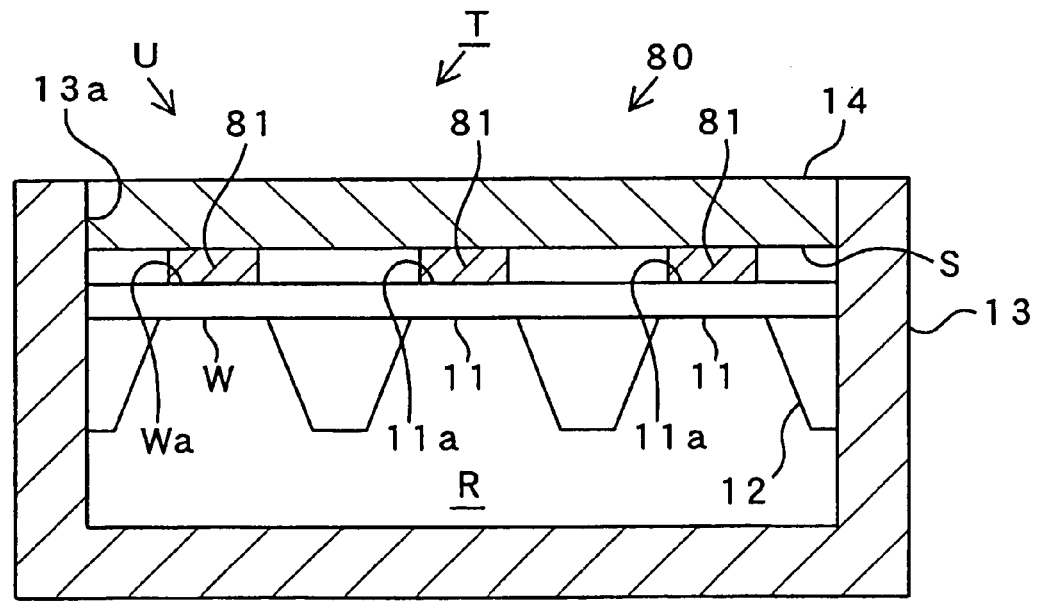
FIG. 15 is a cross-sectional side view of the receiving section of FIG. 8 and a transmission section of the ultrasonic sensor of FIG. 12.

FIG. 15 is a cross-sectional side view showing an example in which Embodiment 6 is applied to the ultrasonic sensor T, illustrating the receiving section 80 and the transmission section U of the ultrasonic sensor T.

Figure 16A:
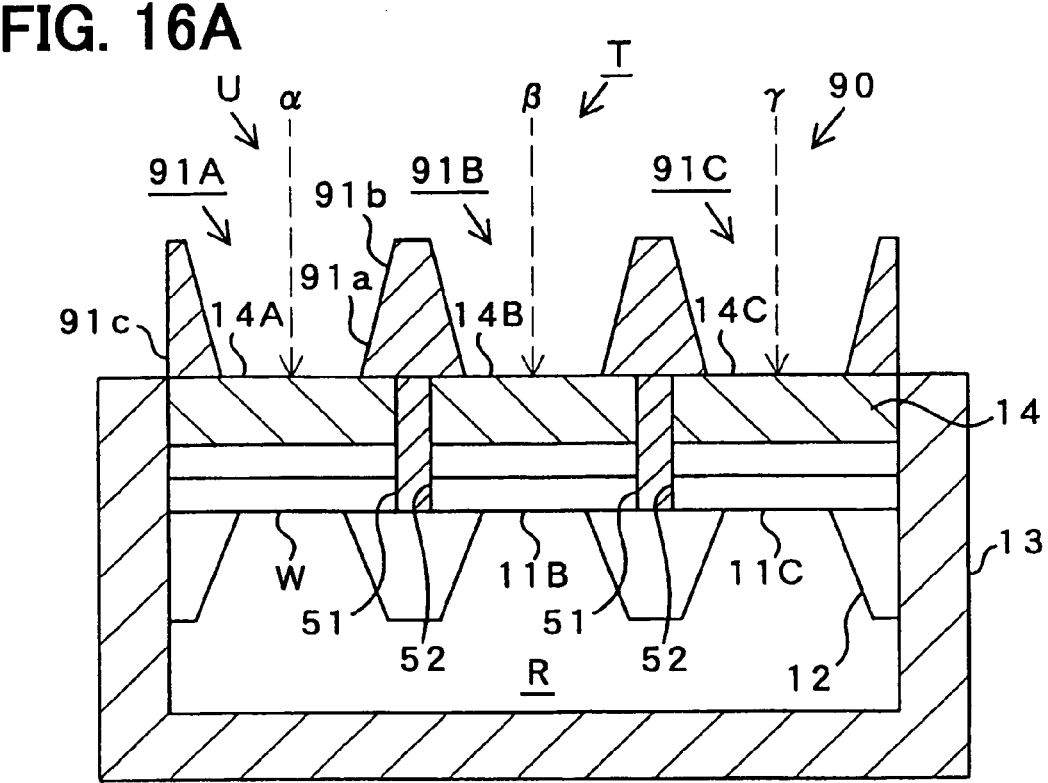
FIGS. 16A and 16B are cross-sectional side views of the receiving section of FIGS. 9A and 9B and a transmission section of the ultrasonic sensor of FIG. 12.
Figure 16B:
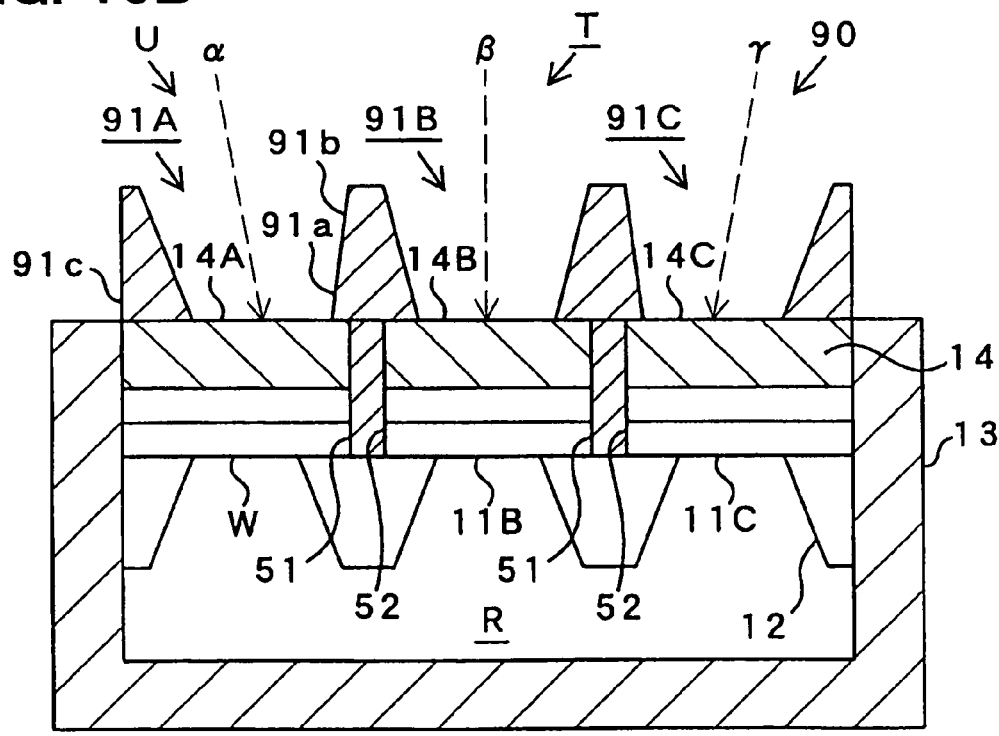

FIGS. 16A and B are cross-sectional side views showing an example in which Embodiment 7 is applied to the ultrasonic sensor T, illustrating the receiving section 90 and the transmission section U of the ultrasonic sensor T.

Figure 17:
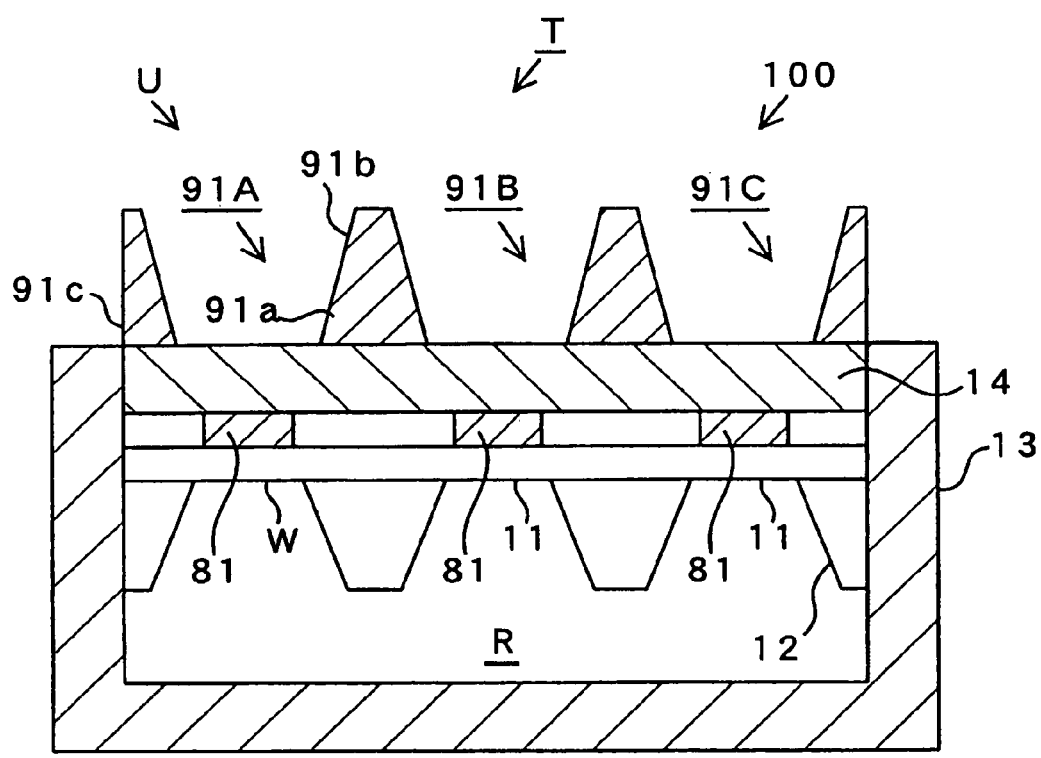
FIG. 17 is a cross-sectional side view of the receiving section of FIG. 10 and a transmission section of the ultrasonic sensor of FIG. 12.

FIG. 17 is a cross-sectional side view showing an example in which Embodiment 8 is applied to the ultrasonic sensor T, illustrating the receiving section 100 and the transmission section U of the ultrasonic sensor T.

Embodiment 9

Figure 18:
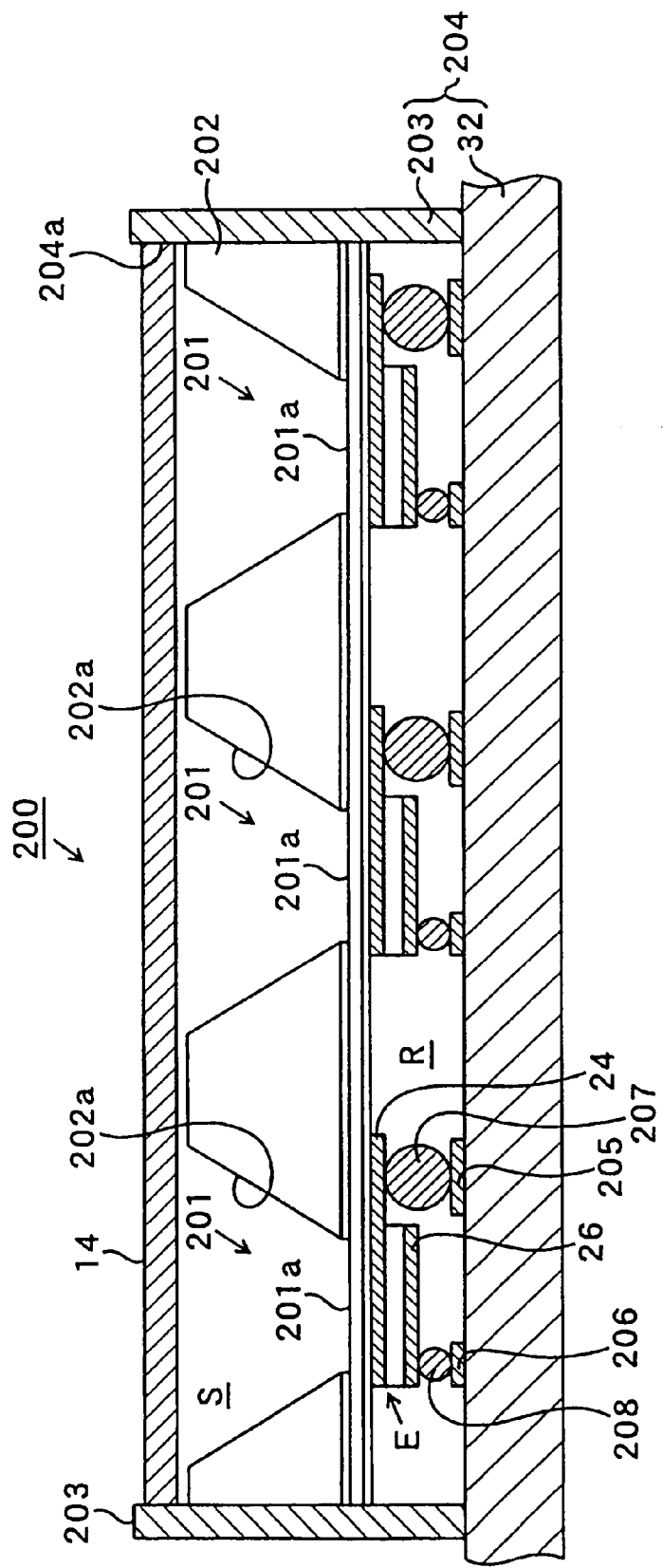
FIG. 18 is a cross-sectional side view of a receiving section of an ultrasonic sensor according to a ninth embodiment of the present invention.

FIG. 18 is a cross-sectional side view showing a receiving section 200 in an ultrasonic sensor N according to Embodiment 9.

The receiving section 200 includes a plurality of piezoelectric receiving elements 201 arranged in an array. The example shown in FIG. 18 illustrates a cross-sectional side view of three receiving elements 201.

The receiving elements 201 are formed on a single-crystalline silicon substrate (a single-crystalline silicon chip) 202 having an SOI structure.

The substrate 202 is provided on the sensor substrate 32. The substrate 202 is surrounded by a rectangular frame member 203. An outer circumference of the substrate 202 is attached and fixed to an inner wall of the frame member 203 by an appropriate method (for example, thermal welding, ultrasonic welding, bonding with an adhesive and the like) so as to air-seal a connection part between the outer circumference of the substrate 202 and the frame member 203.

A lower end of the frame member 203 is attached and fixed to the sensor substrate 32 by the above-mentioned appropriate method so as to air-seal a connection part between the lower end of the frame member 203 and the sensor substrate 32.

The frame member 203 and the sensor substrate 32 form a housing member 204 having a rectangular parallelepiped box shape with an upper open end.

Specifically, the substrate 202 is housed within the housing member 204 having a rectangular parallelepiped box shape with an upper open end.

Each of the receiving elements 201 is arranged so that a receiving surface 201a for receiving an ultrasonic wave is oriented toward an opening 204a of the housing member 204. Moreover, the receiving surfaces 201a of the respective receiving elements 201 are arranged so as to be flush with each other.

The protective film 14 for closing the opening 204a is attached over the opening 204a of the housing member 204. Specifically, the protective film 14 is provided in front of the receiving elements 201.

An outer circumference of the protective film 14 is attached and fixed to an inner circumference of the frame member 203 (an inner circumference of the opening 204a of the housing member 204) so as to air-seal a connection part between the outer circumference of the protective film 14 and the frame member 203.

The gap S, which is provided between the protective film 14 and the substrate 202, is filled with a gas, a liquid, a sol, a gel or the like.

The gap R surrounded by the back face side (the bottom face side) of the substrate 202 and the housing member 204 (the frame member 203 and the sensor substrate 32) is filled with air.

Figure 19:
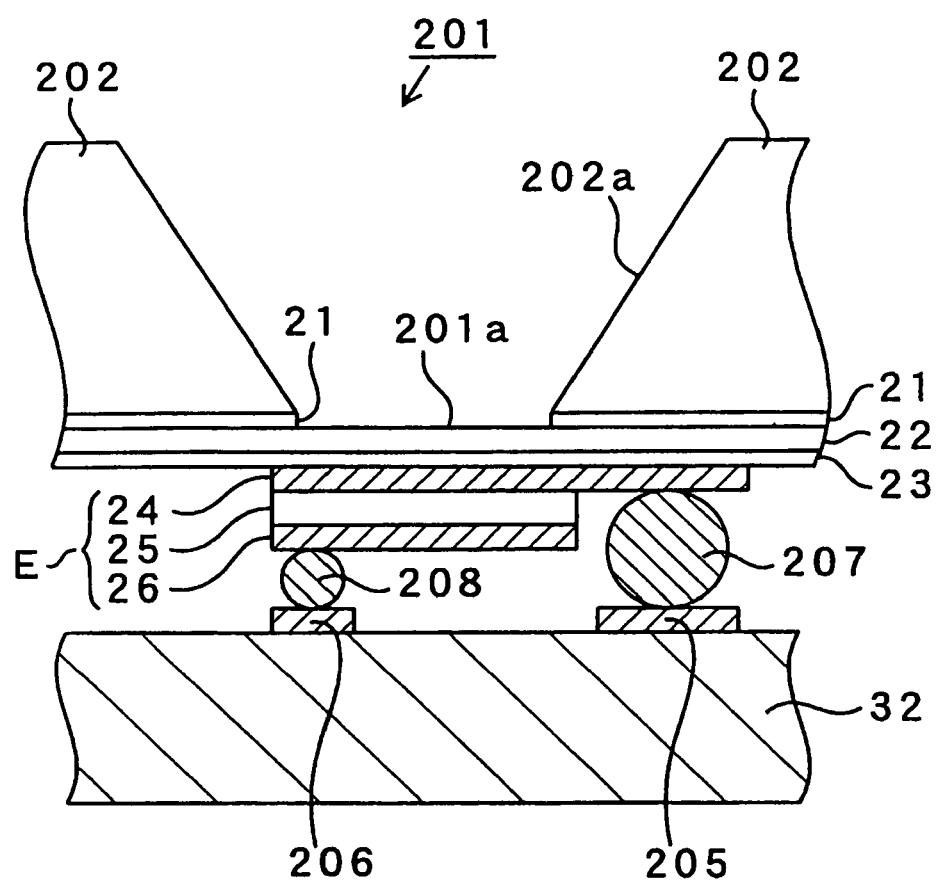
FIG. 19 is an enlarged cross-sectional side view of a piezoelectric receiving element of the receiving section of FIG. 18.

FIG. 19 is an enlarged cross-sectional side view showing one piezoelectric receiving element 201.

A through hole 202a penetrating through the substrate 202 is formed in the substrate 202.

On the back face side of the substrate 202, the insulating layer 21, the silicon active layer 22, and the insulating layer 23 are formed on the surface of the substrate 202 in this order. The layers 22 and 23 are formed to close a lower end of the through hole 202a.

On the back face side, the lower electrode layer 24, the thin film layer 25 made of a ferroelectric (for example, PZT or the like), and the upper electrode layer 26 are formed in this order on the surface of the insulating layer 23 situated below (behind) the through hole 202a.

The sensor substrate 32 is a printed wiring board. Wiring layers 205 and 206 are formed on a surface of the sensor substrate 32.

The lower electrode layer 24 and the wiring layer 205 are connected to each other through a bump 207, whereas the upper electrode layer 26 and the wiring layer 206 are connected to each other through a bump 208.

The bumps 207 and 208 may be formed by an appropriate method (plating, a stud method or the like) using various conductive materials (metals such as a solder, gold, copper and nickel, a conductive adhesive or the like).

In this manner, a piezoelectric element (the piezoelectric sensor) E is formed to have a structure in which the thin film layer 25 made of a ferroelectric is sandwiched between the two thin electrode layers 24 and 26. The piezoelectric element E fabricated by employing the MEMS technique constitutes the receiving element 201.

A surface of the silicon active layer 22 exposed through the through hole 202a forms the receiving surface 201a of the receiving element 201.

When the thin film layer 25 is oscillated by an ultrasonic wave, an electric signal is generated by a piezoelectric effect. The thus generated electric signal is output from the electrode layers 24 and 26 through the bumps 207 and 208 and the wiring layers 205 and 206, respectively.

The through hole 202a is provided so that a diaphragm composed of the layers 22 and 26 is more likely to be oscillated.

Figure 20:
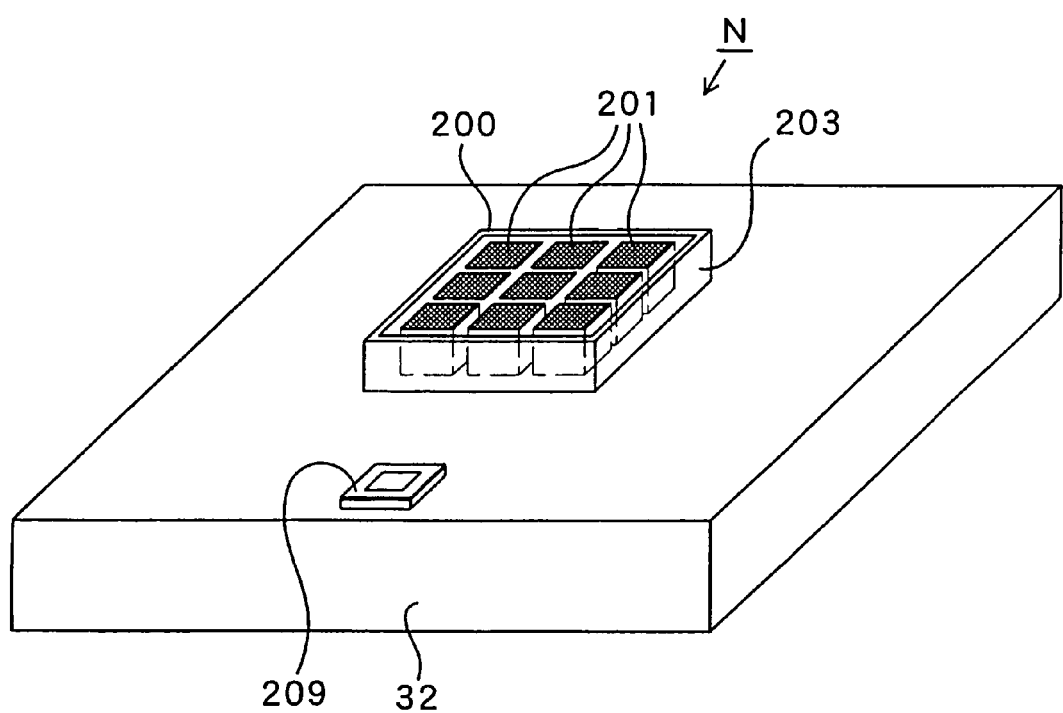
FIG. 20 is a perspective view of a third ultrasonic sensor according to the principles of the present invention.

FIG. 20 is a schematic perspective view showing the ultrasonic sensor N.

The ultrasonic sensor N is composed of a hybrid IC including the receiving section 200, a transmission section 209, and the sensor substrate 32.

The receiving section 200 and the transmission section 209 corresponding to chip parts are attached and fixed to the surface of the sensor substrate 32.

In the example shown in FIG. 20, the receiving section 200 includes nine receiving elements 201 arranged 3 by 3.

The transmission section 209 has the same structure as that of any one of the receiving sections 10 to 100 and 200. The transmission section 209 includes one piezoelectric transmission element having the same structure as that of the receiving element 11 or 201. The thin film layer 25 is oscillated by a piezoelectric effect in accordance with an input signal applied to the thin film 25 made of a ferroelectric from the electrode layers 24 and 26, thereby generating an ultrasonic wave.

In the case where the transmission element of the transmission section 209 is made to have the same structure as that of the receiving element 201, the receiving surface 201a of the receiving element 201 serves as a transmission surface for transmitting an ultrasonic wave.

Specifically, the transmission element of the transmission section 209 converts an electric signal into an ultrasonic wave so as to transmit it.

Then, the transmission section 209 transmits an ultrasonic wave in accordance with an input signal from the exterior. A reflection sound generated by the ultrasonic wave reflected by an object to be detected is received by each of the receiving elements 201 of the receiving section 200.

Specifically, each of the receiving elements 201 of the receiving section 200 converts the received ultrasonic wave into an electric signal.

Then, the ultrasonic wave transmitted from the transmission section 209 and the ultrasonic wave received by each of the receiving elements 201 of the receiving section 200 are compared with each other so as to obtain a sound pressure difference, a time difference, and a phase difference between them. As a result, the position of an object to be detected, a distance between the ultrasonic sensor N and the object to be detected, a two-dimensional shape or a three-dimensional shape of the object to be detected and the like can be measured based on the thus obtained differences.

Functions and Effects of Embodiment 9

According to Embodiment 9, the following functions and effects can be obtained in addition to the same functions and effects as [1-1] to [1-4] described above in Embodiment 1.

[9-1]

In each of the receiving elements 11 shown in FIGS. 1 to 3 in Embodiment 1, the surface of the upper electrode layer 26 serves as the receiving surface 11a.

On the other hand, in each of the receiving elements 201 in Embodiment 9, the surface of the silicon active layer 22 exposed through the bottom face of the through hole 202a serves as the receiving surface 202a.

Specifically, the receiving element 201 according to Embodiment 201 corresponds to a reversed version of the receiving element 11 according to Embodiment 1 for use.

Moreover, in Embodiment 1, the packaged receiving section 10 including the substrate 12 housed within the housing member 13 is attached and fixed onto the sensor substrate 32. Then, the electrode layers 24 and 26 of each of the receiving elements 11 constituting the receiving section 10 and each of the electrode pads 33 are connected to each other through the bonding wires 28 and 29, respectively.

Specifically, since the receiving section 10 (each of the receiving elements 11) is surface-mounted on the sensor substrate 32 by using a wire bonding technique in Embodiment 1, the ultrasonic sensor according to Embodiment 1 has the following problems [A] to [E].

[A] There is a possibility that each of the bonding wires 28 and 29 is cut by the oscillation. In the case where the ultrasonic sensor M is to be mounted on an automobile, in particular, each of the bonding wires 28 and 29 is more likely to be cut because the oscillation of an engine or the oscillation propagating from a road surface is applied to the ultrasonic sensor M.

[B] The fabrication cost for surface-mounting the receiving section 10 on the sensor substrate 32 is high.

If the transmission element of the transmission section 209 is made to have the same structure as that of the receiving element 11, the fabrication cost for surface-mounting the transmission section 209 on the sensor substrate 32 is high.

[C] Since the bonding wires 28 and 29 are provided above the receiving surface 11a of each of the receiving elements 11, there is a possibility that the bonding wires 28 and 29 become obstacles to inhibit an ultrasonic wave from getting to the receiving surface 11a, resulting in a lowered receiving sensitivity of each of the receiving elements 11.

Since the bonding wires 28 and 29 are provided above the receiving surface 11a of each of the receiving elements 11, the bonding wires 28 and 29 are likely to be cut by an ultrasonic wave received by each of the receiving elements 11.

Moreover, if the transmission element of the transmission section 209 is made to have the same structure as that of the receiving element 11, the bonding wires 28 and 29 become obstacles to inhibit an ultrasonic wave from being transmitted from the transmission surface of the transmission element. As a result, there is a possibility that the transmission output is lowered.

Moreover, since the bonding wires 28 and 29 are provided above the transmission surface of the transmission element, the bonding wires 28 and 29 are likely to be cut by an ultrasonic wave transmitted from the transmission element.

[D] Since an inductance of a signal wiring in the receiving section 10 is increased by a length of each of the bonding wires 28 and 29, a transfer rate of an electric signal generated from the receiving section 10 is lowered.

Moreover, if the transmission element of the transmission section 209 is made to have the same structure as that of the receiving element 11, an inductance of a signal wiring in the transmission section 209 is increased by a length of each of the bonding wires 28 and 29. Therefore, a transfer rate of an input signal to the transmission section 209 is lowered to lower an operation speed of the transmission section 209.

[E] Since the sensor substrate 32 is increased in size by an area occupied by the electrode pads 33 (a layout area) formed on the sensor substrate 32, the ultrasonic sensor M is disadvantageously increased in size.

On the other hand, in each of the receiving elements 201 according to Embodiment 9, the unpackaged substrate 202 corresponding to a bare chip (die) is directly mounted face-down on the sensor substrate 32. The electrode layers 24 and 26 of each of the receiving elements 201 formed on the substrate 202 and the wiring layers 205 and 206 on the sensor substrate 32 are connected through the bumps 207 and 208, respectively.

Specifically, since the receiving elements 201 are surface-mounted on the sensor substrate 32 by flip-chip connection in Embodiment 9, the above-described problems [A] to [E] can be solved to obtain the following effects [F] to [J].

[F] Since the receiving section 200 (the receiving elements 201) and the sensor substrate 32 are connected and fixed to each other through the bumps 207 and 208, it can be ensured that the electrical connection between each of the receiving elements 201 and the substrate 32 is kept. As a result, the reliability of the ultrasonic sensor N can be enhanced with an extended lifetime.

Moreover, if the transmission element of the transmission section 209 is made to have the same structure as that of the receiving element 201, it can be ensured that the electrical connection between the transmission element and the sensor substrate 32 is kept.

[G] The fabrication cost for surface-mounting the receiving section 200 on the sensor substrate 32 can be lowered.

Moreover, if the transmission element of the transmission section 209 is made to have the same structure as that of the receiving element 201, the fabrication cost for surface-mounting the transmission section 209 on the sensor substrate 32 can be lowered.

[H] Since the bonding wire is not provided above the receiving surface 201a of each of the receiving elements 201 and therefore no obstacle is present in front of the receiving surface 201a, an ultrasonic wave is not inhibited from getting to the receiving surface 201a. Therefore, the receiving sensitivity of each of the receiving surface 11 can be increased.

Moreover, since the bonding wire is no longer provided above the receiving surface 11a of each of the receiving elements 11, the bonding wire is never cut by the ultrasonic wave received by each of the receiving elements 11.

Moreover, if the transmission element of the transmission section 209 is made to have the same structure as that of the receiving element 201, the transmission of an ultrasonic wave from the transmission surface is not inhibited because the bonding wire is not provided above the transmission surface of the transmission element and therefore no obstacle is present in front of the transmission surface. As a result, the transmission output of the transmission element can be enhanced.

Moreover, since the bonding wire is not provided above the transmission surface of the transmission element, the bonding wire is never cut by the ultrasonic wave transmitted from the transmission element.

[I] Since an inductance of each of the bumps 207 and 208 is smaller than that of each of the bonding wires 28 and 29, an inductance of the signal wiring of the receiving section 200 is reduced to allow a transfer rate of the electric signal generated from the receiving section 200 to be increased.

Moreover, if the transmission element of the transmission section 209 is made to have the same structure as that of the receiving element 201, the inductance of the signal wiring of the transmission section 209 becomes smaller. Accordingly, the transfer rate of an input signal to the transmission section 209 becomes higher to increase the operation speed of the transmission section 209.

[J] It is no longer necessary to provide the electrode pads 33 on the sensor substrate 32. As a result, since the sensor substrate 32 can be reduced in size by the area which was otherwise occupied by the electrode pads 33, the ultrasonic sensor N can be reduced in size as well as in weight.

[9-2]

If the through hole 202a is formed in the substrate 202 so that its sectional area gradually increases from the bottom of the through hole 202a closed by the silicon active layer 22 toward the opening, the through hole 202a can be made to act as the same acoustic horn as the acoustic horn 91 in Embodiment 7. In this case, the bottom of the through hole 202a corresponds to the throat 91a of the acoustic horn 91.

In this manner, the acoustic horn formed by the through hole 202a can be provided for each of the receiving elements 201. As a result, each of the receiving elements 201 can be provided with the directivity of a receiving direction of an ultrasonic wave as in the above-described [7-1] in Embodiment 7.

Moreover, if the transmission element of the transmission section 209 is made to have the same structure as that of the receiving element 201, the transmission element can be provided with the directivity of a transmission direction of an ultrasonic wave.

Moreover, according to Embodiment 9, the through hole 202a can be made to act as an acoustic horn simply by appropriately shaping the through hole 202a. Since it is no longer necessary to provide the acoustic horn 91 as an independent member as in Embodiment 7, the fabrication cost of the receiving section 200 and the transmission section 209 can be lowered as compared with the receiving section 90 and the transmission section 31 in Embodiment 7. At the same time, the receiving section 200 and the transmission section 209 can be reduced in size as well as in weight.

Embodiment 10

Figure 21:
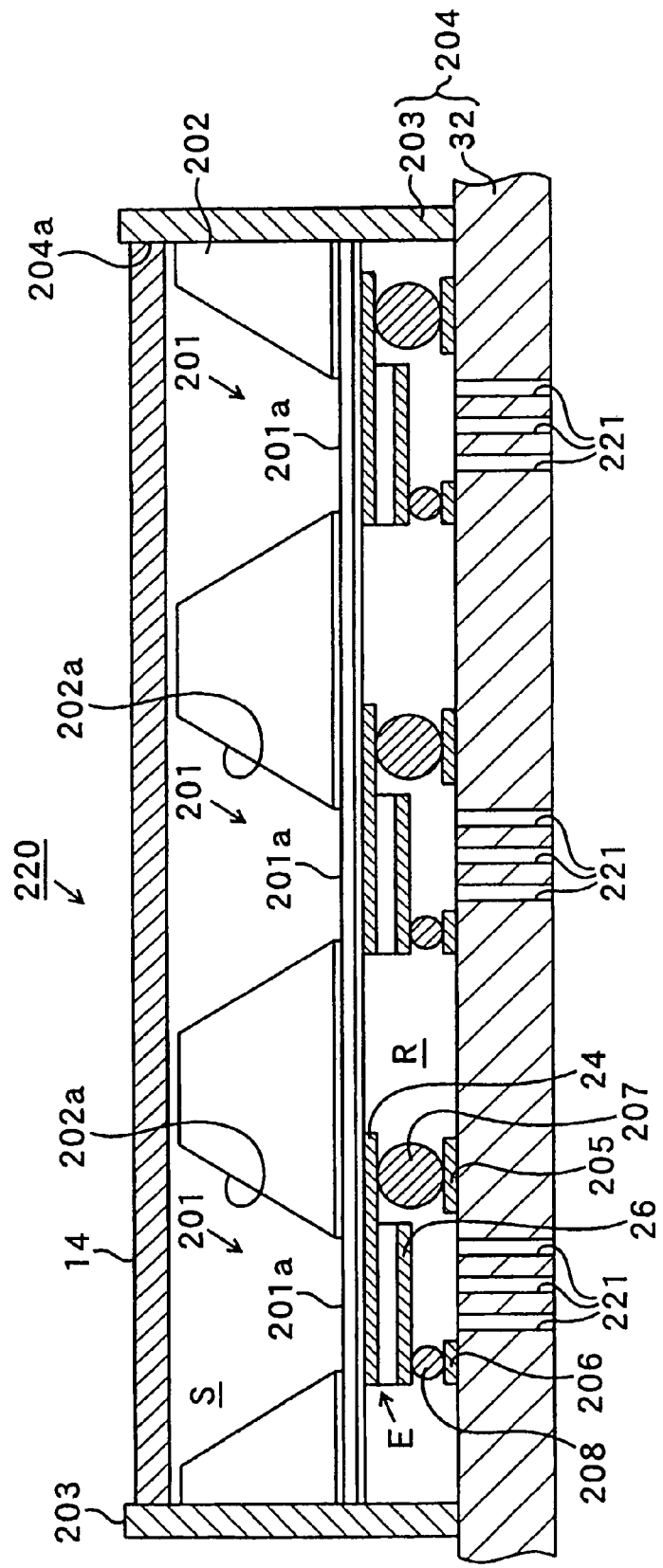
FIG. 21 is a cross-sectional side view of a receiving section according to a tenth embodiment of the present invention adapted for use in the ultrasonic sensor of FIG. 20.

FIG. 21 is a cross-sectional side view showing a receiving section 220 in the ultrasonic sensor N according to Embodiment 10.

The receiving section 220 according to Embodiment 10 differs from the receiving section 200 according to Embodiment 9 only in that at least one (three in the illustrated example) vent hole 221 for bringing the gap R and the exterior of the housing member 204 into communication with each other is formed at a position of the sensor substrate 32 below each of the receiving elements 201.

The structure of the ultrasonic sensor N according to Embodiment 10 is obtained by replacing the receiving section 200 in the ultrasonic sensor N shown in FIG. 20 according to Embodiment 20 with the receiving section 220.

Functions and Effects of Embodiment 10

According to Embodiment 10, in addition to the above-described functions and effects of Embodiment 9, the receiving sensitivity of each of the receiving elements 201 can be prevented from being lowered because the oscillation of the layers 22 to 26 on the receiving surface 201a of each of the receiving elements 201 is not inhibited.

Specifically, in the case where the vent holes 221 are not provided in the sensor substrate 32, the gap R surrounded by the substrate 202 and the housing member 204 (the frame member 203 and the sensor substrate 32) forms a sealed space. Air filling the sealed space acts as a spring so as to apply a damping force due to air on the back face side of the receiving surface 201a of each of the receiving elements 201. As a result, there is a possibility that the free oscillation of the layers 22 to 26 on the receiving surface 201a is inhibited to lower the receiving sensitivity of each of the receiving elements 201.

On the other hand, in Embodiment 10, since air passes through the vent holes 221, a damping force due to air is not applied to the back face side of the receiving surface 201a of each of the receiving elements 201. As a result, each of the layers 22 to 26 on the receiving surface 201a is capable of freely oscillating.

The number, the position of arrangement, and the size and shape of the vent hole 221 can be determined by experimentally finding their optimal values by a cut-and-try method so as to obtain satisfactory functions and effects described above.

Moreover, a filter material (for example, a mesh filter or the like), which does not suppress the air permeability of the vent hole 221, may be attached and fixed.

If the transmission section 209 is made to have the same structure as that of the receiving section 220 and the vent hole 221 is provided at a position of the sensor substrate 32 below each of the transmission elements in the transmission section 209, a damping force due to air is not applied to the back face side of the transmission surface of the transmission element because air passes through the vent holes 221. Accordingly, the layers 22 to 26 on the transmission surface can freely oscillate so as not to suppress the oscillation, thereby increasing the transmission output of the transmission element.

Embodiment 11

Figure 22:
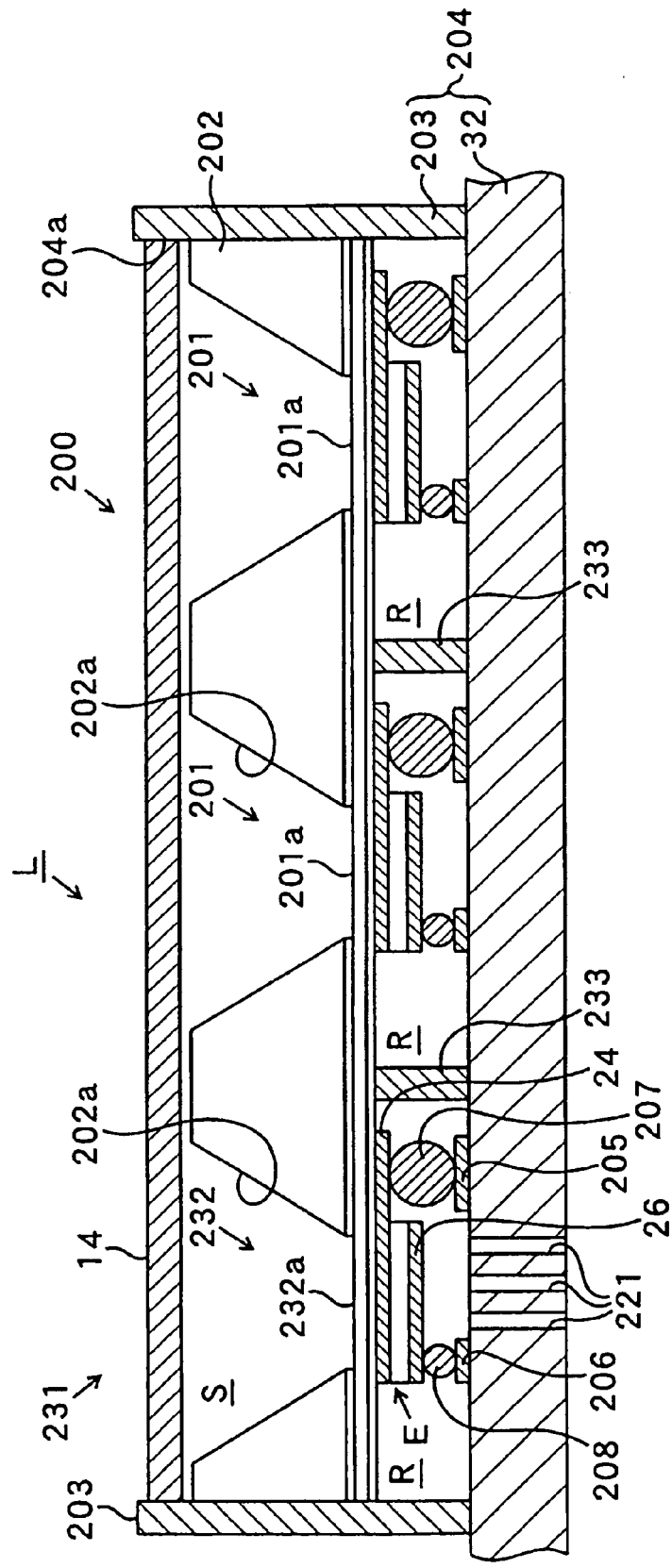
FIG. 22 is a cross-sectional side view of a receiving section according to an eleventh embodiment of the present invention adapted for use in the ultrasonic sensor of FIG. 20.

FIG. 22 is a cross-sectional side view showing a receiving section 230 and a transmission section 231 in an ultrasonic sensor L according to Embodiment 11.

Figure 23:
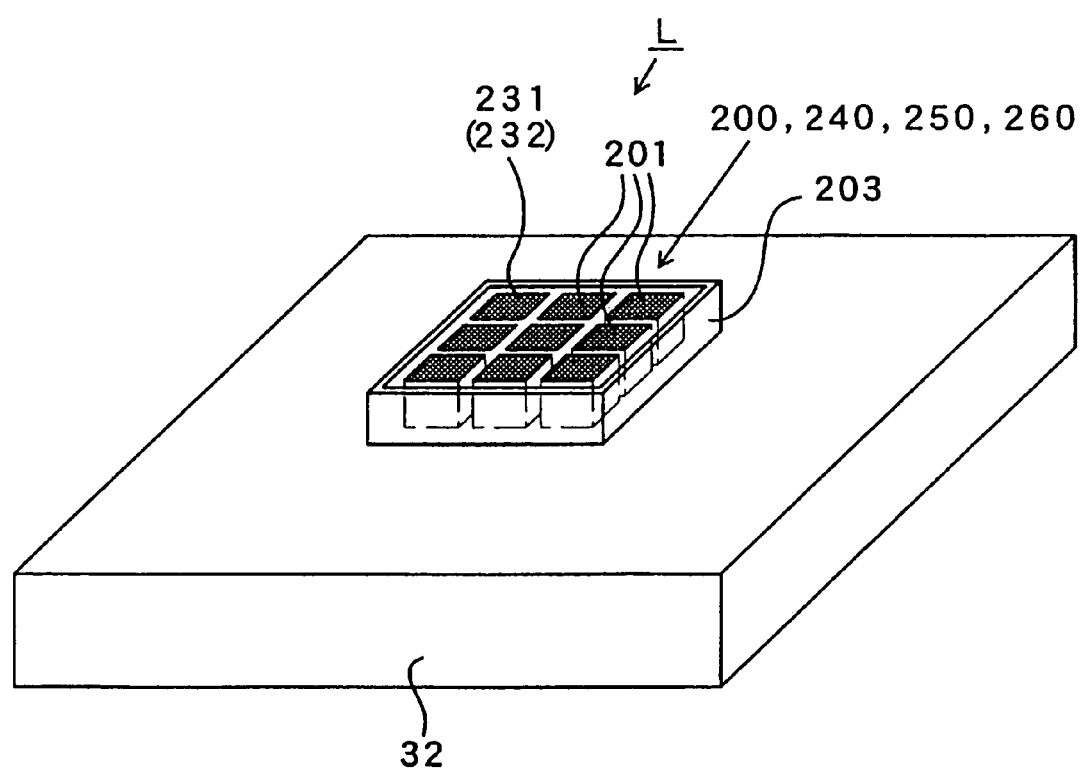
FIG. 23 is a perspective view of a fourth ultrasonic sensor according to the principles of the present invention.

FIG. 23 is a schematic perspective view showing the ultrasonic sensor L.

The ultrasonic sensor L according to Embodiment 11 differs from the ultrasonic sensor N according to Embodiment 9 only in the following points.

[a]

The ultrasonic sensor L is composed of the monolithic IC including the receiving section 200 and the transmission section 231 formed on the single substrate 202 so as to be further reduced in size and weight as compared with the ultrasonic sensor N.

The transmission section 231 is composed of one transmission element 232. The transmission element 232 has the same structure as that of each of the receiving elements 201 constituting the receiving section 200.

The transmission element 232 having the same structure as that of the receiving element 201 transmits an ultrasonic wave from a transmission surface 232a corresponding to the receiving surface 201a of the receiving element 201.

In the example shown in FIG. 23, among nine elements having the same structure arranged 3 by 3, one element arranged at the corner is made to act as the transmission element 232, whereas the other eight elements are made to act as the receiving elements 201.

However, among a plurality of elements having the same structure arranged on the substrate 12, an arbitrary number of elements can be made to act as the transmission elements 232.

[b]

Partition members 233 are provided in the gap R surrounded by the substrate 202 and the housing member 204 (the frame member 203 and the sensor substrate 32).

A lower end of each of the partition members 233 is attached and fixed to an upper surface of the sensor substrate 32 by an appropriate method (for example, thermal welding, ultrasonic welding, bonding with an adhesive or the like) so as to air-seal a connection part between the lower end of each of the partition members 233 and the sensor substrate 32. An upper end of each of the partition members 233 is attached and fixed to a lower face of the insulating layer 23 on the substrate 202 by the above-mentioned appropriate method so as to air-seal a connection part between the upper end of each of the partition members 233 and the substrate 202.

The partition members 233 partition the gap R for each of the elements 201 and 232 in an air-tight manner.

[c]

At least one (three in the illustrated example) vent hole 221 for bringing the gap R and the exterior of the housing member 204 into communication with each other is formed at a position of the sensor substrate 32 below each of the transmission elements 232.

The vent hole 221 is not formed at a position of the sensor substrate 32 below each of the receiving elements 201.

Functions and Effects of Embodiment 11

According to Embodiment 11, the following functions and effects can be obtained in addition to the above-described functions and effects of Embodiment 9.

[11-1]

When the gap R surrounded by the substrate 202 and the housing member 204 (the frame member 203 and the sensor substrate 32) is formed as a sealed space, air filling the sealed space acts as a spring so as to apply a damping force due to air on the back face side of each of the faces (the receiving surface and the transmission surface) 201a and 232a of the respective elements 201 and 232. Since the free oscillation of the layers 22 to 26 on each of the faces 201a and 232a is inhibited, a resonance value Q of the diaphragm composed of the layers 22 to 26 is reduced.

On the other hand, in the case where the vent holes 221 are provided in the sensor substrate 32, air passes through the vent holes 221. Therefore, a damping force due to air is not applied on the back face side of each of the faces 201a and 232a of the respective elements 201 and 232, the free oscillation of the layers 22 to 26 on each of the faces 201a and 232a is not inhibited. Accordingly, the resonance value Q of the diaphragm composed of the layers 22 to 26 becomes large.

Figure 24A:
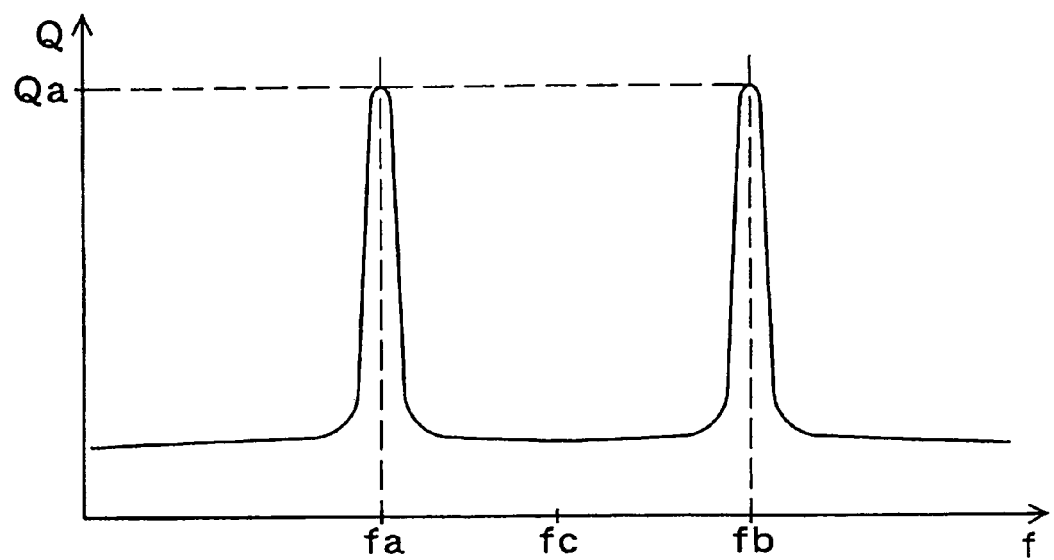
FIGS. 24A and 24B are graphs showing a resonance characteristic corresponding to the relation between a resonance value of a diaphragm and a frequency according to the principles of the present invention.
Figure 24B:
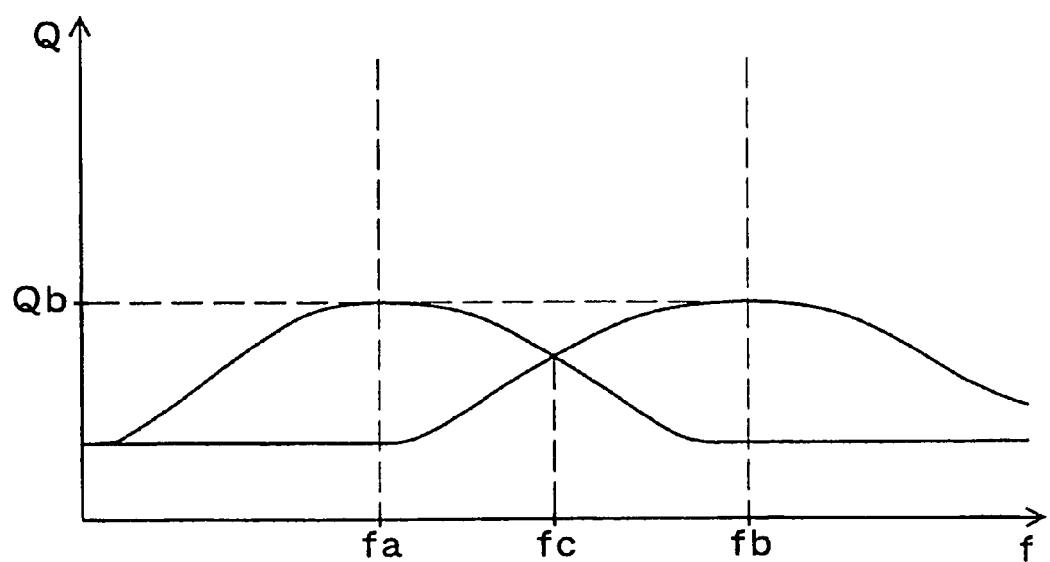

FIGS. 24A and 24B are characteristic views, each showing a resonance characteristic corresponding to the relation between the resonance value Q of the diaphragm and a frequency f.

As shown in FIG. 24A, if a peak value Qa of the resonance value Q of the diaphragm is large, the resonance value Q demonstrates a steep change with respect to a change in frequency f corresponding to the peak value Qa mainly at primary resonance frequencies fa and fb.

As shown in FIG. 24B, if a peak value Qb of the resonance value Q of the diaphragm is small, the resonance value Q demonstrates a gentle change with respect to a change in frequency f corresponding to the peak value Qb mainly at the primary resonance frequencies fa and fb.

The resonance value Q of the diaphragm and the transmission output of the transmission element 232 are positively correlated with each other; as the resonance value Q becomes larger, the transmission output becomes greater.

The piezoelectric element or the capacitive element fabricated by employing the MEMS technique is not suitable as a transmission element because it has a small transmission output of an ultrasonic wave.

Thus, the piezoelectric transmission element 232 fabricated by employing the MEMS technique is required to increase its transmission output as much as possible so as to have the resonance characteristic shown in FIG. 24A.

Therefore, according to Embodiment 11, since air passes through the vent holes 221 formed in the sensor substrate 32, a damping force due to air is not applied to the back face side of the transmission surface 232a of each of the transmission elements 232. As a result, since the layers 24 to 26 on the transmission surface 232a can freely oscillate so as not to be inhibited from oscillating, each of the transmission elements 232 can be provided with the resonance characteristic shown in FIG. 24A so as to increase the transmission output.

[11-2]

The resonance value Q of the diaphragm and the receiving sensitivity of the receiving element 201 are positively correlated with each other; as the resonance value Q becomes larger, the receiving sensitivity becomes greater.

Herein, each of the receiving elements 201 has a fluctuation in primary resonance frequency due to a fabrication process.

For example, if two receiving elements 201 have the resonance characteristic shown in FIG. 24A so that one of the receiving elements 201 has the primary resonance frequency fa whereas the other receiving element 201 has the primary resonance frequency fb, the receiving sensitivity at the frequencies fa and fb becomes extremely high. However, the receiving sensitivity at a frequency fc between the frequencies fa and fb becomes extremely low.

On the other hand, if two receiving elements 201 have the resonance characteristic shown in FIG. 24B so that one of the receiving elements 201 has the primary resonance frequency fa whereas the other receiving element 201 has the primary resonance frequency fb, the receiving sensitivity at the frequencies fa and fb is lower than that in FIG. 24A. However, the receiving sensitivity at the frequency fc becomes higher than that in FIG. 24A.

Specifically, if the resonance value Q of the receiving element 201 is increased, the receiving sensitivity demonstrates a steep characteristic with respect to a change in frequency although the receiving sensitivity becomes high. Therefore, the receiving sensitivity at a frequency offset from the primary resonance frequency is suddenly lowered even if the offset is slight.

On the contrary, if the resonance value Q of the receiving element 201 is reduced, the receiving sensitivity demonstrates a gentle characteristic with respect to a change in frequency although the receiving sensitivity is lowered. Therefore, the receiving sensitivity at a frequency offset from the primary resonance frequency is not greatly lowered.

Since the piezoelectric element or the capacitive element fabricated by employing the MEMS technique has a high receiving sensitivity of an ultrasonic wave, it is suitable as the receiving element.

Therefore, the piezoelectric receiving element 201 fabricated by employing the MEMS technique is required to have a high receiving sensitivity over a broad frequency range as much as possible rather than to have a high receiving sensitivity at the primary resonance frequency. Therefore, the piezoelectric receiving element 201 is required to have the resonance characteristic shown in FIG. 24B.

Thus, according to Embodiment 11, since the vent hole 221 is not formed at a position of the sensor substrate 32 below each of the receiving elements 201, a damping force due to air is applied to the back face side of the receiving surface 201a of each of the receiving elements 201. As a result, the oscillation of the layers 24 to 26 on the receiving surface 201a is inhibited. Accordingly, each of the receiving elements 201 is provided with the resonance characteristic shown in FIG. 24B to increase receiving sensitivity over a broad frequency range as much as possible.

[11-3]

If the gap R situated below each of the receiving elements 201 is filled with a material for suppressing the oscillation of the layers 22 to 26 (for example, a liquid, a sol, a gel or the like), the resonance value Q of the diaphragm composed of the layers 22 to 26 can be reduced as compared with the case where the gap R is filled with air.

Therefore, if the material for filling the gap R situated below each of the receiving elements 201 is appropriately selected, a desired resonance characteristic can be obtained without altering the structure of each of the receiving elements 201.

Moreover, if the gap R is filled with a material for preventing the layers 22 to 26 from being excessively oscillated, the layers 22 and 26 can be prevented from being excessively oscillated to be broken.

As the filler in the gap R situated blow each of the receiving elements 201, an optimal material can be experimentally found by a cut-and-try method so as to obtain satisfactory functions and effects described above in [11-2].

Even in Embodiments 1, 3 and 5 to 8, a desired resonance characteristic can be obtained without altering the structure of each of the receiving elements 11.

Embodiment 12

Figure 25:
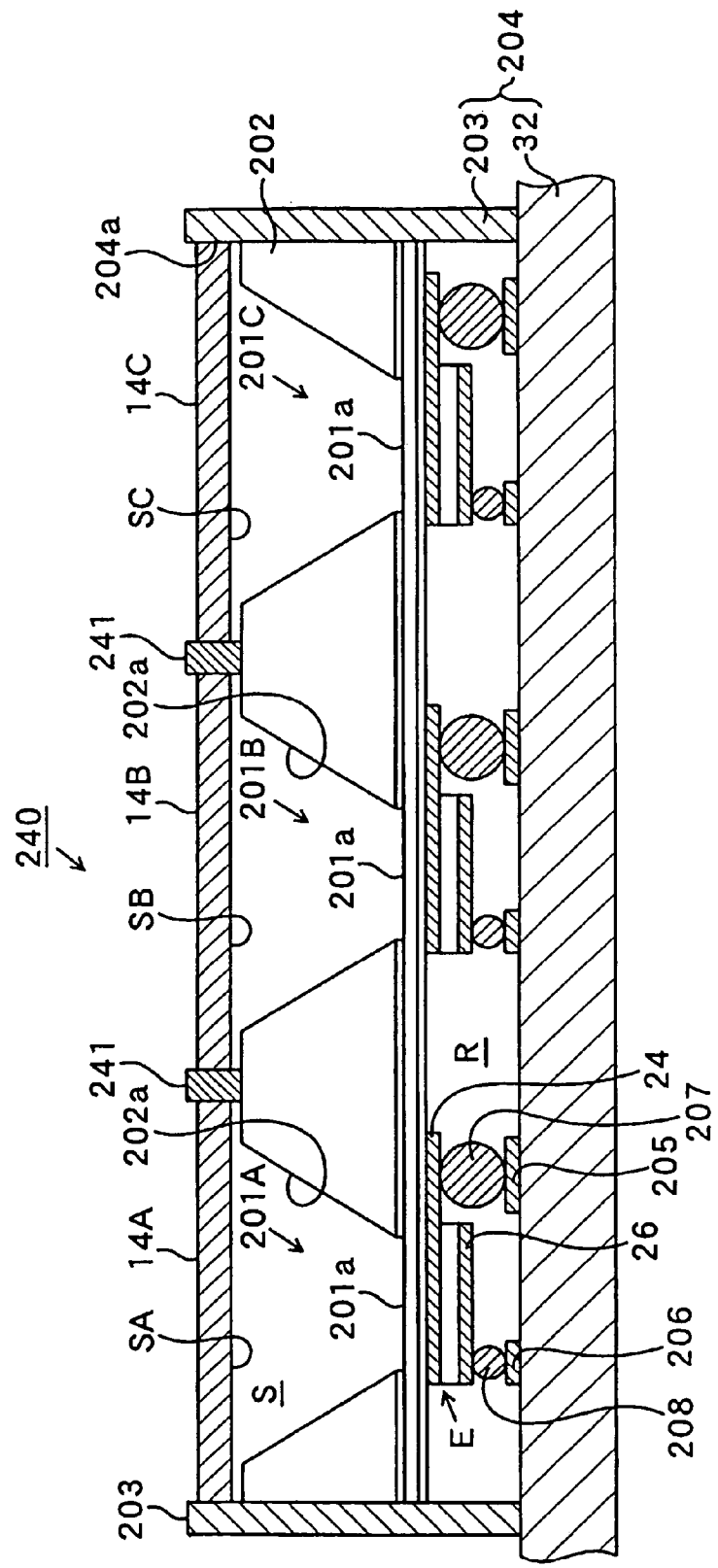
FIG. 25 is a cross-sectional side view of a receiving section according to an twelfth embodiment of the present invention adapted for use in the ultrasonic sensor of FIG. 20.

FIG. 25 is a cross-sectional side view showing a receiving section 240 in the ultrasonic sensor N according to Embodiment 12.

The receiving section 240 according to Embodiment 12 differs from the receiving section 200 according to Embodiment 9 only in that separation members 241 are provided.

A lower end of each of the separation members 241 is attached and fixed to the substrate 202 between the receiving elements 201 by an appropriate method (for example, thermal welding, ultrasonic welding, bonding with an adhesive or the like) so as to air-seal a connection part of the lower end of each of the separation members 241 and the substrate 202.

The upper end of each of the separation members 241 separates the gap S and the protective film 14 for each receiving element.

Specifically, in the example shown in FIG. 25, the lower ends of the separation members 241 are attached and fixed to the substrate 202 between the receiving elements 201A and 202B, and 202B and 202C, respectively.

Then, the gaps SA to SC and the protective films 14A to 14C situated above (in front of) the receiving elements 201A to 201C are separated by the separation members 241 for the receiving elements 201A to 201C, respectively.

The structure of the ultrasonic sensor N according to Embodiment 12 is obtained by replacing the receiving section 200 of the ultrasonic sensor N shown in FIG. 20 according to Embodiment 9 with the receiving section 240.

Functions and Effects of Embodiment 12

According to Embodiment 12, the following functions and effects can be obtained in addition to the above-described functions and effects of Embodiment 9.

[12-1]

The gaps SA to SC and the protective films 14A to 14C situated above (in front of) the receiving elements 201A to 201C are separated by the separation members 241 for each of the receiving elements 201A to 201C, respectively. Therefore, the oscillation of the single protective film 14A obtained by the separation propagates only to the receiving element 201A through the gap SA situated below the protective film 14A but not to the other receiving elements 201B and 201C.

Therefore, according to Embodiment 12, an ultrasonic wave can be received by each of the receiving elements 201A to 201C in a separate manner. Accordingly, a crosstalk characteristic of each of the receiving elements 201A to 201C can be prevented from being degraded.

Alternatively, a plurality of the adjacent receiving elements 201 may be grouped into one. The separation member 241 may be provided for each group so as to separate the group from the other groups.

[12-2]

The separation members 241 have to surely block the oscillation of the protective film 14A and the gap SA vertically arranged to be grouped into one so that the oscillation does not propagate to the members of the other adjacent groups (the protective films 14B and 14C and the gaps SB and SC).

For this reason, a material having a high oscillation blocking property is required to be used for the separation members 241. Examples of the material include rubbers.

[12-3]

Figure 26:
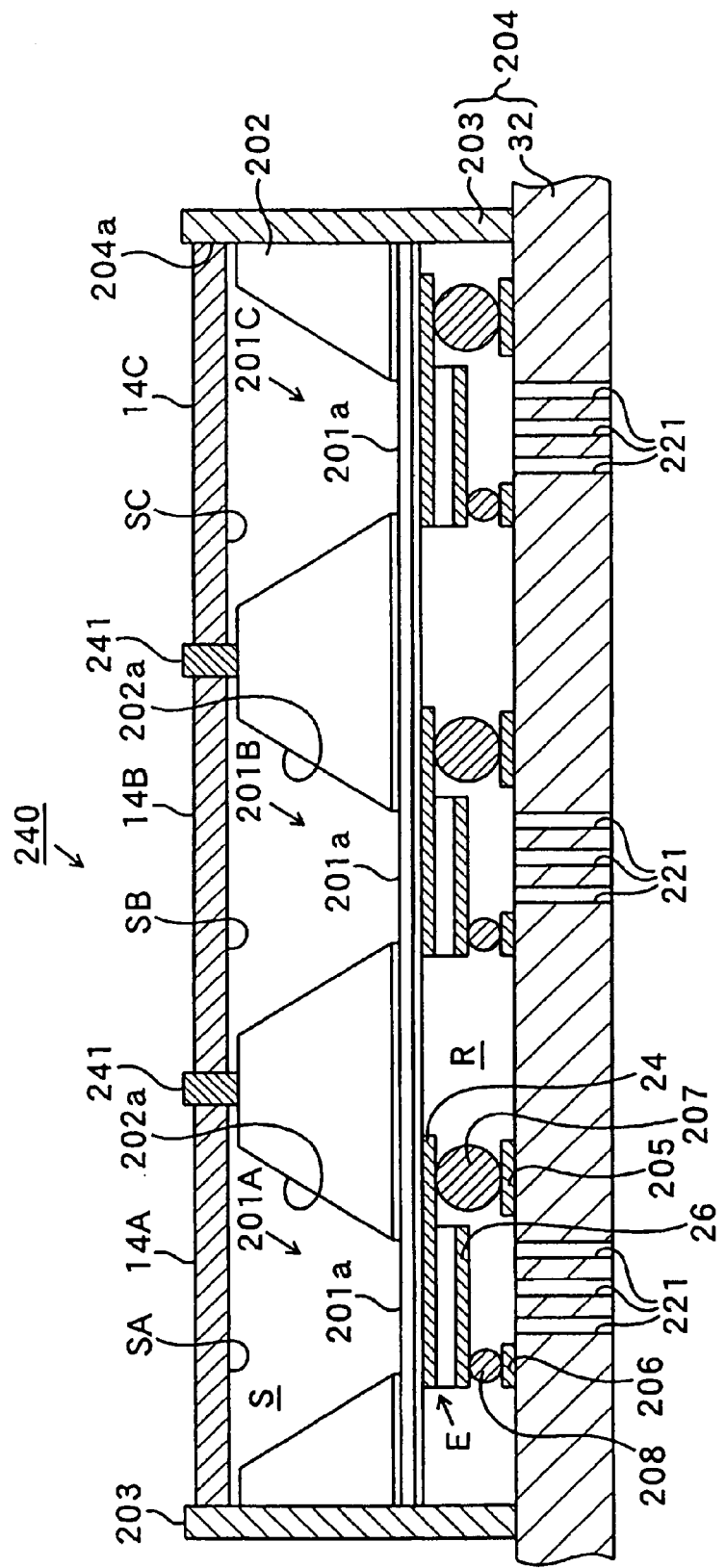
FIG. 26 is a cross-sectional side view of a first alternative receiving section of the twelfth embodiment of the present invention.

FIG. 26 is a cross-sectional side view showing the receiving section 240 in the ultrasonic sensor N according to a first variation of Embodiment 12.

The first variation shown in FIG. 26 differs from Embodiment 12 shown in FIG. 25 only in that the vent holes 221 for bringing the gap R and the exterior of the housing member 204 into communication with each other are formed at a position of the sensor substrate 32 below each of the receiving elements 201.

Specifically, the first variation of Embodiment 12 corresponds to the combination of Embodiments 12 and 10. Accordingly, the functions and effects of Embodiment 10 can be obtained in addition to the functions and effects of Embodiment 12.

[12-4]

Figure 27:
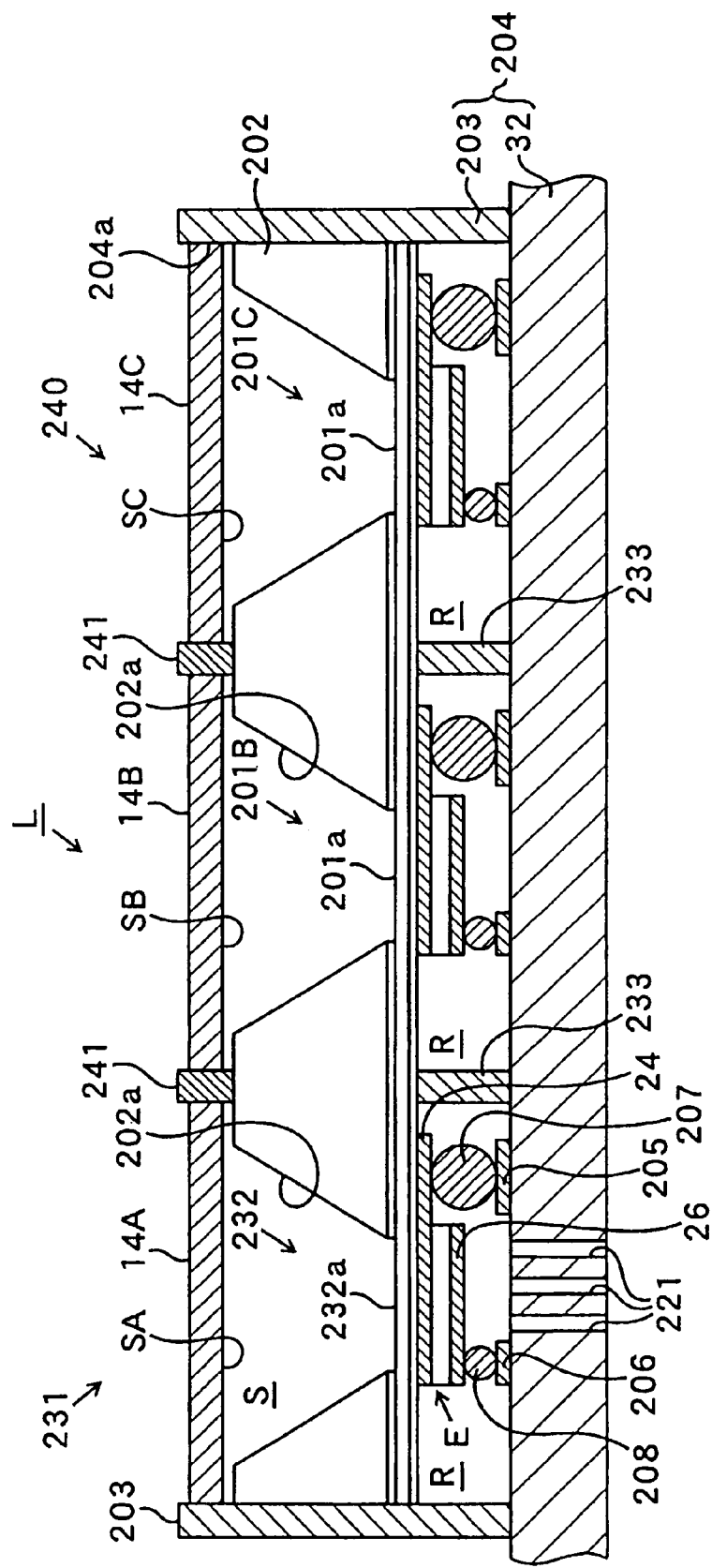
FIG. 27 is a cross-sectional side view of a second alternative receiving section and a transmission section of the twelfth embodiment of the present invention.

FIG. 27 is a cross-sectional side view showing the receiving section 240 and the transmission section 231 in the ultrasonic sensor L according to a second variation of Embodiment 12.

The second variation shown in FIG. 27 differs from Embodiment 12 shown in FIG. 25 only in that the same points as described in [a] to [c] of Embodiment 12.

Specifically, the second variation of Embodiment 12 corresponds to the combination of Embodiments 12 and 11. Therefore, the above-described functions and effects of Embodiment 11 can be obtained in addition to the functions and effects of Embodiment 12.

Embodiment 13

Figure 28:
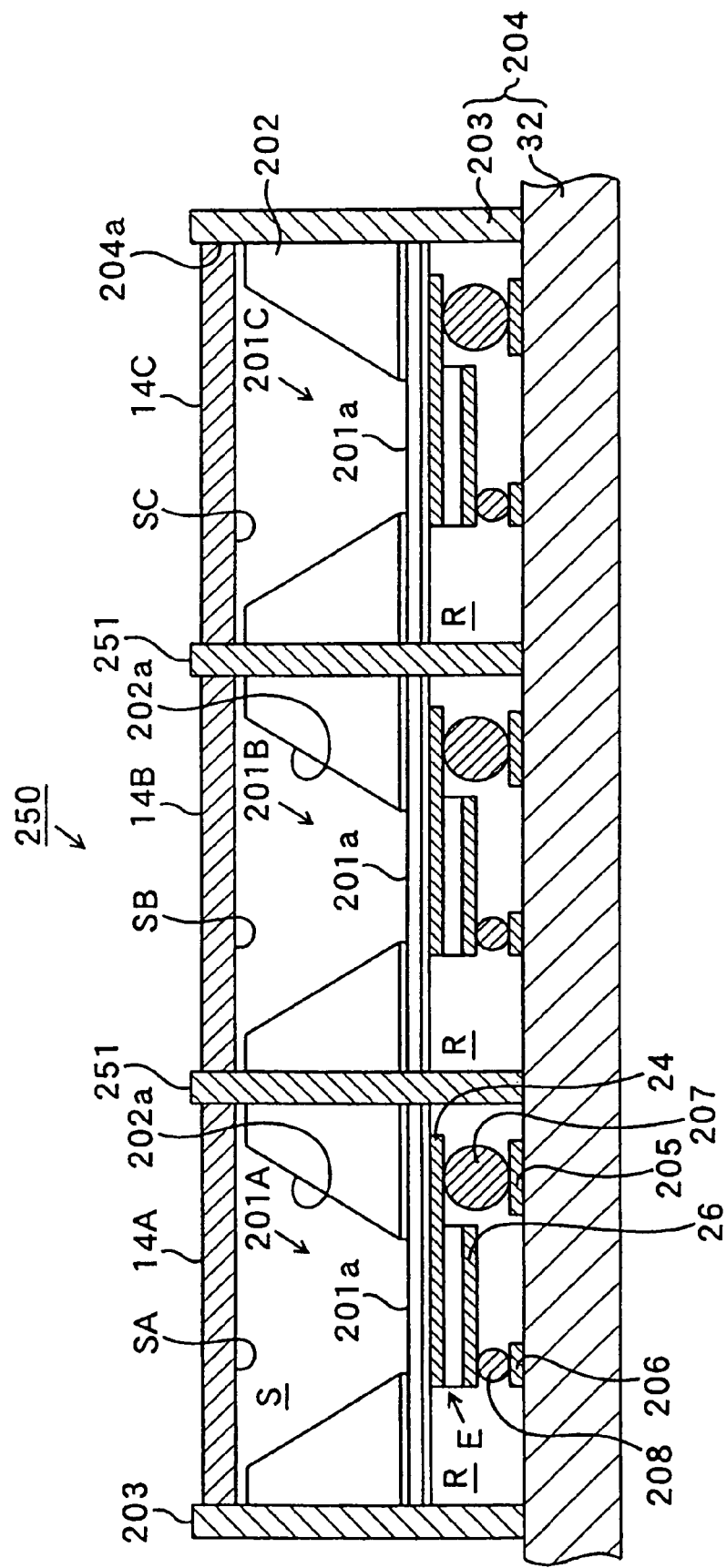
FIG. 28 is a cross-sectional side view of a receiving section according to a thirteenth embodiment of the present invention adapted for use in the ultrasonic sensor of FIG. 20.

FIG. 28 is a cross-sectional side view showing a receiving section 250 in the ultrasonic sensor N according to Embodiment 13.

The receiving section 250 of Embodiment 13 differs from the receiving section 200 of Embodiment 9 only in that separation members 251 are provided.

A lower end of each of the separation members 251 is attached and fixed to an upper surface of the sensor substrate 32 by an appropriate method (for example, thermal welding, ultrasonic welding, bonding with an adhesive and the like) so as to air-seal a connection part between the lower end of each of the separation members 251 and the sensor substrate 32.

The upper end of each of the separation members 251 separates the space S and the protective film 14 for each of the receiving elements 201.

Specifically, in the example illustrated in FIG. 28, the lower ends of the separation members 251 are attached and fixed to the upper surface of the sensor substrate 32 between the receiving elements 201A and 201B, and 201B and 201C, respectively, whereby the separation members 251 separate the receiving elements 201A to 201C from each other.

The gaps SA to SC and the protective films 14A to 14C respectively situated above (in front of) the receiving elements 201A to 201C are separated by the separation members 251 for each of the receiving elements 201A to 201C, respectively.

Specifically, the receiving section 200 according to Embodiment 9 is composed of a monolithic IC including the receiving elements 201 of the receiving section 230 formed on the single substrate 202.

On the other hand, the receiving section 250 of Embodiment 13 is composed of a hybrid IC including the receiving elements 201 corresponding to chip parts attached and fixed on the sensor substrate 32.

The structure of the ultrasonic sensor N according to Embodiment 13 is obtained by replacing the receiving section 200 of the ultrasonic sensor N shown in FIG. 20 according to Embodiment 9 with the receiving section 250.

Functions and Effects of Embodiment 13

According to Embodiment 13, the following functions and effects can be obtained in addition to the functions and effects of Embodiment 9.

[13-1]

The receiving elements 201A to 201C, and the gaps SA to SC and the protective films 14A to 14C situated above (in front of) the receiving elements 201A to 201C are separated by the separation members 251 for each of the receiving elements 201. Therefore, the oscillation of one protective film 14A obtained by the separation propagates only to the receiving element 201A through the gap SA situated below the protective film 14A but not to the other receiving elements 201B and 201C at all.

Thus, according to Embodiment 13, an ultrasonic wave can be received by each of the receiving elements 201A to 201C in a completely separate manner, so that a crosstalk characteristic of each of the receiving elements 201A to 201C can be prevented from being degraded.

A plurality of adjacent receiving elements 201 may be grouped into one. The separation member 251 may be provided for each of the groups so as to separate the group from the other groups.

[13-2]

The separation members 251 have to surely block the oscillation of the protective film 14A, the gap SA and the receiving element 201A, which are vertically arranged so as to be grouped into one, so that the oscillation does not propagate to the members of the other adjacent groups (the protective films 14B and 14C, the gaps SB and SC, and the receiving elements 201B and 201C).

For this reason, a material having a high oscillation blocking property is required to be used for the separation member 251. Examples of the material include rubbers.

[13-3]

Figure 29:
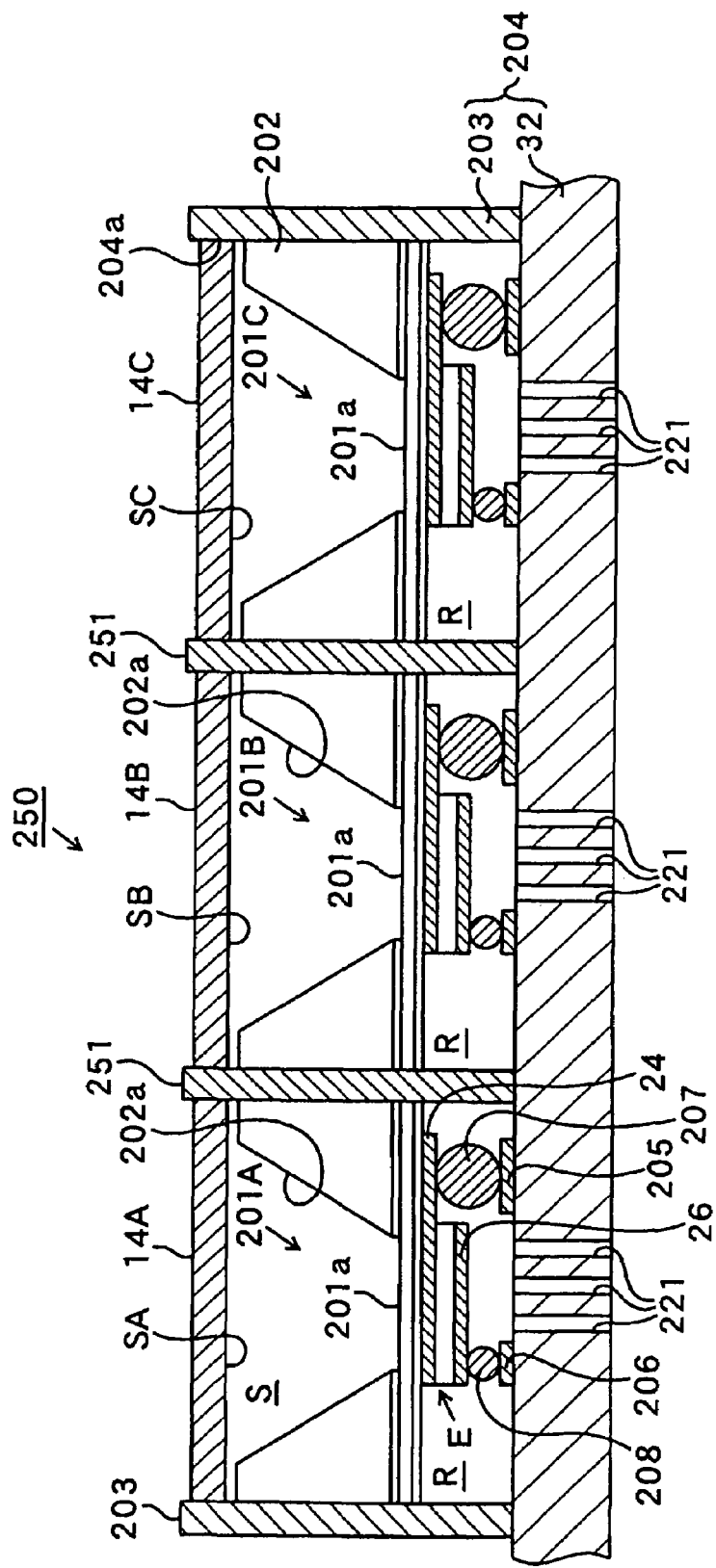
FIG. 29 is a cross-sectional side view of a first alternative receiving section of the thirteenth embodiment.

FIG. 29 is a cross-sectional side view showing the receiving section 250 in the ultrasonic sensor N according to a first variation of Embodiment 13.

The first variation shown in FIG. 29 differs from Embodiment 13 shown in FIG. 28 only in that the vent holes 221 for bringing the gap R and the exterior of the housing member 204 into communication with each other are formed at a position of the sensor substrate 32 below each of the receiving elements 201.

Specifically, the first variation of Embodiment 13 corresponds to the combination of Embodiments 13 and 10. Therefore, in addition to the functions and effects of Embodiment 13, the functions and effects of Embodiment 10 can be obtained.

[13-4]

Figure 30:
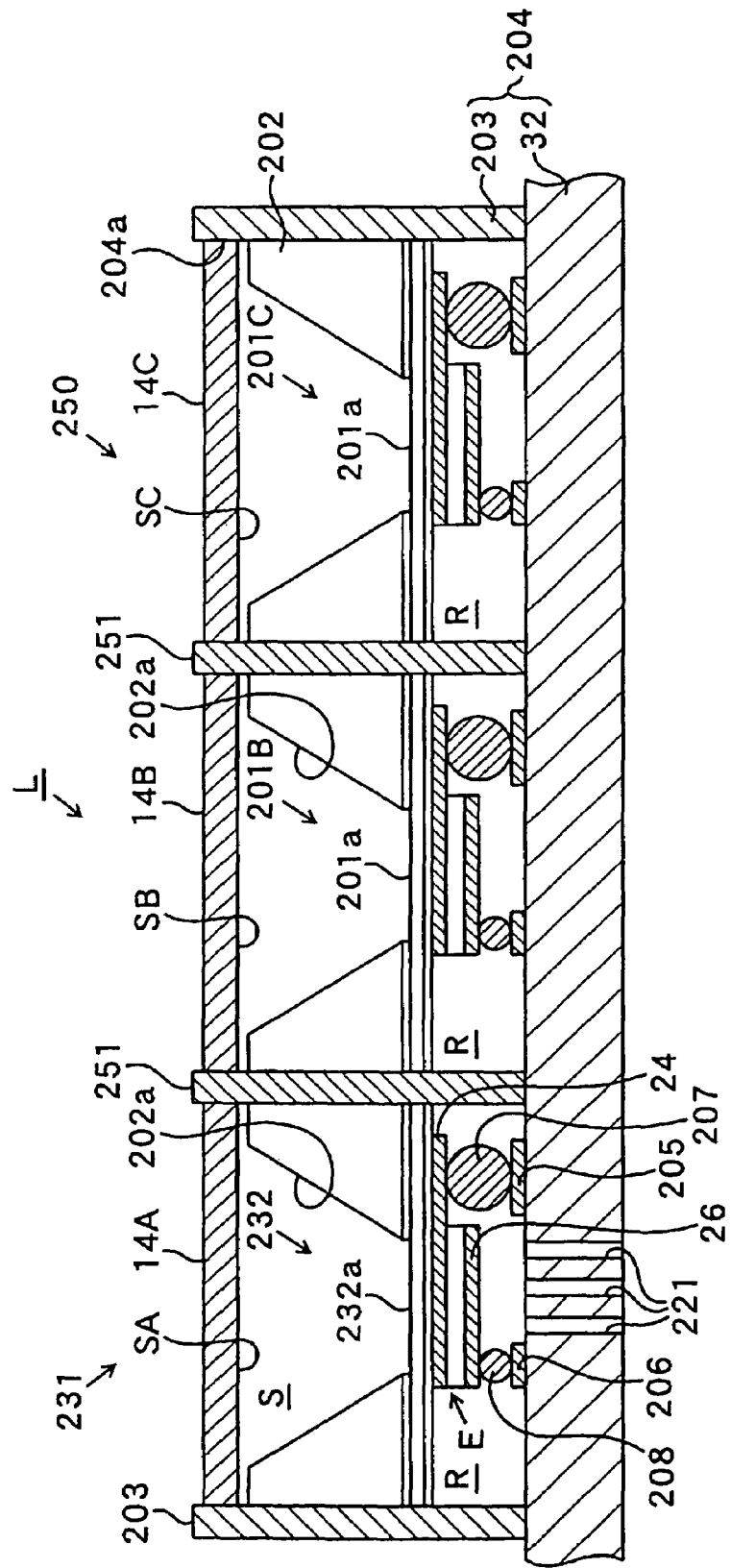
FIG. 30 is a cross-sectional side view of a second alternative receiving section according to the thirteenth embodiment and the transmission section adapted for use in the ultrasonic sensor of FIG. 23.

FIG. 30 is a cross-sectional side view showing the receiving section 250 and the transmission section 231 in the ultrasonic sensor L according to a second variation of Embodiment 13.

The second variation shown in FIG. 30 differs from Embodiment 13 shown in FIG. 28 only in that one of the receiving elements 201 (the receiving element 201A) constituting the receiving section 250 is made to act as the transmission element 232 constituting the transmission section 231 as in the ultrasonic sensor L and the same points as the above-described [b] and [c] in Embodiment 11. The separation members 251 function as the partition members 233 of Embodiment 11.

Specifically, the second variation of Embodiment 13 corresponds to the combination of Embodiments 13 and 11. Therefore, in addition to the functions and effects of Embodiment 13, the functions and effects of Embodiment 11 can be obtained.

Embodiment 14

Figure 31:
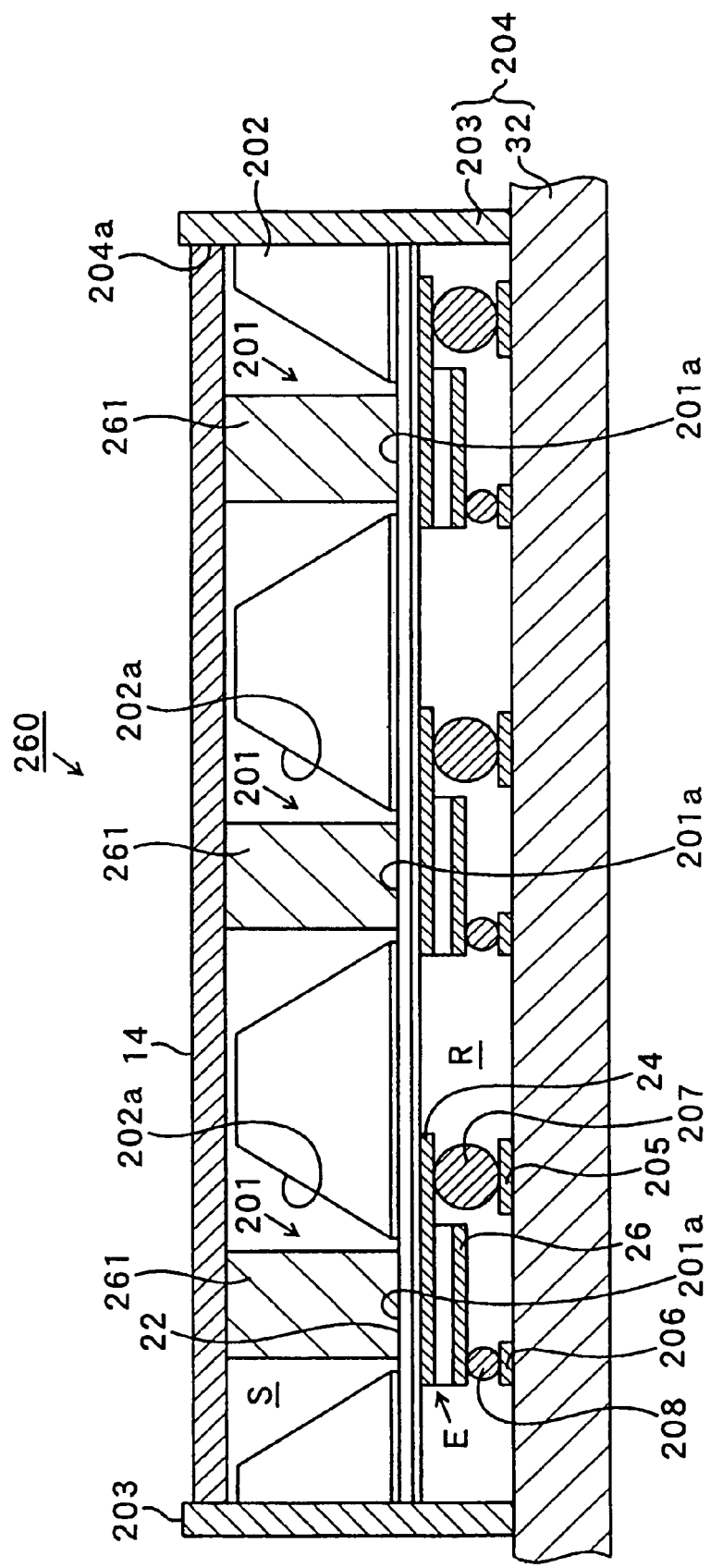
FIG. 31 is a cross-sectional side view of a receiving section according to a fourteenth embodiment of the present invention adapted for use in the ultrasonic sensor of FIG. 20.

FIG. 31 is a cross-sectional side view showing a receiving section 260 in the ultrasonic sensor N in Embodiment 14.

The receiving section 260 of Embodiment 14 differs from the receiving section 200 of Embodiment 9 only in that a column-like transfer member 261 for connecting the receiving surface 201a of each of the receiving elements 201 and the protective film 14 with each other independently for each of the receiving elements 201 is provided in the gap S.

The structure of the ultrasonic sensor N according to Embodiment 14 is obtained by replacing the receiving section 200 of the ultrasonic sensor N shown in FIG. 20 according to Embodiment 9 with the receiving section 260.

Functions and Effects of Embodiment 14

According to Embodiment 14, the following functions and effects can be obtained in addition to the functions and effects described above in [9-1] of Embodiment 9.

[14-1]

When the protective film 14 is oscillated by an ultrasonic wave, the oscillation of the protective film 14 propagates to each of the receiving elements 201 through each of the transfer members 261.

Herein, since the transfer member 261 is provided for each of the receiving elements 201, the oscillation of arbitrary one of the transfer members 261 does not propagate to the other transfer members 261. Therefore, an ultrasonic wave can be received by each of the receiving elements 201 in a separate manner, thereby preventing a crosstalk characteristic of each of the receiving elements 201 from being degraded.

The propagation of oscillation of the protective film 14 to each of the transfer members 261 can be ensured by bringing an acoustic impedance of each of the transfer members 261 close to that of the protective film 14. As a result, the receiving sensitivity of each of the receiving elements 201 can be enhanced.

Moreover, the propagation of oscillation of each of the transfer members 261 to the silicon active layer 22 can be ensured by bringing an acoustic impedance of each of the transfer members 261 close to that of the silicon active layer 22 of each of the receiving elements 201. As a result, the receiving sensitivity of each of the receiving elements 201 can be enhanced.

Therefore, it is desirable to form the transfer members 261 of the same material as that of the protective film 14 or the silicon active layer 22.

If the transmission section 209 is made to have the same structure as that of the receiving section 260 and the transfer member 261 for bringing the transmission surface of the transmission element and the protective film 14 into communication with each other is provided, the propagation of oscillation of the transfer member 261 to the protective film 14 can be ensured by bringing the acoustic impedance of the transfer member 261 close to that of the protective film 14. As a result, the transmission output of the transmission element can be enhanced.

Moreover, the propagation of oscillation of the silicon active layer 22 of the transmission element to the transfer member 261 can be ensured by bringing the acoustic impedance of the transfer member 261 close to that of the silicon active film 22. As a result, the transmission output of the transmission element can be enhanced.

More specifically, according to Embodiment 14, the same functions and effects as those in [6-1] of Embodiment 6 described above can be obtained.

[14-2]

In order to prevent the crosstalk characteristic of each of the receiving elements 201 from being degraded, it is necessary to prevent the oscillation of arbitrary one of the transfer members 261 from propagating to the other transfer members 261 through the filler in the gap S.

Therefore, in Embodiment 14, it is the most desirable that the gap S be in a vacuum state.

If the gap S is filled with a filler in Embodiment 14, a gas with a small acoustic impedance or a material having a high oscillation absorbance (for example, a highly viscous gel or the like) is used as the filler.

Specifically, according to Embodiment 14, the same functions and effects as those in [6-2] in Embodiment 6 above can be obtained.

[14-3]

Figure 32:
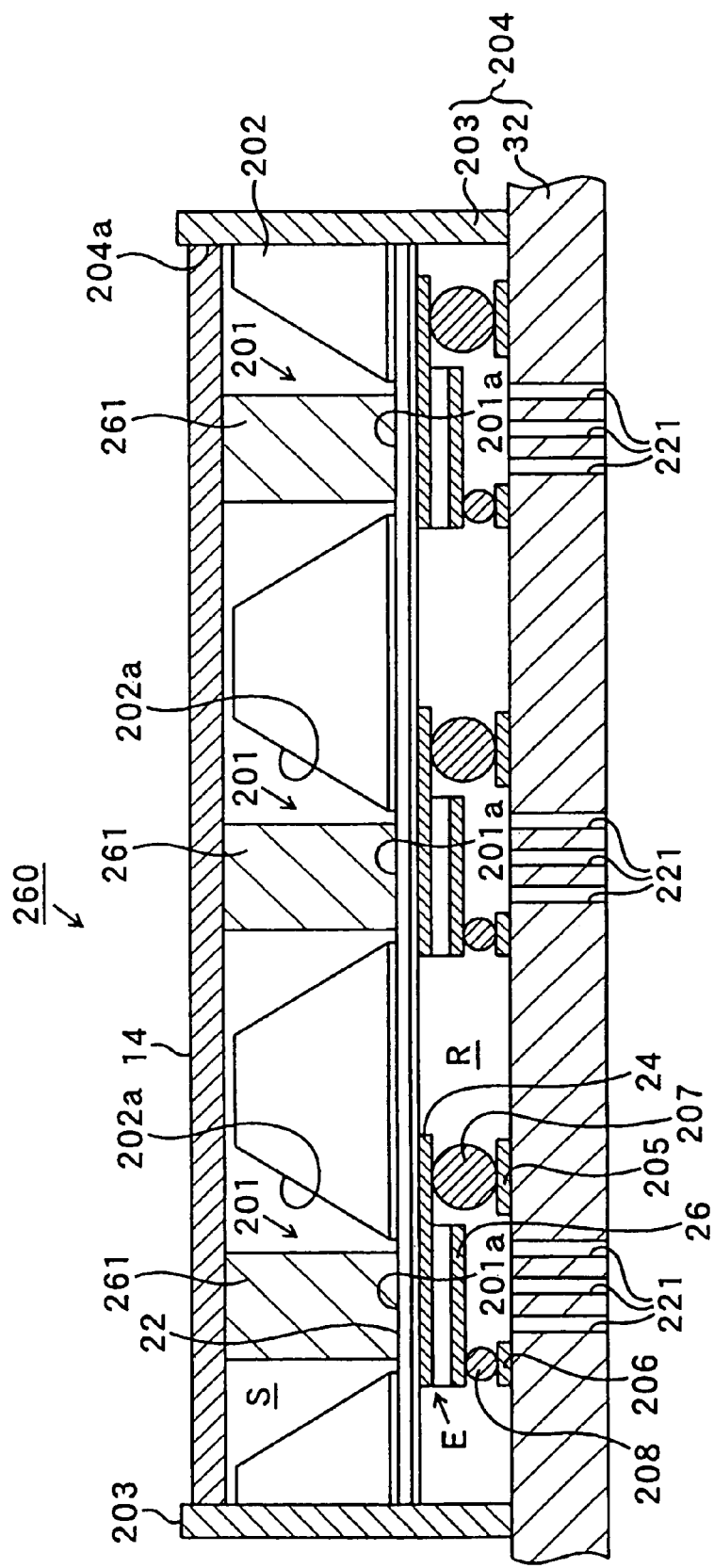
FIG. 32 is a cross-sectional side view of a first alternative receiving section of the fourteenth embodiment of the present invention adapted for use in the ultrasonic sensor of FIG. 20.

FIG. 32 is a cross-sectional side view showing a receiving section 260 in the ultrasonic sensor N according to a first variation of Embodiment 14.

The first variation shown in FIG. 32 differs from Embodiment 14 shown in FIG. 31 only in that the vent holes 221 for bringing the gap R and the exterior of the housing member 204 into communication with each other are formed at a position of the sensor substrate 32 below each of the receiving elements 201.

Specifically, the first variation of Embodiment 14 corresponds to the combination of Embodiments 14 and 10. Therefore, the functions and effects of Embodiment 10 described above can be obtained in addition to the above-described functions and effects of Embodiment 14.

[14-4]

Figure 33:
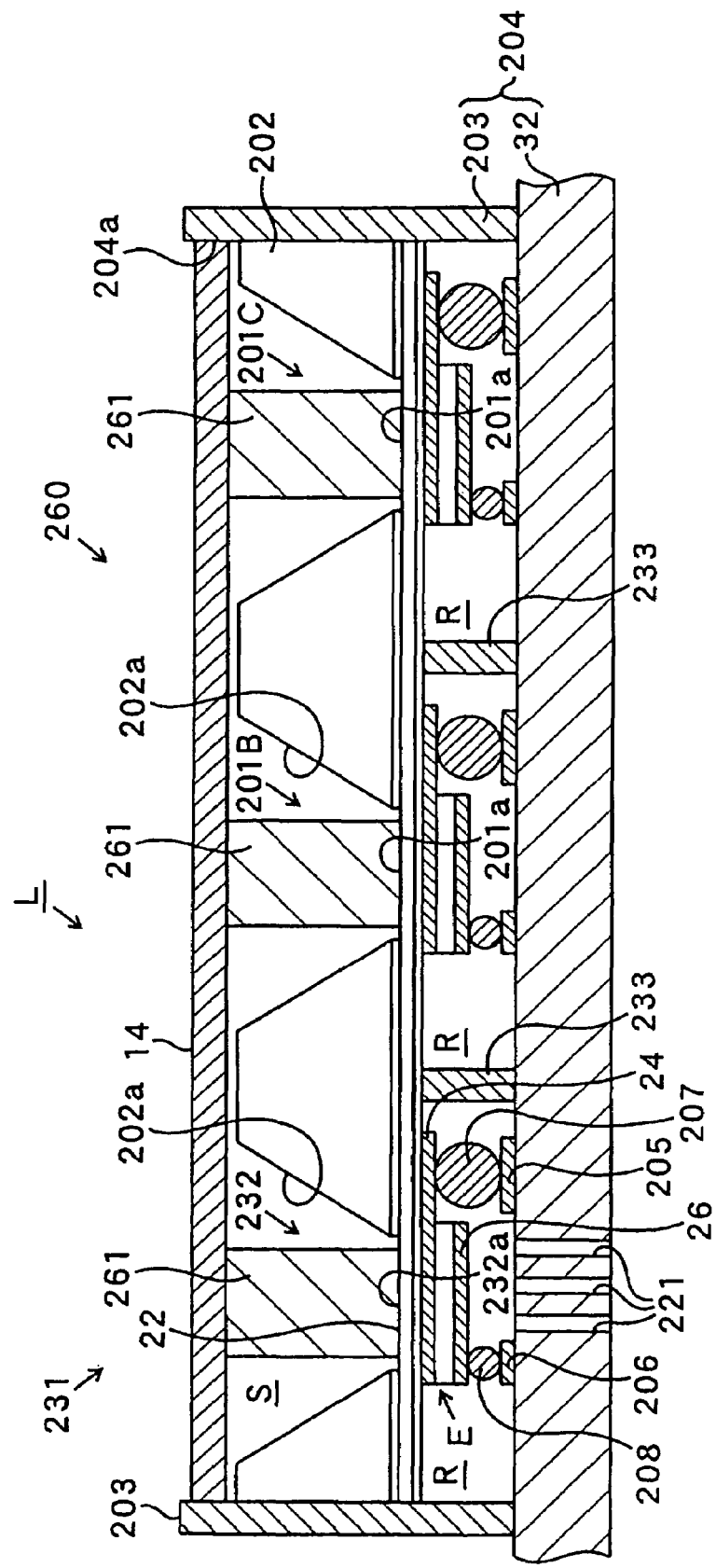
FIG. 33 is a cross-sectional side view of a second alternative receiving section of the fourteenth embodiment and a transmission section adapted for use in the ultrasonic sensor of FIG. 23.

FIG. 33 is a cross-sectional side view showing the receiving section 260 and the transmission section 231 in the ultrasonic sensor N according to a second variation of Embodiment 14.

The second variation shown in FIG. 33 differs from Embodiment 14 shown in FIG. 31 only in the same points as [a] to [c] of Embodiment 11 described above.

Specifically, the second variation of Embodiment 14 corresponds to the combination of Embodiments 14 and 11. Therefore, the functions and effects of Embodiment 11 described above can be obtained in addition to the above-described functions and effects of Embodiment 14.

Exemplary variations of Embodiments 9 to 14

Each of the receiving sections 200 to 260 according to Embodiments 9 to 14 is constituted by the plurality of piezoelectric receiving elements 201.

However, each of the piezoelectric receiving elements 201 may be replaced by a capacitive receiving element 271 so that each of the receiving sections 200 to 260 is constituted by the plurality of capacitive receiving elements 271.

Figure 34:
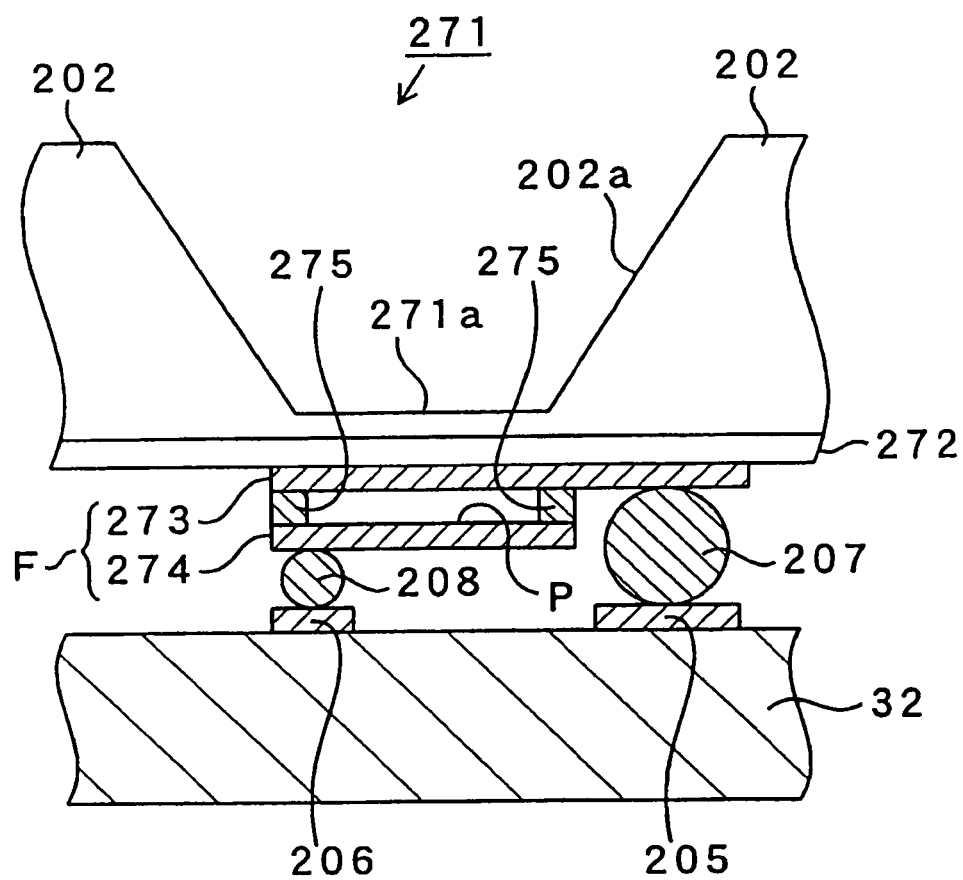
FIG. 34 is an enlarged cross-sectional side view of a capacitive receiving element adapted for use in any one of the receiving sections of the ninth to the fourteenth embodiments including the alternatives to these embodiments.

FIG. 34 is an enlarged cross-sectional side view showing one capacitive receiving element 271.

The through hole 202a penetrating through the substrate 202 is formed in the substrate 202.

On the back face side of the substrate 202, an insulating layer 272 is formed on the surface of the substrate 202 so as to close the lower end of the through hole 202a.

On the back face side of the substrate 202, a fixed electrode layer 273 is formed on a surface of the insulating layer 272 situated below (behind) the through hole 202a. On a surface of the fixed electrode layer 273, a movable electrode layer 274 is formed on a surface of the fixed electrode layer 273 through a clearance P. Spacers 275 are provided between the electrode layers 273 and 274 in their circumferential area. The electrode layers 273 and 274 are connected and fixed to each other through the spacers 275.

The wiring layers 205 and 206 are formed on the surface of the sensor substrate 32.

The fixed electrode layer 273 and the wiring layer 205 are connected with each other through the bump 207, whereas the movable electrode layer 204 and the wiring layer 206 are connected with each other through the bump 208.

In this manner, a capacitive element F having a structure in which the electrodes 273 and 274 are opposed to each other through the clearance P is formed. The receiving element 271 includes the capacitive element F fabricated by employing the MEMS technique.

The surface of the insulating layer 272 exposed through the bottom of the through hole 202a forms a receiving surface 271a of the receiving element 271.

When the movable electrode layer 274 is oscillated by an ultrasonic wave, a distance between the electrode layers 273 and 274 changes so as to change a capacitance. Then, a converting circuit (not shown) connected to the wiring layers 205 and 206 is used to convert a change in capacitance between the electrode layers 273 and 274 into an electric signal.

As described above, even if a plurality of the capacitive receiving elements 271 constitute each of the receiving sections 200 to 260, the movable electrode layer 274 is prevented from being damaged so as to be unlikely to break each of the receiving sections 200 to 260 even if the thin movable electrode layer 274 has a low mechanical strength as in the case where each of the receiving sections 200 to 260 includes the piezoelectric receiving elements 201. As a result, the robust receiving sections 200 to 260 can be obtained.

[2]

Each of the transmission sections 209 and 231 according to Embodiments 9 to 14 includes the piezoelectric transmission elements having the same structure as that of the piezoelectric receiving element 201.

However, each of the transmission sections 209 and 231 may be composed of a capacitive transmission element having the same structure as that of the capacitive receiving element 271 shown in FIG. 34. In such a case, electrostatic attraction is generated between the electrode layers 273 and 274 in accordance with an input signal applied to each of the electrode layers 273 and 274. The electrostatic attraction causes the oscillation of the movable electrode layer 274 to generate an ultrasonic wave.

In this case, the receiving surface 271a of the receiving element 271 acts as a transmission surface of the transmission element for transmitting an ultrasonic wave.

[3]

In Embodiment 14, the protective film 14 may be omitted while the transfer member 261 may be replaced by the same protective member as the protective member 41 in Embodiment 2.

In this manner, the same functions and effects as those of Embodiment 2 can be obtained.

[4]

The ultrasonic sensor N according to Embodiments 9, 10, 12 and 14 and the first variations of Embodiments 12 and 14 is composed of a hybrid IC in which the receiving section 200, 220, 240 or 260 and the transmission section 209 corresponding to chip parts are attached and fixed onto the sensor substrate 32 made of an insulating plate material.

However, the ultrasonic sensor N according to Embodiments 9, 10, 12 and 14 and the first variations of Embodiments 12 and 14 may be composed of a monolithic IC in which the receiving section 200, 220, 240 or 260 and the transmission section 231 are formed on the single substrate 202 as in the case of the ultrasonic sensor L shown in FIG. 23.

As in the case of the ultrasonic sensor L according to the second variation of Embodiment 13, at least arbitrary one of the receiving elements 201 constituting the receiving section 250 may be made to act as the transmission element 232 constituting the transmission section 231 in the ultrasonic sensor N according to Embodiment 13 and the first variation of Embodiment 13.

Figure 35:
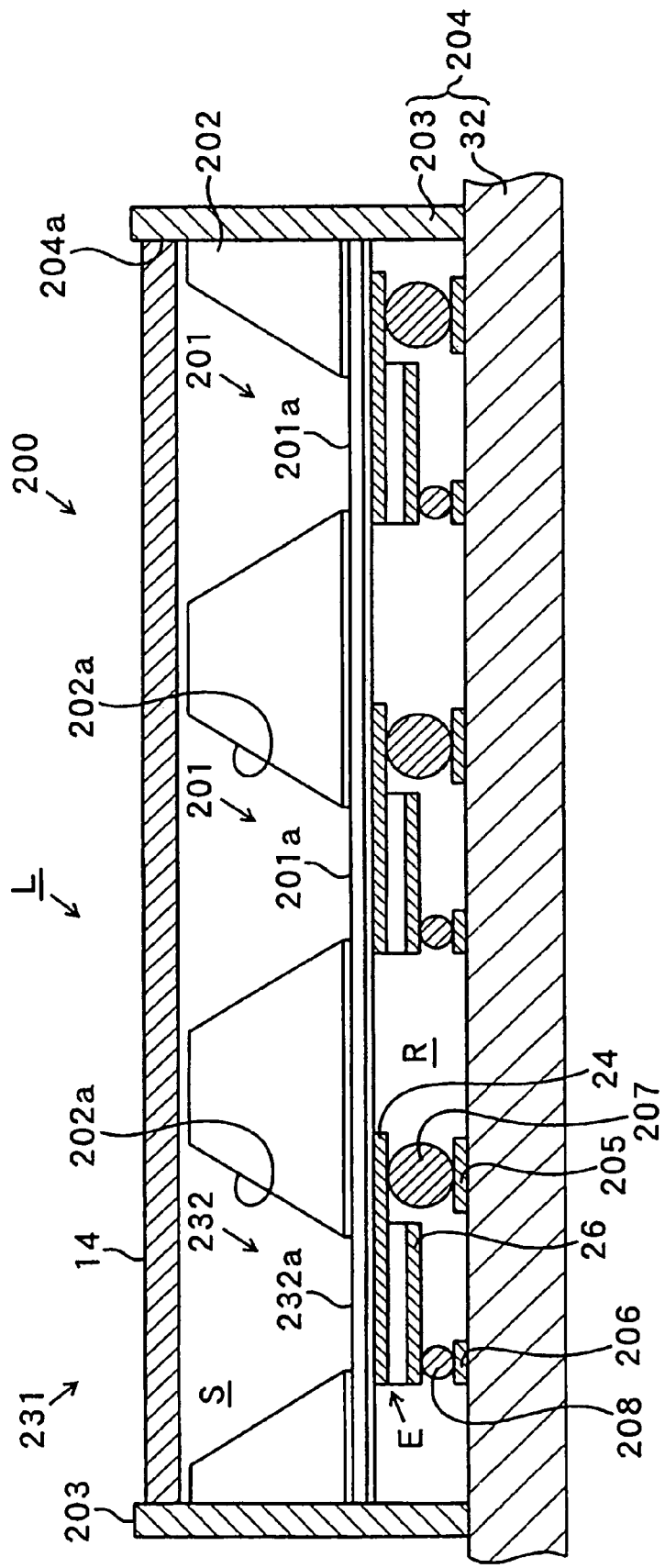
FIG. 35 is a cross-sectional side view of the receiving section and the transmission section of the ninth embodiment adapted to the ultrasonic sensor of FIG. 23.

FIG. 35 is a cross-sectional side view showing an example in which Embodiment 9 is applied to the ultrasonic sensor L, illustrating the receiving section 200 and the transmission section 231 of the ultrasonic sensor L.

This example differs from Embodiment 9 only in the above-described point [a] in Embodiment 11.

Figure 36:
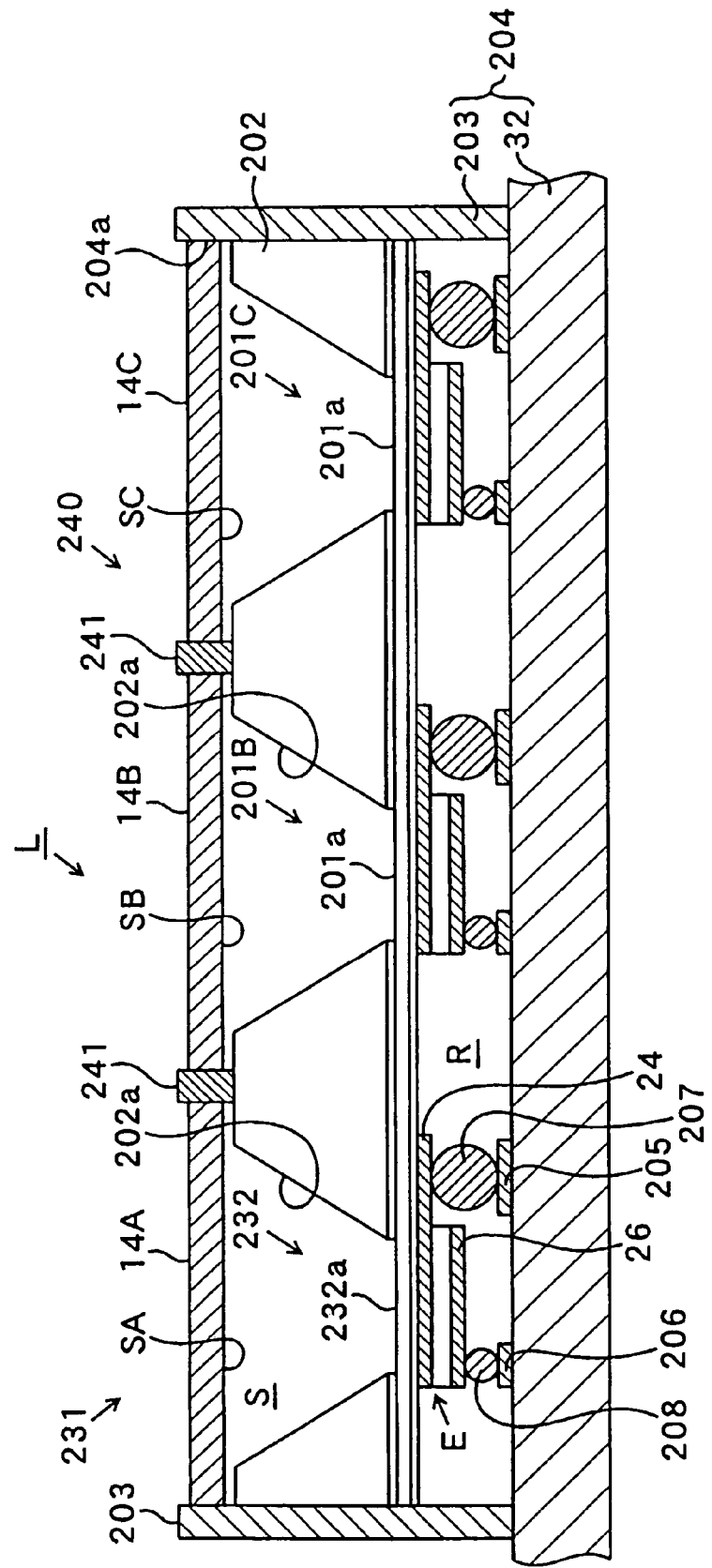
FIG. 36 is a cross-sectional side view of the receiving section and the transmission section of the twelfth embodiment adapted to the ultrasonic sensor of FIG. 23.

FIG. 36 is a cross-sectional side view showing an example in which Embodiment 12 is applied to the ultrasonic sensor L, illustrating the receiving section 240 and the transmission section 231 of the ultrasonic sensor L.

This example differs from Embodiment 12 only in the above-described point [a] in Embodiment 11.

Figure 37:
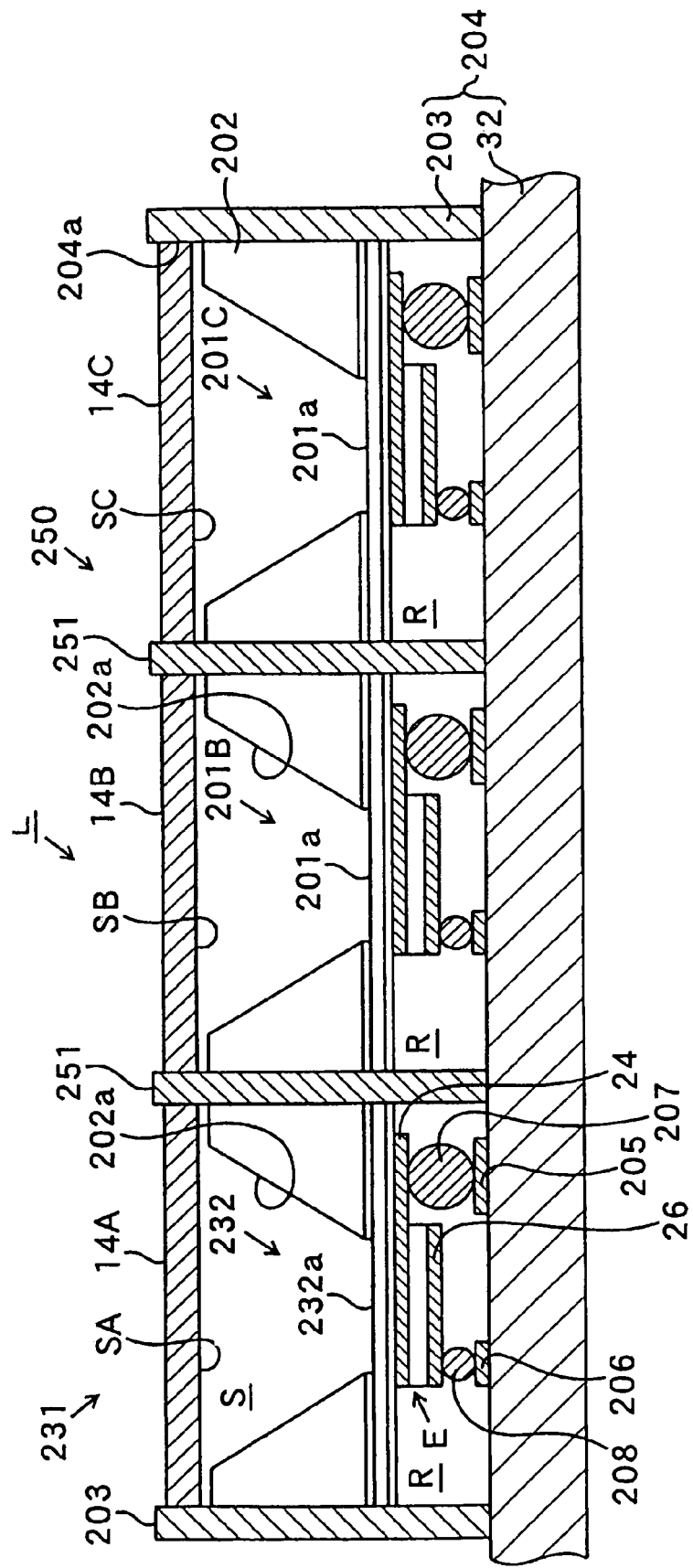
FIG. 37 is a cross-sectional side view of the receiving section and the transmission section of the thirteenth embodiment adapted to the ultrasonic sensor of FIG. 23.

FIG. 37 is a cross-sectional side view showing an example in which Embodiment 13 is applied to the ultrasonic sensor L, illustrating the receiving section 250 and the transmission section 231 of the ultrasonic sensor L.

This example differs from Embodiment 13 only in that one (the receiving element 201A) of the receiving elements 201 constituting the receiving section 250 is made to act as the transmission element 232 constituting the transmission section 231.

Figure 38:
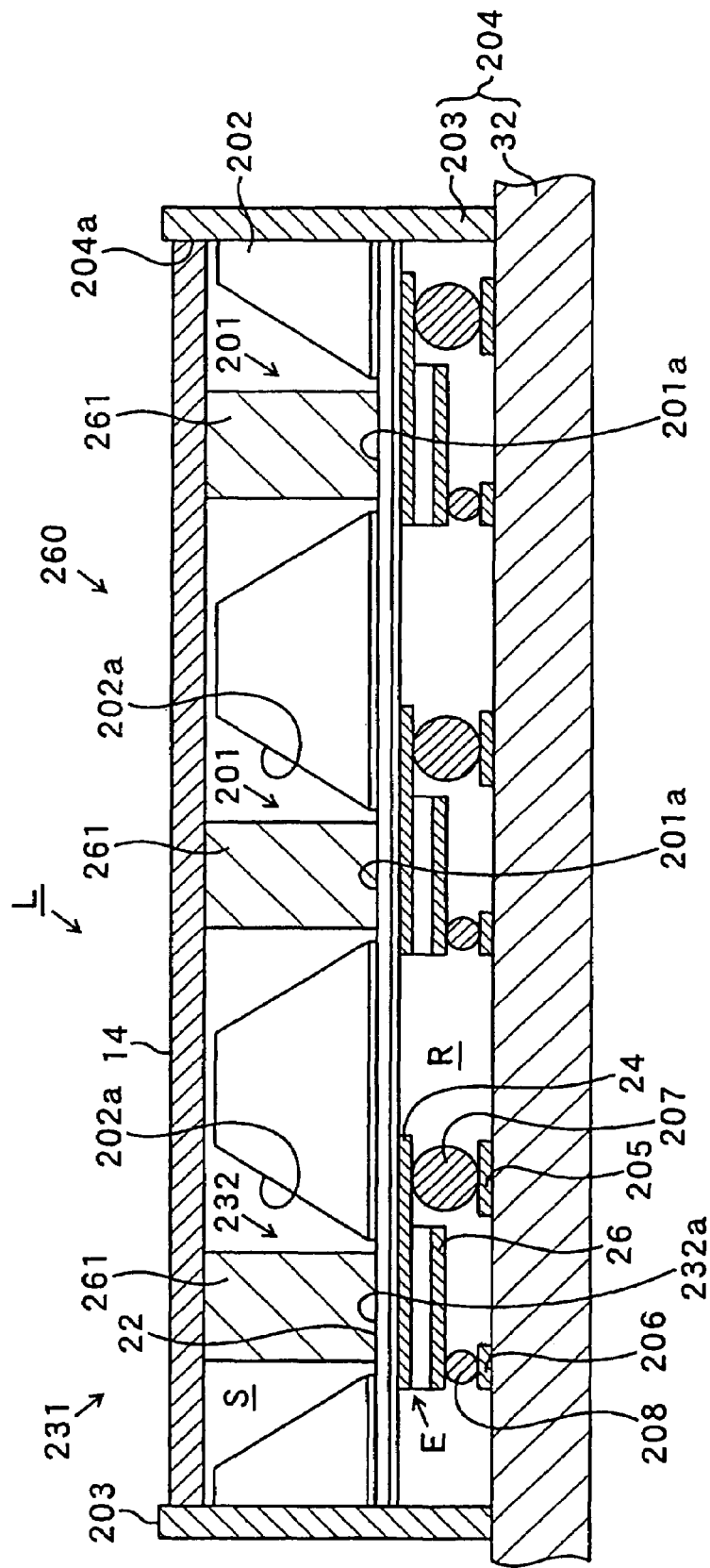
FIG. 38 is a cross-sectional side view of the receiving section and the transmission section of the fourteenth embodiment adapted to the ultrasonic sensor of FIG. 23.

FIG. 38 is a cross-sectional side view showing an example in which Embodiment 14 is applied to the ultrasonic sensor L, illustrating the receiving section 260 and the transmission section 231 of the ultrasonic sensor L.

This example differs from Embodiment 14 only in the above-described point [a] in Embodiment 11.

The Other Embodiments

The present invention is not limited to the above-described embodiments, but can also be embodied as follows. In such a case, the functions and effects equivalent to or higher than those of each of the embodiments described above can be obtained.

[1]

For each of the transmission sections 31, 209, 231, an existing small ultrasonic sensor may be used.

Although a piezoelectric element or a capacitive element fabricated by employing the MEMS technique is suitable for a receiving element for its high receiving sensitivity of an ultrasonic wave, it is not suitable for a transmission element for its small transmission output of an ultrasonic wave.

Therefore, optimal one of the transmission sections 31 and 209 and 231 may be selected for use in accordance with the field of use of the ultrasonic sensor M.

[2]

The above-described embodiments may be carried out in appropriate combination. In such a case, the effects of each of the above embodiments can be further enhanced by the synergistic effect of the combination.

What is claimed is:

1. An ultrasonic sensor comprising:
   a plurality of conversion means for converting one of a received ultrasonic wave into an electric signal and an electric signal into an ultrasonic wave for transmission, the plurality of conversion means being juxtaposed; and
   protection means for protecting each of the conversion means;
   wherein the protection means includes:
   a protective film provided above each of the conversion means;
   a first gap provided between the protective film and the conversion means;
   a housing member for housing each of the plurality of the conversion means therein;
   a second gap surrounded by the housing member and the conversion means; and
   a vent hole for bringing the second gap and exterior into communication with each other,
   wherein the second gap is filled with air through the vent hole, and
   wherein one side surface of the conversion means on a side of the second gap is in contact with the air.

2. The ultrasonic sensor of claim 1, wherein the first gap is filled with a filler selected from a liquid, a sol, and a gel.

3. The ultrasonic sensor of claim 1 wherein at least one of the conversion means is a transmission element for converting an electric signal into an ultrasonic wave for transmission.

4. The ultrasonic sensor of claim 1, wherein each of the conversion means is a receiving element for converting a received ultrasonic wave into an electric signal.

5. The ultrasonic sensor of claim 1,
   wherein each of the conversion means is formed on a surface of a semiconductor substrate,
   wherein a bottom side of the semiconductor substrate is regarded as the top side of each the conversion means so as to serve as any one of a receiving surface and a transmission surface of an ultrasonic wave, wherein a bump is connected to the surface side of the semiconductor substrate, and wherein each of the conversion means is surface-mounted on a sensor substrate by flip-chip connection through the bump.

6. The ultrasonic sensor of claim 1, wherein each of the conversion means is any one of a piezoelectric conversion type and a capacitive conversion type.

7. The ultrasonic sensor of claim 1, wherein each conversion means includes an electrode layer formed adjacent to the second gap, and wherein the electrode layer in contact with the air.

8. An ultrasonic sensor comprising:

a plurality of conversion means for converting one of a received ultrasonic wave into an electric signal and an electric signal into an ultrasonic wave for transmission, the plurality of conversion means being juxtaposed; and protection means for protecting each of the conversion means;

wherein the protection means includes:

a protective film provided above each of the conversion means; and a transfer member for independently connecting each of the conversion means and the protective film with each other for each of the conversion means, wherein the transfer member is made of the same material as the protective film.

9. The ultrasonic sensor of claim 8, wherein the transfer member is further configured to separately propagate an oscillation from the protective film to each of the plurality of converters.

10. An ultrasonic sensor comprising:

a plurality of converters for converting one of a received ultrasonic wave into an electric signal and an electric signal into an ultrasonic wave for transmission, the plurality of converters being juxtaposed; and a protection component for protecting each of the converters;

wherein the protection component includes:

a protective film provided above each of the converters; and a transfer member for independently connecting each of the converters and the protective film with each other for each of the converters, wherein the transfer member is made of the same material as the protective film.

11. The ultrasonic sensor of claim 10, wherein the transfer member is further configured to separately propagate an oscillation from the protective film to each of the plurality of converters.

* * * * *